US012747311B2

United States Patent
(12) United States Patent
Xie et al.

(10) Patent No.: US 12,747,311 B2
(45) Date of Patent: Sep. 29, 2026

(54) PROPYLENE COPOLYMERS OBTAINED USING TRANSITION METAL BIS(PHENOLATE) CATALYST COMPLEXES AND HOMOGENEOUS PROCESS FOR PRODUCTION THEREOF

(71) Applicant: ExxonMobil Chemical Patents Inc., Baytown, TX (US)

(72) Inventors: Ru Xie, Baytown, TX (US); Narayanaswami Dharmarajan, Houston, TX (US); Peijun Jiang, Katy, TX (US); Jun Shi, Houston, TX (US); John R. Hagadorn, Houston, TX (US); Jo Ann M. Canich, Houston, TX (US); Sarah J. Mattler, League City, TX (US); Alexandra K. Valdez, Webster, TX (US)

(73) Assignee: ExxonMobil Technology and Engineering Company, Baytown, TX (US)

( * ) Notice: Subject to any disclaimer, the term of this patent is extended or adjusted under 35 U.S.C. 154(b) by 979 days.

(21) Appl. No.: 17/796,516

(22) PCT Filed: Aug. 11, 2020

(86) PCT No.: PCT/US2020/045819
§ 371 (c)(1),
(2) Date: Jul. 29, 2022

(87) PCT Pub. No.: WO2021/162745
PCT Pub. Date: Aug. 19, 2021

(65) Prior Publication Data

US 2023/0348640 A1 Nov. 2, 2023

Related U.S. Application Data

(60) Provisional application No. 62/972,962, filed on Feb. 11, 2020.

(51) Int. Cl.
*C08F 4/64* (2006.01)
*C08F 2/06* (2006.01)
(Continued)

(52) U.S. Cl.
CPC .............. *C08F 210/06* (2013.01); *C08F 2/06* (2013.01); *C08F 4/64158* (2013.01);
(Continued)

(58) Field of Classification Search
CPC .................................................. C08F 4/64193
See application file for complete search history.

(56) References Cited

U.S. PATENT DOCUMENTS 6,525,157 B2 2/2003 Cozewith et al.
6,569,965 B2 5/2003 Markel et al.
(Continued)

FOREIGN PATENT DOCUMENTS

CN 107428782 6/2020
KR 10-2018-0022137 3/2018
(Continued)

OTHER PUBLICATIONS

Izmer, V., "ansa-Metallocenes Bearing 4-(N-Azolyl)-2-methylindenyl and Related Ligands: Development of Highly soselective Catalysts for Propene Polymerization at Higher Temperatures", Organometallics, Nov. 27, 2019, vol. 38, pp. 4645-4657.
Randoll, S. et al., "Stereoselective and Regioselective Propylene Polymerization with Group 4 Bisphenolate Ether Complexes", Journal of Polymer Science Part A: Polymer Chemistry, 2012, vol. 50, No. 13, pp. 2604-2611.
A Tsou, et al. (2017) "Sequence Distribution and Elastic Properties of Propylene-Base Elastomers", vol. 111, pp. 115-122.
S. Mitra, et al. "Surface Characterization of ethylene-propylene-diene rubber upon exposure to aqueous acidic solution"; Applied Surface Science (2006), v252 pp. 6280-6288.
Carpentier, J. et al. (2010) "Metal Phenolates as Polymerization Catalysts," Patai's Chem. of Functional Groups, pp. 1-74.
(Continued)

*Primary Examiner* — Rip A Lee
(74) *Attorney, Agent, or Firm* — Fletcher Yoder P.C.

(57) ABSTRACT

This invention relates to a homogeneous process to produce propylene copolymers, such as propylene ethylene copolymers, using transition metal complexes of a dianionic, tridentate ligand that features a central neutral heterocyclic Lewis base and two phenolate donors, where the tridentate ligand coordinates to the metal center to form two eight-membered rings. Preferably the bis(phenolate) complexes are represented by Formula (I):

(I)

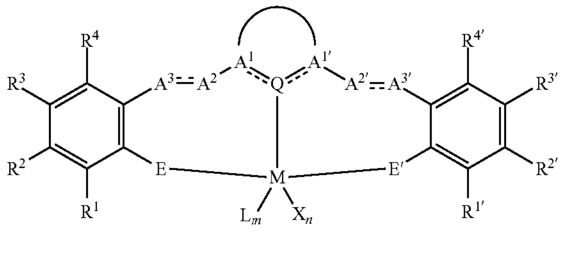

where M, L, X, m, n, E, E', Q, $R^1$, $R^2$, $R^3$, $R^4$, $R^{1'}$, $R^{2'}$, $R^{3'}$, $R^{4'}$, $A^1$, $A^{1'}$, $A^3\!=\!A^2$, and $A^{2'}\!=\!A^{3'}$ are as defined herein, where $A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge.

28 Claims, 1 Drawing Sheet

(51) Int. Cl.

| | |
|---|---|
| ***C08F 4/659*** | (2006.01) |
| ***C08F 4/76*** | (2006.01) |
| ***C08F 210/02*** | (2006.01) |
| ***C08F 210/06*** | (2006.01) |
| ***C08F 210/16*** | (2006.01) |

(52) U.S. Cl.

CPC ...... *C08F 4/64193* (2013.01); *C08F 4/65912* (2013.01); *C08F 210/02* (2013.01); *C08F 210/16* (2013.01); *C08F 2800/10* (2013.01)

(56) References Cited

U.S. PATENT DOCUMENTS

| | | | |
|---|---|---|---|
| 6,825,296 | B2 | 11/2004 | Chan et al. |
| 6,897,176 | B2 | 5/2005 | Nakayama et al. |
| 7,026,405 | B2 | 4/2006 | Cozewith et al. |
| 7,030,256 | B2 | 4/2006 | Boussie et al. |
| 7,279,536 | B2 | 10/2007 | Brant et al. |
| 7,390,866 | B2 | 6/2008 | Datta et al. |
| 7,803,876 | B2 | 9/2010 | Cheng-Ming et al. |
| 7,807,769 | B2 | 10/2010 | Mehta et al. |
| 7,812,104 | B2 | 10/2010 | Canich et al. |
| 7,847,099 | B2 | 12/2010 | Agapie et al. |
| 7,910,679 | B2 | 3/2011 | Kiss et al. |
| 8,987,400 | B2 | 3/2015 | Gloger et al. |
| 9,150,715 | B2 | 10/2015 | Tranniger |
| 9,279,024 | B2 | 3/2016 | Holtcamp et al. |
| 9,382,411 | B2 | 7/2016 | MacDonald et al. |
| 9,458,260 | B2 | 10/2016 | Canich et al. |
| 9,796,795 | B2 | 10/2017 | Canich et al. |
| 9,803,037 | B1 | 10/2017 | Canich et al. |
| 10,252,967 | B2 | 4/2019 | Faler et al. |
| 11,203,654 | B2 * | 12/2021 | Goryunov ................. C07F 7/00 |
| 11,214,634 | B2 * | 1/2022 | Goryunov ................. C07F 7/00 |
| 11,225,539 | B2 * | 1/2022 | Harlan ................ C08F 4/64158 |
| 11,248,070 | B2 * | 2/2022 | Goryunov ............. C08F 210/16 |
| 11,254,763 | B2 * | 2/2022 | Goryunov ............. C08F 210/16 |
| 2002/0169072 | A1 | 11/2002 | Nakayama et al. |
| 2004/0005984 | A1 | 1/2004 | Boussie et al. |
| 2008/0177020 | A1 | 7/2008 | Agapie et al. |
| 2009/0286946 | A1 | 11/2009 | Resconi |
| 2011/0224391 | A1 | 9/2011 | Hagadorn et al. |
| 2015/0025210 | A1 * | 1/2015 | Canich .................... C08F 10/06 526/127 |
| 2015/0166690 | A1 | 6/2015 | Evans et al. |
| 2015/0329652 | A1 | 11/2015 | Hlavinka et al. |
| 2015/0329657 | A1 | 11/2015 | Richter-Lukesova et al. |
| 2016/0289351 | A1 | 10/2016 | Hlavinka et al. |
| 2018/0194872 | A1 | 7/2018 | Holtcamp et al. |
| 2019/0169322 | A1 | 6/2019 | Rix et al. |
| 2020/0048382 | A1 | 2/2020 | Holtcamp et al. |
| 2022/0251361 | A1 | 8/2022 | Bai et al. |
| 2023/0348640 | A1 | 11/2023 | Xie et al. |
| 2024/0018279 | A1 | 1/2024 | Canich et al. |

FOREIGN PATENT DOCUMENTS

| | | | |
|---|---|---|---|
| KR | 2018-0022137 | | 3/2018 |
| WO | 00/01745 | | 1/2000 |
| WO | 2010053644 | A1 | 5/2010 |
| WO | 2019027575 | A2 | 2/2019 |
| WO | 2020167799 | A1 | 8/2020 |
| WO | 2020167821 | A1 | 8/2020 |
| WO | 2020167824 | A1 | 8/2020 |
| WO | 20200167819 | A1 | 8/2020 |
| WO | 20200167838 | A1 | 8/2020 |
| WO | 2021-162746 | | 8/2021 |
| WO | 2021-162747 | | 8/2021 |
| WO | 2021-162748 | | 8/2021 |
| WO | 2021162745 | | 8/2021 |

OTHER PUBLICATIONS

Agapie, T. et al. (2008) Zirconium and Titanium Complexes Supported by Tridentate LX2 Ligands Having Two Phenolates Linked to Furan, Thiophene, and Pyridine Donors: Precatalysts for Propylene Polymerization and Oligomerization, Orzanometallics, Amer. Chem. Soc., v.27(23), DD. 6245-6256.

Tarafder, T. H. et al. (2010) "Synthesis and Reactivity of Some Peroxi Complexes of Zirconium (IV) Thorium (IV) and Uranium (VI) Ions Containing a Quadridentate, Quadrinegative Ligand and a Pentadentate Dinegative Schiff Base," Biological Sciences-PJSIR, v.53(2), pp. 63-67.

Lein, Matthias et al. (2013) "Identification of Non-Classical C—H . . . M Interactions in Early and Late Transition Metal Complexes Containing CH(Ar0)3 Ligand," Dalton Transactions, v.42(30), pp. 10939-10951.

Golisz, S.R., et al.(2009) "Synthesis of Early Transition Metal Bisphenolate Complexes and Their Use as Olefin Polymerization Catalysts", v42, pp. 8751-8762.

Baier, M. C. "Post-Metallocenes in the Industrial Production of Polyolefins," Angewandte Reviews Chem. International Edition. 2014, vol. 53, pp. 9722-9744.

Golisz, S. et al. "Synthesis of Early Transition Metal Bisphenolate Complexes and Their Use as Olefin Polymerization Catalysts," Macromolecules, 2009, vol. 42(22), pp. 8751-8762, Pasadena, CA.

Sun, T. et al. "Effect of Short Chain Branching on the Coil Dimensions of Polyolefins in Dilute Soluntion", Macromolecules, Aug. 17, 2001, vol. 34, pp. 6812-6820.

Peng, C. et al. "Highly Enantioselective Epoxidation of α,β-Unsaturated Ketones Catalyzed by Rare-Earth Amides [(Me3Si)2N]3Re(μ-Cl)Li(ThF)3 with Phenoxy-Functionalized Chiral Prolinols", Organic Letters, Apr. 23, 2015, vol. 17 (9), pp. 2242-2245.

* cited by examiner

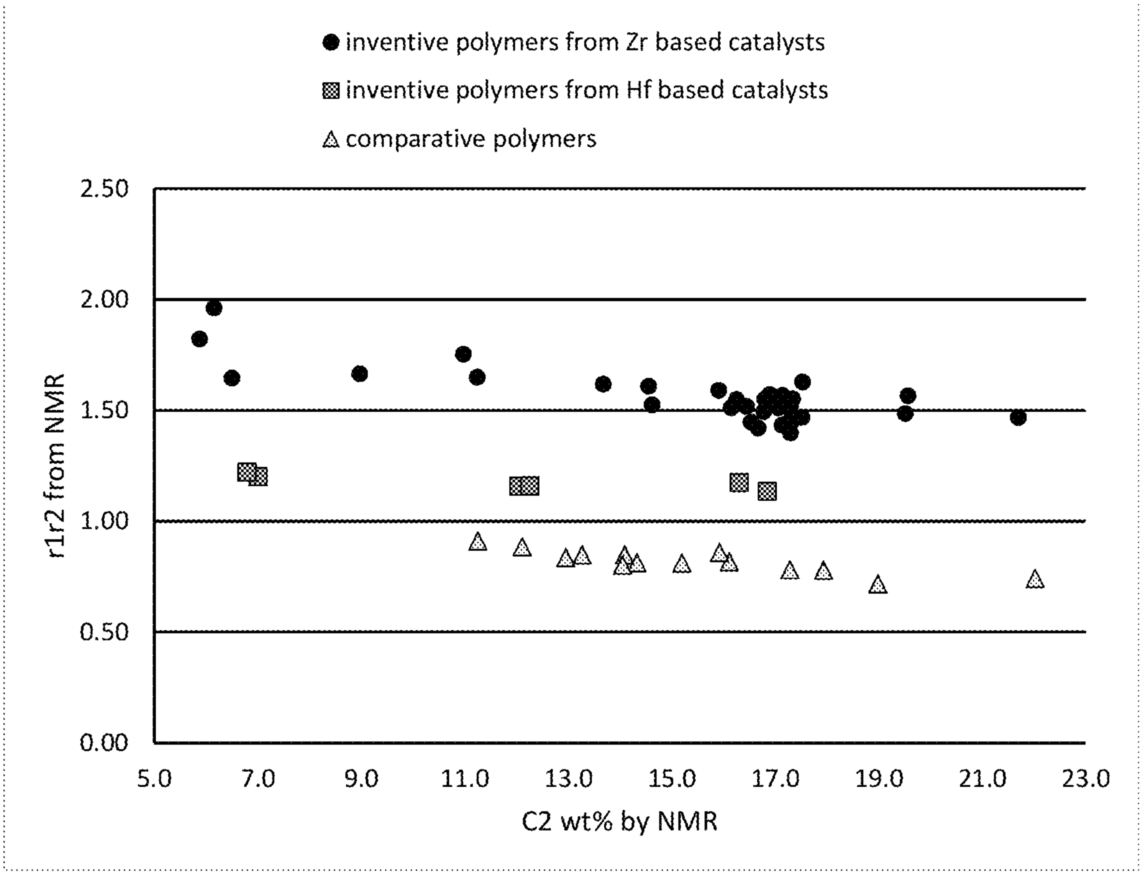
inventive polymers from Zr based catalysts
inventive polymers from Hf based catalysts
comparative polymers
2.50
2.00
1.50
1.00
0.50
0.00
r1r2 from NMR
5.0
7.0
9.0
11.0
13.0
15.0
17.0
19.0
21.0
23.0
C2 wt% by NMR

PROPYLENE COPOLYMERS OBTAINED USING TRANSITION METAL BIS(PHENOLATE) CATALYST COMPLEXES AND HOMOGENEOUS PROCESS FOR PRODUCTION THEREOF

PRIORITY CLAIM

This application is a U.S. national phase application of PCT Application No. PCT/US2020/045819 having a filing date of Aug. 11, 2020, which claims priority to and the benefit of U.S. Provisional Application No. 62/972,962 having a filing date of Feb. 11, 2020, the contents of each are incorporated by reference in their entirety.

CROSS REFERENCE TO RELATED APPLICATIONS

This invention is related to:

1) U.S. Ser. No. 16/788,022, filed Feb. 11, 2020;
2) U.S. Ser. No. 16/788,088, filed Feb. 11, 2020;
3) U.S. Ser. No. 16/788,124, filed Feb. 11, 2020;
4) U.S. Ser. No. 16/787,909, filed Feb. 11, 2020;
5) U.S. Ser. No. 16/787,837, filed Feb. 11, 2020;
6) concurrently filed PCT Application Number PCT/US2020/045820 entitled "Propylene Polymers Obtained Using Transition Metal Bis(Phenolate) Catalyst Complexes And Homogeneous Process For Production Thereof";
7) concurrently filed PCT Application Number PCT/US2020/045822 entitled "Ethylene-Alpha-Olefin-Diene Monomer Copolymers Obtained Using Transition Metal Bis(Phenolate) Catalyst Complexes and Homogeneous Process For Production Thereof"; and
8) concurrently filed PCT Application Number PCT/US2020/045823 entitled "Polyethylene Compositions Obtained Using Transition Metal Bis(Phenolate) Catalyst Complexes and Homogeneous Process for Production Thereof".

FIELD OF THE INVENTION

This invention relates propylene copolymers prepared using novel catalyst compounds comprising group 4 bis (phenolate) complexes, compositions comprising such and processes to prepare such copolymers.

BACKGROUND OF THE INVENTION

Propylene copolymers are a class of well-known elastomers that have received substantial commercial acceptance. Many of these copolymers are intermolecularly heterogeneous in terms of tacticity, composition (weight percent comonomers) or both. Alternatively, they can also be compositionally heterogeneous within a polymer chain (i.e. blocky). Propylene copolymer are known to have good properties such as weatherability, ozone resistance, and thermal stability. And the polymers have accepted wide utilities in automotive applications, as construction materials, and as carpet backing, among others. The properties of these polymers can be tailored for specific applications by means of control over molecular weight, molecular weight distribution, composition distribution, as well intermolecular structures.

Introducing long chain branching into propylene copolymers has been proposed to improve the processability and melt strength. There are two pathways for long chain branching to be achieved in-situ in polymerization reactors: terminal branching and diene copolymerization. U.S. Pat. No. 6,569,965 discloses a long chain branched (LCB) semi-crystalline high-$C_3$ EPR copolymer which have improved melt strength and shear thinning by terminal branching. The described process to produce these such polymers comprising contacting propylene monomers and ethylene monomers in a reactor with an inert hydrocarbon solvent or diluent in the presence of one more single site catalyst compounds. The weight averaged branching index g' for the higher molecular weight region of resulted EPR polymer composition is less than 0.95. The diene copolymerized propylene copolymer were studied in U.S. Pat. No. 7,390,866, which describes diene incorporated propylene copolymer having isotactic propylene crystallinity, a melting point equal to or less than 110° C., and a heat of fusion of 5 J/g to 50 J/g. However, it is difficult to avoid cross-linking and gel formation in such processes.

Catalyst types or structures are important parameters in manipulating molecular structures of propylene copolymers, and hence the material properties and processability. Current catalyst systems used in propylene copolymers commercial manufacture processes are dominated by metallocene catalysts. Typical metallocene catalysts suitable for use in producing propylene copolymers have relatively limited molecular weight capabilities which require low process temperatures to achieve a desired low melt flow rate product.

It is advantageous to conduct commercial solution polymerization reactions at elevated temperatures. New catalysts capable of polymerizing olefins to yield high molecular weight and/or high tacticity polymers at high process temperatures are desirable for the industrial production of polyolefins. Hence, there is still a need in the art for new and improved catalyst systems for the polymerization of olefins, in order to achieve specific polymer properties, such as high molecular weight and/or high tacticity polymers, preferably at high process temperatures.

Catalysts for olefin polymerization can be based on bis (phenolate) complexes as catalyst precursors, which are activated typically by an alumoxane or an activator containing a non-coordinating anion. Examples of bis(phenolate) complexes can be found in the following references:

- KR 2018-022137 (LG Chem.) describes transition metal complexes of bis(methylphenyl phenolate)pyridine.
- U.S. Pat. No. 7,030,256 B2 (Symyx Technologies, Inc.) describes bridged bi-aromatic ligands, catalysts, processes for polymerizing and polymers therefrom.
- U.S. Pat. No. 6,825,296 (University of Hong Kong) describes transition metal complexes of bis(phenolate) ligands that coordinate to metal with two 6-membered rings.
- U.S. Pat. No. 7,847,099 (California Institute of Technology) describes transition metal complexes of bis(phenolate) ligands that coordinate to metal with two 6-membered rings.
- WO 2016/172110 (Univation Technologies) describes complexes of tridentate bis(phenolate) ligands that feature a non-cyclic ether or thioether donor.

Other references of interest include: Baier, M. C. (2014) "Post-Metallocenes in the Industrial Production of Polyolefins," *Angew. Chem. Int. Ed.* 2014, v. 53, pp. 9722-9744; and Golisz, S. et al. (2009) "Synthesis of Early Transition Metal Bisphenolate Complexes and Their Use as Olefin Polymerization Catalysts," *Macromolecules*, v. 42(22), pp. 8751-8762.

The newly developed single-site catalyst described herein has the capability of producing high molecular weight polymer at elevated polymerization temperatures. These catalysts, when paired with various types of activators and used in a solution process can produce propylene copolymers with excellent melt flow rates, among other things. Further, the catalyst activity is high which facilitates use in commercially relevant process conditions. This new process provides new copolymers having an extended melt flow rate range and that can be produced with increased reactor throughput and at higher polymerization temperatures during polymer production.

Likewise this process produces new propylene copolymers having high molecular weight at high polymerization temperatures. The catalyst productivity can reach or exceed 1,500,000 kg polymer per kg of catalyst at typical polymerization conditions. Propylene copolymers containing significant levels of long-chain branching may also be prepared with or without the addition of diene monomers.

SUMMARY OF THE INVENTION

This invention relates to propylene copolymers, such as propylene ethylene copolymers, and blends comprising such copolymers, where the propylene copolymers are prepared in a solution process using transition metal catalyst complexes of bis(phenolate) ligands. Preferably the bis(phenoate ligand) is a dianionic, tridentate ligand that features a central neutral heterocyclic Lewis base and two phenolate donors, where the tridentate ligand coordinates to the metal center to form two eight-membered rings.

This invention also relates to propylene copolymers, such as propylene ethylene copolymers, and blends comprising such copolymers, where the propylene copolymers are, prepared in a solution process using bis(phenolate) complexes, preferably bis(phenolate) complexes represented by Formula (I):

(I)

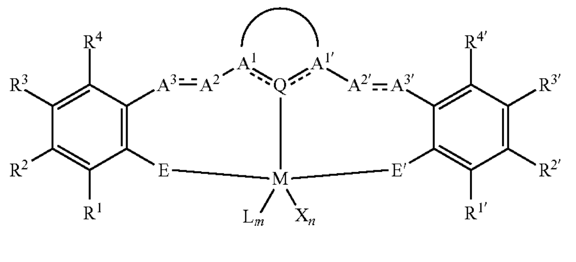

wherein:

- M is a group 3-6 transition metal or Lanthanide;
- E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;
- Q is group 14, 15, or 16 atom that forms a dative bond to metal M;
- $A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;
- $A^{3}=\!=A^{2}$, is a divalent group containing 2 to 40 non-hydrogen atoms that links $A^1$ to the E-bonded aryl group via a 2-atom bridge;
- $A^{2'}=\!=A^{3'}$ is a divalent group containing 2 to 40 non-hydrogen atoms that links $A^{1'}$ to the E'-bonded aryl group via a 2-atom bridge;
- L is a neutral Lewis base;
- X is an anionic ligand;
- n is 1, 2 or 3;
- m is 0, 1, or 2;
- n+m is not greater than 4;
- each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
- any two L groups may be joined together to form a bidentate Lewis base;
- an X group may be joined to an L group to form a monoanionic bidentate group;
- any two X groups may be joined together to form a dianionic ligand group.

This invention also relates to a solution phase method to polymerize olefins comprising contacting a catalyst compound as described herein with an activator, propylene and one or more comonomers. This invention further relates to propylene copolymer compositions produced by the methods described herein.

BRIEF DESCRIPTION OF THE DRAWINGS

FIG. 1 is a graph of wt % ethylene in the copolymer as measured by $^{13}C$ NMR vs. the $r_1r_2$ of the copolymer also measured by $^{13}C$ NMR.

DETAILED DESCRIPTION

Definitions

For the purposes of this invention and the claims thereto, the following definitions shall be used:

The new numbering scheme for the Periodic Table Groups is used as described in *Chemical and Engineering News, v.* 63(5), pg. 27 (1985). Therefore, a "group 4 metal" is an element from group 4 of the Periodic Table, e.g. Hf, Ti, or Zr.

"Catalyst productivity" is a measure of the mass of polymer produced using a known quantity of polymerization catalyst. Typically, "catalyst productivity" is expressed in units of (g of polymer)/(g of catalyst) or (g of polymer)/(mmols of catalyst) or the like. If units are not specified then the "catalyst productivity" is in units of (g of polymer)/(g of catalyst). For calculating catalyst productivity only the weight of the transition metal component of the catalyst is used (i.e. the activator and/or co-catalyst is omitted). "Catalyst activity" is a measure of the mass of polymer produced using a known quantity of polymerization catalyst per unit time for batch and semi-batch polymerizations. Typically, "catalyst activity" is expressed in units of (g of polymer)/(mmol of catalyst)/hour or (kg of polymer)/(mmols of catalyst)/hour or the like. If units are not specified then the "catalyst activity" is in units of (g of polymer)/(mmol of catalyst)/hour.

"Conversion" is the percentage of a monomer that is converted to polymer product in a polymerization, and is reported as % and is calculated based on the polymer yield, the polymer composition, and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

Ethylene shall be considered an alpha olefin (also referred to as α-olefin).

Unless otherwise specified, the term "$C_n$" means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthalenyl, and the like.

Unless otherwise indicated, (e.g., the definition of "substituted hydrocarbyl", etc.), the term "substituted" means that at least one hydrogen atom has been replaced with at least one non-hydrogen group, such as a hydrocarbyl group, a heteroatom or heteroatom-containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)_q$—SiR*3, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)_q$—$SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring (typically made of 6 carbon atoms) and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

The term "substituted aromatic," means an aromatic group having 1 or more hydrogen groups replaced by a hydrocarbyl, substituted hydrocarbyl, heteroatom or heteroatom containing group.

A "substituted phenolate" is a phenolate group where at least one, two, three, four or five hydrogen atoms in the 2, 3, 4, 5, and/or 6 positions has been replaced with at least one non-hydrogen group, such as a hydrocarbyl group, a heteroatom or heteroatom-containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)_q$—$SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), where the 1 position is the phenolate group (Ph-O—, Ph-S—, and Ph-N(R^)— groups, where R^ is hydrogen, $C_1$-$C_{40}$ hydrocarbyl, $C_1$-$C_{40}$ substituted hydrocarbyl, a heteroatom or a heteroatom-containing group). Preferably, a "substituted phenolate" group in the catalyst compounds described herein is represented by the formula:

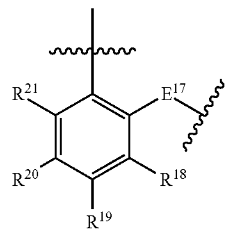

where $R^{18}$ is hydrogen, $C_1$-$C_{40}$ hydrocarbyl (such as $C_1$-$C_{40}$ alkyl) or $C_1$-$C_{40}$ substituted hydrocarbyl, a heteroatom or a heteroatom-containing group, $E^{17}$ is oxygen, sulfur, or $NR^{17}$, and each of $R^{17}$, $R^{19}$, $R^{20}$, and $R^{21}$ is independently selected from hydrogen, $C_1$-$C_{40}$ hydrocarbyl (such as $C_1$-$C_{40}$ alkyl) or $C_1$-$C_{40}$ substituted hydrocarbyl, a heteroatom or a heteroatom-containing group, or two or more of $R^{18}$, $R^{19}$, $R^{20}$, and $R^{21}$ are joined together to form a $C_4$-$C_{62}$ cyclic or polycyclic ring structure, or a combination thereof, and the wavy lines show where the substituted phenolate group forms bonds to the rest of the catalyst compound.

An "alkyl substituted phenolate" is a phenolate group where at least one, two, three, four or five hydrogen atoms in the 2, 3, 4, 5, and/or 6 positions has been replaced with at least one alkyl group, such as a $C_1$ to $C_{40}$, alternatively $C_2$ to $C_{20}$, alternatively $C_3$ to $C_{12}$ alkyl, such as methyl, ethyl, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, adamantanyl and the like including their substituted analogues.

An "aryl substituted phenolate" is a phenolate group where at least one, two, three, four or five hydrogen atoms in the 2, 3, 4, 5, and/or 6 positions has been replaced with at least one aryl group, such as a $C_1$ to $C_{40}$, alternatively $C_2$ to $C_{20}$, alternatively $C_3$ to $C_{12}$ aryl group, such as phenyl, 4-fluorophenyl, 2-methylphenyl, 2-propylphenyl, 2,6-dimethylphenyl, mesityl, 2-ethylphenyl, naphthalenyl and the like including their substituted analogues.

The term "ring atom" means an atom that is part of a cyclic ring structure. By this definition, a benzyl group has six ring atoms and tetrahydrofuran has 5 ring atoms.

A heterocyclic ring, also referred to as a heterocyclic, is a ring having a heteroatom in the ring structure as opposed to a "heteroatom-substituted ring" where a hydrogen on a ring atom is replaced with a heteroatom. For example, tetrahydrofuran is a heterocyclic ring and 4-N,N-dimethyl-amino-phenyl is a heteroatom substituted ring. A substituted heterocyclic ring means a heterocyclic ring having 1 or more hydrogen groups replaced by a hydrocarbyl, substituted hydrocarbyl, heteroatom or heteroatom containing group.

A substituted hydrocarbyl ring means a ring comprised of carbon and hydrogen atoms having 1 or more hydrogen groups replaced by a hydrocarbyl, substituted hydrocarbyl, heteroatom or heteroatom containing group.

For purposes of the present disclosure, in relation to catalyst compounds (e.g., substituted bis(phenolate) catalyst compounds), the term "substituted" means that a hydrogen group has been replaced with a hydrocarbyl group, a heteroatom or heteroatom-containing group, such as halogen (such as Br, Cl, F or I) or at least one functional group such as $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*_3$, $-GeR^*_3$, $-SnR^*_3$, $-PbR^*_3$, $-(CH_2)_q-SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

A tertiary hydrocarbyl group possesses a carbon atom bonded to three other carbon atoms. When the hydrocarbyl group is an alkyl group, tertiary hydrocarbyl groups are also referred to as tertiary alkyl groups. Examples of tertiary hydrocarbyl groups include tert-butyl, 2-methylbutan-2-yl, 2-methylhexan-2-yl, 2-phenylpropan-2-yl, 2-cyclohexylpropan-2-yl, 1-methylcyclohexyl, 1-adamantyl, bicyclo[2.2.1]heptan-1-yl and the like. Tertiary hydrocarbyl groups can be illustrated by formula A:

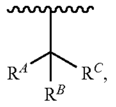

wherein $R^A$, $R^B$ and $R^C$ are hydrocarbyl groups or substituted hydrocarbyl groups that may optionally be bonded to one another, and the wavy line shows where the tertiary hydrocarbyl group forms bonds to other groups.

A cyclic tertiary hydrocarbyl group is defined as a tertiary hydrocarbyl group that forms at least one alicyclic (non-aromatic) ring. Cyclic tertiary hydrocarbyl groups are also referred to as alicyclic tertiary hydrocarbyl groups. When the hydrocarbyl group is an alkyl group, cyclic tertiary hydrocarbyl groups are also referred to as cyclic tertiary alkyl groups or alicyclic tertiary alkyl groups. Examples of cyclic tertiary hydrocarbyl groups include 1-adamantanyl, 1-methylcyclohexyl, 1-methylcyclopentyl, 1-methylcyclooctyl, 1-methylcyclodecyl, 1-methylcyclododecyl, bicyclo[3.3.1]nonan-1-yl, bicyclo[2.2.1]heptan-1-yl, bicyclo[2.3.3]hexan-1-yl, bicycle[1.1.1]pentan-1-yl, bicycle[2.2.2]octan-1-yl, and the like. Cyclic tertiary hydrocarbyl groups can be illustrated by formula B:

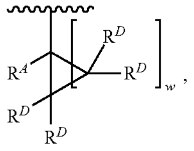

wherein $R^A$ is a hydrocarbyl group or substituted hydrocarbyl group, each $R^D$ is independently hydrogen or a hydrocarbyl group or substituted hydrocarbyl group, w is an integer from 1 to about 30, and $R^A$, and one or more $R^D$, and or two or more $R^D$ may optionally be bonded to one another to form additional rings.

When a cyclic tertiary hydrocarbyl group contains more than one alicyclic ring, it can be referred to as polycyclic tertiary hydrocarbyl group or if the hydrocarbyl group is an alkyl group, it may be referred to as a polycyclic tertiary alkyl group.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom or heteroatom-containing group, such as halogen (such as Br, Cl, F or I) or at least one functional group such as $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*_3$, $-GeR^*_3$, $-SnR^*_3$, $-PbR^*_3$, $-(CH_2)_q-SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g $mol^{-1}$).

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, MAO is methylalumoxane, dme (also referred to as DME) is 1,2-dimethoxyethane, p-tBu is para-tertiary butyl, TMS is trimethylsilyl, TIBAL is triisobutylaluminum, TNOA and TNOAL are tri(n-octyl)aluminum, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, Cbz is Carbazole, and Cy is cyclohexyl.

A "catalyst system" is a combination comprising at least one catalyst compound and at least one activator. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. The term "anionic donor" is used interchangeably with "anionic ligand". Examples of anionic donors in the context of the present invention include, but are not limited to, methyl, chloride, fluoride, alkoxide, aryloxide, alkyl, alkenyl, thiolate, carboxylate, amido, methyl, benzyl, hydrido, amidinate, amidate, and phenyl. Two anionic donors may be joined to form a dianionic group.

A "neutral Lewis base or "neutral donor group" is an uncharged (i.e. neutral) group which donates one or more pairs of electrons to a metal ion. Non-limiting examples of neutral Lewis bases include ethers, thioethers, amines, phosphines, ethyl ether, tetrahydrofuran, dimethylsulfide, triethylamine, pyridine, alkenes, alkynes, allenes, and carbenes. Lewis bases may be joined together to form bidentate or tridentate Lewis bases.

For purposes of this invention and the claims thereto, phenolate donors include Ph-O—, Ph-S—, and Ph-N(R^)— groups, where R^ is hydrogen, $C_1$-$C_{40}$ hydrocarbyl, $C_1$-$C_{40}$ substituted hydrocarbyl, a heteroatom or a heteroatom-containing group, and Ph is optionally substituted phenyl.

DETAILED DESCRIPTION

This invention relates to solution processes for propylene copolymers prepared using a catalyst family comprising transition metal complexes of a bis(phenolate) ligand, preferably a dianionic, tridentate ligand that features a central neutral donor group and two phenolate donors, where the tridentate ligands coordinate to the metal center to form two eight-membered rings. In complexes of this type it is advantageous for the central neutral donor to be a heterocyclic group. It is particularly advantageous for the heterocyclic group to lack hydrogens in the position alpha to the heteroatom. In complexes of this type it is also advantageous for the phenolates to be substituted with one or more cyclic tertiary alkyl substituents. The use of cyclic tertiary alkyl substituted phenolates is demonstrated to improve the ability of these catalysts to produce high molecular weight polymer.

Complexes of substituted bis(phenolate) ligands (such as adamantanyl-substituted bis(phenolate) ligands) useful herein form active olefin polymerization catalysts when combined with activators, such as non-coordinating anion or alumoxane activators. Useful bis(aryl phenolate)pyridine complexes comprise a tridentate bis(aryl phenolate)pyridine ligand that is coordinated to a group 4 transition metal with the formation of two eight-membered rings.

This invention also relates to solution processes to produce propylene copolymers utilizing a metal complex comprising: a metal selected from groups 3-6 or Lanthanide metals, and a tridentate, dianionic ligand containing two anionic donor groups and a neutral Lewis base donor, wherein the neutral Lewis base donor is covalently bonded between the two anionic donors, and wherein the metal-ligand complex features a pair of 8-membered metallocycle rings.

This invention relates to catalyst systems used in solution processes to prepare propylene copolymers comprising activator and one or more catalyst compounds as described herein.

This invention also relates to solution processes (preferably at higher temperatures) to polymerize olefins using the catalyst compounds described herein comprising contacting propylene and one or more olefin comonomers with a catalyst system comprising an activator and a catalyst compound described herein.

The invention relates to copolymers of propylene and ethylene that contain less than 35 mol % ethylene which may be prepared using catalysts comprising bis(phenolate) complexes, preferably bis(aryl phenolate)pyridine complexes.

The present disclosure also relates to a catalyst system comprising a transition metal compound and an activator compound as described herein, to the use of such activator compounds for activating a transition metal compound in a catalyst system for polymerizing propylene and olefin comonomer(s), and to processes for polymerizing said olefins, the process comprising contacting under polymerization conditions propylene and one or more olefin comonomers with a catalyst system comprising a transition metal compound and activator compounds, where aromatic solvents, such as toluene, are absent (e.g. present at zero mol % relative to the moles of activator, alternatively present at less than 1 mol %, preferably the catalyst system, the polymerization reaction and/or the polymer produced are free of detectable aromatic hydrocarbon solvent, such as toluene).

The copolymers produced herein preferably contain 0 ppm (alternatively less than 1 ppm, alternatively less than 5 ppm, alternatively less than 10 ppm) of aromatic hydrocarbon. Preferably, the copolymers produced herein contain 0 ppm (alternatively less than 1 ppm, alternatively less than 5 ppm, alternatively less than 10 ppm) of toluene.

The catalyst systems used herein preferably contain 0 ppm (alternatively less than 1 ppm, alternatively less than 5 ppm, alternatively less than 10 ppm) of aromatic hydrocarbon. Preferably, the catalyst systems used herein contain 0 ppm (alternatively less than 1 ppm, alternatively less than 5 ppm, alternatively less than 10 ppm) of toluene.

Catalyst Compounds

The terms “catalyst”, “compound”, “catalyst compound”, and “complex” may be used interchangeably to describe a transition metal or Lanthanide metal complex that forms an olefin polymerization catalyst when combined with a suitable activator.

The catalyst complexes of the present invention comprise a metal selected from groups 3, 4, 5 or 6 or Lanthanide metals of the Periodic Table of the Elements, a tridentate dianionic ligand containing two anionic donor groups and a neutral heterocyclic Lewis base donor, wherein the heterocyclic donor is covalently bonded between the two anionic donors. Preferably the catalyst complex comprises a dianionic, tridentate ligand featuring a central heterocyclic donor group and two phenolate donors, wherein the tridentate ligand coordinates to the metal center to form two eight-membered rings. Also preferably, the catalyst complex comprises a tridentate dianionic ligand featuring a central heterocyclic donor joined to two phenolate donors, wherein, the central heterocycle is linked to each of the phenolate donors via an 1,2-arylene bridge (such as 1,2-phenylene).

The metal is preferably selected from group 3, 4, 5, or 6 elements. Preferably the metal, M, is a group 4 metal. Most preferably the metal, M, is zirconium or hafnium. For the production of polypropylenes of high tacticity, the metal, M, is preferably hafnium.

Preferably the heterocyclic Lewis base donor features a nitrogen or oxygen donor atom. Preferred heterocyclic groups include derivatives of pyridine, pyrazine, pyrimidine, triazine, thiazole, imidazole, thiophene, oxazole, thiazole, furan, and substituted variants of thereof. Preferably the heterocyclic Lewis base lacks hydrogen(s) in the position alpha to the donor atom. Particularly preferred heterocyclic Lewis base donors include pyridine, 3-substituted pyridines, and 4-substituted pyridines.

The anionic donors of the tridentate dianionic ligand may be arylthiolates, phenolates, or anilides. Preferred anionic donors are phenolates. It is preferred that the tridentate dianionic ligand coordinates to the metal center to form a complex that lacks a mirror plane of symmetry. It is preferred that the tridentate dianionic ligand coordinates to the metal center to form a complex that has a two-fold rotation axis of symmetry; when determining the symmetry of the bis(phenolate) complexes only the metal and dianionic tridentate ligand are considered (i.e. ignore remaining ligands).

The bis(phenolate) ligands useful in the present invention include dianionic multidentate (such as bidentate, tridentate, or tetradentate) ligands that feature two anionic phenolate donors. Preferably, the bis(phenolate) ligands are tridentate dianionic ligands that coordinate to the metal M in such a fashion that a pair of 8-membered metallocycle rings are formed. The bis(phenolate) ligands useful in the present invention are preferably tridentate dianionic ligands that coordinate to the metal M in such a fashion that a pair of 8-membered metallocycle rings are formed. The preferred bis(phenolate) ligands wrap around the metal to form a complex with a 2-fold rotation axis, thus giving the complexes $C_2$ symmetry. The $C_2$ geometry and the 8-membered metallocycle rings are features of these complexes that make them effective catalyst components for the production of polyolefins, particularly isotactic poly(alpha olefins). If the ligands were coordinated to the metal in such a manner that the complex had mirror-plane ($C_s$) symmetry, then the catalyst would be expected to produce only atactic poly (alpha olefins); these symmetry-reactivity rules are summarized by Bercaw, J. E. (2009) in *Macromolecules*, v. 42, pp. 8751-8762. The pair of 8-membered metallocycle rings of the inventive complexes is also a notable feature that is advantageous for catalyst activity, temperature stability, and isoselectivity of monomer enchainment. Related group 4 complexes featuring smaller 6-membered metallocycle rings are known (Bercaw, J. E. (2009) in *Macromolecules*, v. 42, pp. 8751-8762) to form mixtures of $C_2$ and $C_s$ symmetric complexes when used in olefin polymerizations and are thus not well suited to the production of highly isotactic poly (alpha olefins).

Bis(phenolate) ligands that contain oxygen donor groups (i.e. E=E'=oxygen in Formula (I)) in the present invention are preferably substituted with alkyl, substituted alkyl, aryl, or other groups. It is advantageous that each phenolate group be substituted in the ring position that is adjacent to the oxygen donor atom. It is preferred that substitution at the position adjacent to the oxygen donor atom be an alkyl group containing 1-20 carbon atoms. It is preferred that substitution at the position next to the oxygen donor atom be a non-aromatic cyclic alkyl group with one or more five- or six-membered rings. It is preferred that substitution at the position next to the oxygen donor atom be a cyclic tertiary alkyl group. It is highly preferred that substitution at the position next to the oxygen donor atom be adamantan-1-yl or substituted adamantan-1-yl.

The neutral heterocyclic Lewis base donor is covalently bonded between the two anionic donors via “linker groups” that join the heterocyclic Lewis base to the phenolate groups. The “linker groups” are indicated by ($A^3A^2$) and ($A^{2'}A^{3'}$) in Formula (I). The choice of each linker group may affect the catalyst performance, such as the tacticity of the poly(alpha olefin) produced. Each linker group is typically a $C_2$-$C_{40}$ divalent group that is two-atoms in length. One or both linker groups may independently be phenylene, substituted phenylene, heteroaryl, vinylene, or a non-cyclic two-carbon long linker group. When one or both linker groups are phenylene, the alkyl substituents on the phenylene group may be chosen to optimize catalyst performance. Typically, one or both phenylenes may be unsubstituted or may be independently substituted with $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as isopropyl, etc.

This invention further relates to catalyst compounds, and catalyst systems comprising such compounds, represented by the Formula (I):

(I)

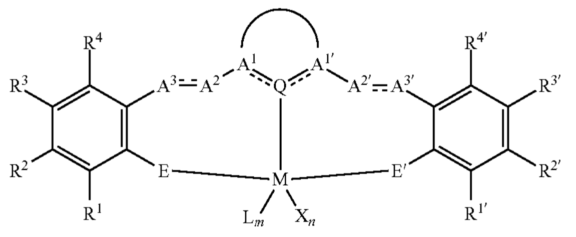

wherein:

M is a group 3, 4, 5, or 6 transition metal or a Lanthanide (such as Hf, Zr or Ti);

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;

Q is group 14, 15, or 16 atom that forms a dative bond to metal M, preferably Q is C, O, S or N, more preferably Q is C, N or O, most preferably Q is N;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge ($A^1QA^{1'}$ combined with the curved line joining $A^1$ and $A^{1'}$ represents the heterocyclic Lewis base), $A^1$ and $A^{1'}$ are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are C;

$A^3{=}A^2$, is a divalent group containing 2 to 40 non-hydrogen atoms that links $A^1$ to the E-bonded aryl group via a 2-atom bridge, such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene ($-CH_2CH_2-$), substituted 1,2-ethylene, 1,2-vinylene ($-HC{=}CH-$), or substituted 1,2-vinylene, preferably $A^3{=}A^2$, is a divalent hydrocarbyl group;

$A^{2'}{=}A^{3'}$ is a divalent group containing 2 to 40 non-hydrogen atoms that links $A^{1'}$ to the E'-bonded aryl group via a 2-atom bridge such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene ($-CH_2CH_2-$), substituted 1,2-ethylene, 1,2-vinylene ($-HC{=}CH-$), or substituted 1,2-vinylene, preferably $A^{2'}{=}A^{3'}$ is a divalent hydrocarbyl group;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group (preferably $R^{1'}$ and $R^1$ are independently a cyclic group, such as a cyclic tertiary alkyl group), or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

This invention is further related to catalyst compounds, and catalyst systems comprising such compounds, represented by the Formula (II):

(II)

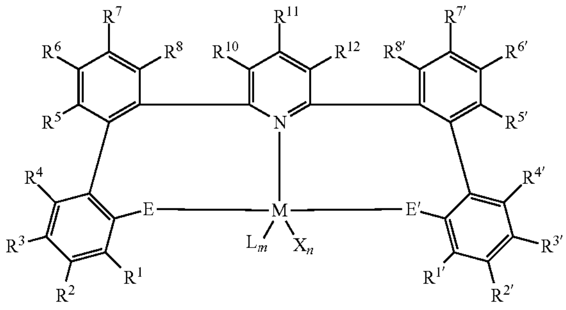

wherein:

M is a group 3, 4, 5, or 6 transition metal or a Lanthanide (such as Hf, Zr or Ti);

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group;

each of $R^5$, $R^6$, $R^7$, $R^8$, $R^{5'}$, $R^{6'}$, $R^{7'}$; $R^{8'}$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

The metal, M, is preferably selected from group 3, 4, 5, or 6 elements, more preferably group 4. Most preferably the metal, M, is zirconium or hafnium.

The donor atom Q of the neutral heterocyclic Lewis base (in Formula (I)) is preferably nitrogen, carbon, or oxygen. Preferred Q is nitrogen.

Non-limiting examples of neutral heterocyclic Lewis base groups include derivatives of pyridine, pyrazine, pyrimidine, triazine, thiazole, imidazole, thiophene, oxazole, thiazole, furan, and substituted variants of thereof. Preferred heterocyclic Lewis base groups include derivatives of pyridine, pyrazine, thiazole, and imidazole.

Each $A^1$ and $A^{1'}$ of the heterocyclic Lewis base (in Formula (I)) are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are carbon. When Q is carbon, it is preferred that $A^1$ and $A^{1'}$ be selected from nitrogen and $C(R^{22})$. When Q is nitrogen, it is preferred that $A^1$ and $A^{1'}$ be carbon. It is preferred that Q=nitrogen, and $A^1$=$A^{1'}$=carbon. When Q is nitrogen or oxygen, is preferred that the heterocyclic Lewis base in Formula (I) not have any hydrogen atoms bound to the $A^1$ or $A^{1'}$ atoms. This is preferred because it is thought that hydrogens in those positions may undergo unwanted decomposition reactions that reduce the stability of the catalytically active species.

The heterocyclic Lewis base (of Formula (I)) represented by $A^1QA^{1'}$ combined with the curved line joining $A^1$ and $A^{1'}$ is preferably selected from the following, with each $R^{23}$ group selected from hydrogen, heteroatoms, $C_1$-$C_{20}$ alkyls, $C_1$-$C_{20}$ alkoxides, $C_1$-$C_{20}$ amides, and $C_1$-$C_{20}$ substituted alkyls.

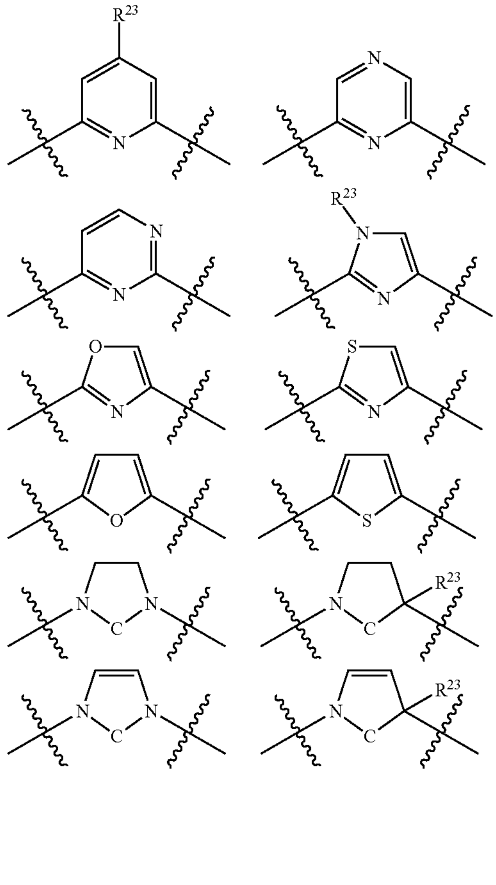

In Formula (I) or (II), E and E' are each selected from oxygen or $NR^9$, where $R^9$ is independently hydrogen, $C_1$-$C_{40}$ hydrocarbyl, $C_1$-$C_{40}$ substituted hydrocarbyl, or a heteroatom-containing group. It is preferred that E and E' are oxygen. When E and/or E' are $NR^9$ it is preferred that $R^9$ be selected from $C_1$ to $C_{20}$ hydrocarbyls, alkyls, or aryls. In one embodiment E and E' are each selected from O, S, or N(alkyl) or N(aryl), where the alkyl is preferably a $C_1$ to $C_{20}$ alkyl, such as methyl, ethyl, propyl, butyl, pentyl, hexyl, octyl, nonyl, decyl, undecyl, dodeceyl and the like, and aryl is a $C_6$ to $C_{40}$ aryl group, such as phenyl, naphthalenyl, benzyl, methylphenyl, and the like.

In embodiments, $A^3$=$A^2$, and $A^{2'}$=$A^{3'}$ are independently a divalent hydrocarbyl group, such as $C_1$ to $C_{12}$ hydrocarbyl group.

In complexes of Formula (I) or (II), when E and E' are oxygen it is advantageous that each phenolate group be substituted in the position that is next to the oxygen atom (i.e. $R^1$ and $R^{1'}$ in Formula (I) and (II)). Thus, when E and E' are oxygen it is preferred that each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, more preferably, each of $R^1$ and $R^{1'}$ is independently a non-aromatic cyclic alkyl group with one or more five- or six-membered rings (such as cyclohexyl, cyclooctyl, adamantanyl, or 1-methylcyclohexyl, or substituted adamantanyl), most preferably a non-aromatic cyclic tertiary alkyl group (such as 1-methylcyclohexyl, adamantanyl, or substituted adamantanyl).

In some embodiments of the invention of Formula (I) or (II), each of $R^1$ and $R^{1'}$ is independently a tertiary hydrocarbyl group. In other embodiments of the invention of Formula (I) or (II), each of $R^1$ and $R^{1'}$ is independently a cyclic tertiary hydrocarbyl group. In other embodiments of the invention of Formula (I) or (II), each of $R^1$ and $R^{1'}$ is independently a polycyclic tertiary hydrocarbyl group.

In some embodiments of the invention of Formula (I) or (II), each of $R^1$ and $R^{1'}$ is independently a tertiary hydrocarbyl group. In other embodiments of the invention of Formula (I) or (II), each of $R^1$ and $R^{1'}$ is independently a cyclic tertiary hydrocarbyl group. In other embodiments of the invention of Formula (I) or (II), each of $R^1$ and $R^{1'}$ is independently a polycyclic tertiary hydrocarbyl group.

The linker groups (i.e. $A^3$=$A^2$, and $A^{2'}$=$A^{3'}$ in Formula (I)) are each preferably part of an ortho-phenylene group, preferably a substituted ortho-phenylene group. It is preferred for the $R^7$ and $R^{7'}$ positions of Formula (II) to be hydrogen, or $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as iospropyl, etc. For applications targeting polymers with high tacticity it is preferred for the $R^7$ and $R^{7'}$ positions of Formula (II) to be a $C_1$ to $C_{20}$ alkyl, most preferred for both $R^7$ and $R^{7'}$ to be a $C_1$ to $C_3$ alkyl.

In embodiments of Formula (I) herein, Q is C, N or O, preferably Q is N.

In embodiments of Formula (I) herein, $A^1$ and $A^{1'}$ are independently carbon, nitrogen, or $C(R^{22})$, with $R^{22}$ selected from hydrogen, $C_1$-$C_{20}$ hydrocarbyl, $C_1$-$C_{20}$ substituted hydrocarbyl. Preferably $A^1$ and $A^{1'}$ are carbon.

In embodiments of Formula (I) herein, $A^1QA^{1'}$ in formula I is part of a heterocyclic Lewis base, such as a pyridine, pyrazine, pyrimidine, triazine, thiazole, imidazole, thiophene, oxazole, thiazole, furan, or a substituted variant of thereof.

In embodiments of Formula (I) herein, $A^1QA^{1'}$ are part of a heterocyclic Lewis base containing 2 to 20 non-hydrogen atoms that links $A^2$ to $A^{2'}$ via a 3-atom bridge with Q being the central atom of the 3-atom bridge. Preferably each $A^1$ and $A^{1'}$ is a carbon atom and the $A^1QA^{1'}$ fragment forms part of a pyridine, pyrazine, pyrimidine, triazine, thiazole, imidazole, thiophene, oxazole, thiazole, furan, or a substituted variant of thereof group, or a substituted variant thereof.

In one embodiment of Formula (I) herein, Q is carbon, and each $A^1$ and $A^{1'}$ is N or $C(R^{22})$, where $R^{22}$ is selected from hydrogen, $C_1$-$C_{20}$ hydrocarbyl, $C_1$-$C_{20}$ substituted hydrocarbyl, a heteroatom or a heteroatom-containing group. In this embodiment, the $A^1QA^{1'}$ fragment forms part of a cyclic carbene, N-heterocyclic carbene, cyclic amino alkyl carbene, or a substituted variant of thereof group, or a substituted variant thereof.

In embodiments of Formula (I) herein, $A^{3}{=}A^{2}$, is a divalent group containing 2 to 20 non-hydrogen atoms that links $A^1$ to the E-bonded aryl group via a 2-atom bridge, where the $A^{3}{=}A^{2}$, is a linear alkyl or forms part of a cyclic group (such as an optionally substituted ortho-phenylene group, or ortho-arylene group) or a substituted variant thereof.

$A^{2'}{=}A^{3'}$ is a divalent group containing 2 to 20 non-hydrogen atoms that links $A^{1'}$ to the E'-bonded aryl group via a 2-atom bridge, where the $A^{2'}{=}A^{3'}$ is a linear alkyl or forms part of a cyclic group (such as an optionally substituted ortho-phenylene group, or ortho-arylene group or, or a substituted variant thereof.

In embodiments of the invention herein, in Formula (I) and (II), M is a group 4 metal, such as Hf or Zr.

In embodiments of the invention herein, in Formula (I) and (II), E and E' are O.

In embodiments of the invention herein, in Formula (I) and (II), $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, preferably hydrogen, methyl, ethyl, propyl, butyl, pentyl, hexyl, or an isomer thereof.

In embodiments of the invention herein, in Formula (I) and (II), $R^1$, $R^2$, $R^3$, $R^4$, $R^{1'}$, $R^{2'}$, $R^{3'}$, $R^{4'}$, and $R^9$ are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (I) and (II), $R^4$ and $R^{4'}$ is independently hydrogen or a $C_1$ to $C_3$ hydrocarbyl, such as methyl, ethyl or propyl.

In embodiments of the invention herein, in Formula (I) and (II), $R^9$ is hydrogen, $C_1$-$C_{40}$ hydrocarbyl, $C_1$-$C_{40}$ substituted hydrocarbyl, or a heteroatom-containing group, preferably hydrogen, methyl, ethyl, propyl, butyl, pentyl, hexyl, or an isomer thereof. Preferably $R^9$ is methyl, ethyl, propyl, butyl, $C_1$ to $C_6$ alkyl, phenyl, 2-methylphenyl, 2,6-dimethylphenyl, or 2,4,6-trimethylphenyl.

In embodiments of the invention herein, in Formula (I) and (II), each X is, independently, selected from the group consisting of hydrocarbyl radicals having from 1 to 20 carbon atoms (such as alkyls or aryls), hydrides, amides, alkoxides, sulfides, phosphides, halides, alkyl sulfonates, and a combination thereof, (two or more X's may form a part of a fused ring or a ring system), preferably each X is independently selected from halides, aryls, and $C_1$ to $C_5$ alkyl groups, preferably each X is independently a hydrido, dimethylamido, diethylamido, methyltrimethylsilyl, neopentyl, phenyl, benzyl, methyl, ethyl, propyl, butyl, pentyl, fluoro, iodo, bromo, or chloro group.

Alternatively, each X may be, independently, a halide, a hydride, an alkyl group, an alkenyl group or an arylalkyl group.

In embodiments of the invention herein, in Formula (I) and (II), each L is a Lewis base, independently, selected from the group consisting of ethers, thioethers, amines, nitriles, imines, pyridines, halocarbons, and phosphines, preferably ethers and thioethers, and a combination thereof, optionally two or more L's may form a part of a fused ring or a ring system, preferably each L is independently selected from ether and thioether groups, preferably each L is a ethyl ether, tetrahydrofuran, dibutyl ether, or dimethylsulfide group.

In embodiments of the invention herein, in Formula (I) and (II), $R^1$ and $R^{1'}$ are independently cyclic tertiary alkyl groups.

In embodiments of the invention herein, in Formula (I) and (II), n is 1, 2 or 3, typically 2.

In embodiments of the invention herein, in Formula (I) and (II), m is 0, 1 or 2, typically 0.

In embodiments of the invention herein, in Formula (I) and (II), $R^1$ and $R^{1'}$ are not hydrogen.

In embodiments of the invention herein, in Formula (I) and (II), M is Hf or Zr, E and E' are O; each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, each $R^2$, $R^3$, $R^4$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; each X is, independently, selected from the group consisting of hydrocarbyl radicals having from 1 to 20 carbon atoms (such as alkyls or aryls), hydrides, amides, alkoxides, sulfides, phosphides, halides, and a combination thereof, (two or more X's may form a part of a fused ring or a ring system); each L is, independently, selected from the group consisting of ethers, thioethers, and halo carbons (two or more L's may form a part of a fused ring or a ring system).

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, $C_1$-$C_{40}$ hydrocarbyl, $C_1$-$C_{40}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, methyl, ethyl, propyl, butyl, pentyl, hexyl, or an isomer thereof.

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (II), M is Hf or Zr, E and E' are O; each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, each $R^1$, $R^2$, $R^3$, $R^4$, $R^{1'}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; $R^9$ is hydrogen, $C_1$-$C_{20}$ hydrocarbyl, $C_1$-$C_{20}$ substituted hydrocarbyl, or a heteroatom-containing group, such as hydrogen, methyl, ethyl, propyl, butyl, pentyl, hexyl, or an isomer thereof;

each X is, independently, selected from the group consisting of hydrocarbyl radicals having from 1 to 20 carbon atoms (such as alkyls or aryls), hydrides, amides, alkoxides, sulfides, phosphides, halides, dienes, amines, phosphines, ethers, and a combination thereof, (two or more X's may form a part of a fused ring or a ring system); n is 2; m is 0; and each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, $C_1$-$C_{20}$ hydrocarbyl, $C_1$-$C_{20}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, such as each of $R^5$, $R^6$, $R^7$, $R^8$, $R^{5'}$, $R^{6'}$, $R^{7'}$, $R^{8'}$, $R^{10}$, $R^{11}$ and $R^{12}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthyl, cyclohexyl, cyclohexenyl, methylcyclohexyl, and isomers thereof.

Preferred embodiment of Formula (I) is M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

Preferred embodiment of Formula (I) is M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

Preferred embodiment of Formula (I) is M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

Preferred embodiment of Formula (II) is M is Zr or Hf, both E and E' are oxygen, and both $R^1$ and $R^{1'}$ are $C_4$-$C_{20}$ cyclic tertiary alkyls.

Preferred embodiment of Formula (II) is M is Zr or Hf, both E and E' are oxygen, and both $R^1$ and $R^{1'}$ are adamantan-1-yl or substituted adamantan-1-yl.

Preferred embodiment of Formula (II) is M is Zr or Hf, both E and E' are oxygen, and each of $R^1$, $R^{1'}$, $R^3$ and $R^{3'}$ are adamantan-1-yl or substituted adamantan-1-yl.

Preferred embodiment of Formula (II) is M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

Catalyst compounds that are particularly useful in this invention include one or more of: dimethylzirconium[2',2'''-(pyridine-2,6-diyl)bis(3-adamantan-1-yl)-5-(tert-butyl)-[1,1'-biphenyl]-2-olate)], dimethylhafnium[2',2'''-(pyridine-2,6-diyl)bis(3-adamantan-1-yl)-5-(tert-butyl)-[1,1'-biphenyl]-2-olate)], dimethylzirconium[6,6'-(pyridine-2,6-diylbis(benzo[b]thiophene-3,2-diyl))bis(2-adamantan-1-yl)-4-methylphenolate)], dimethylhafnium[6,6'-(pyridine-2,6-diylbis(benzo[b]thiophene-3,2-diyl))bis(2-adamantan-1-yl)-4-methylphenolate)], dimethylzirconium[2',2'''-(pyridine-2,6-diyl)bis(3-((3r,5r,7r)-adamantan-1-yl)-5-methyl-[1,1'-biphenyl]-2-olate)], dimethylhafnium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)], dimethylhafnium[2',2'''-(pyridine-2,6-diyl)bis(3-((3r,5r,7r)-adamantan-1-yl)-4',5-dimethyl-[1,1'-biphenyl]-2-olate)].

Catalyst compounds that are particularly useful in this invention include those represented by one or more of the formulas:

Complex 1

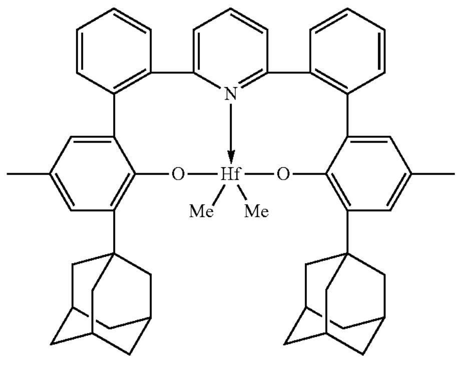

-continued
Complex 2
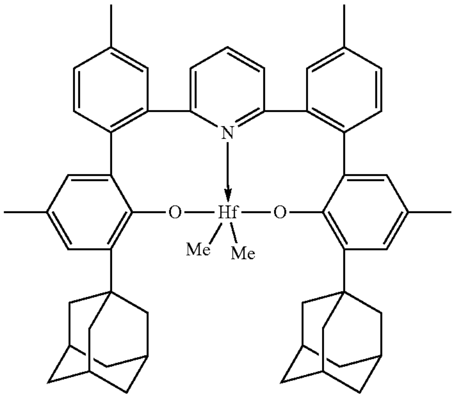
Complex 3
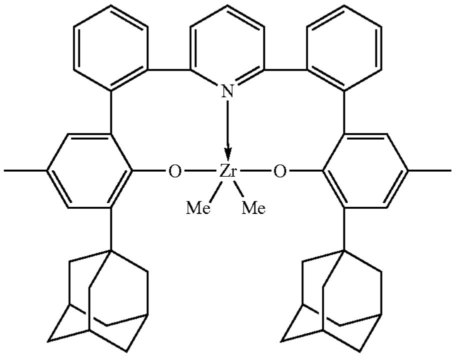
Complex 4
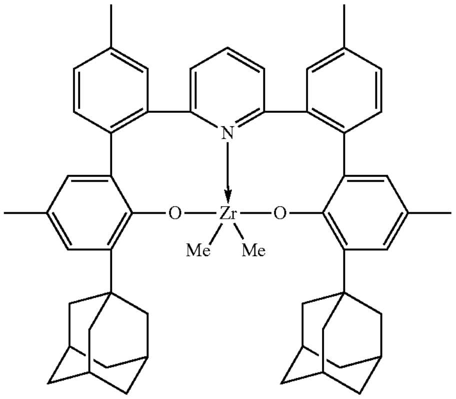
Complex 5
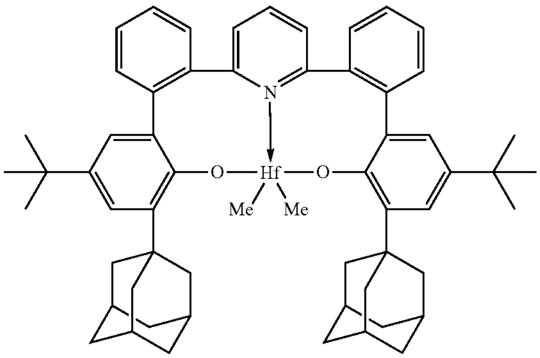
-continued
Complex 6
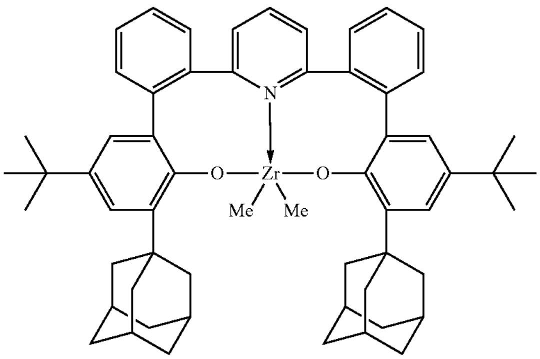
Complex 7
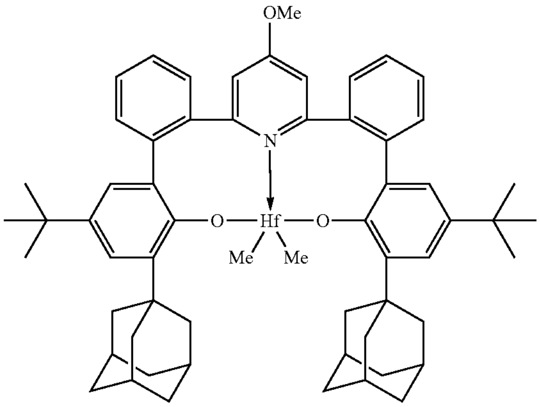
Complex 8
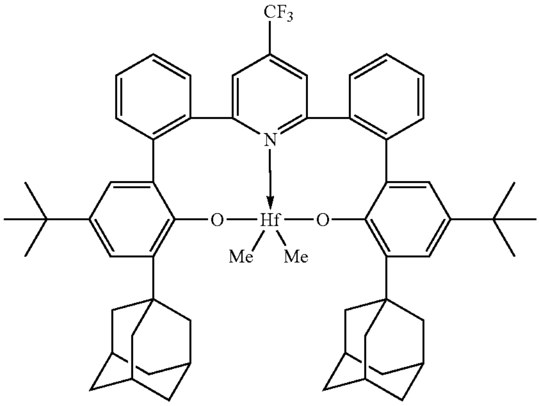
Complex 9
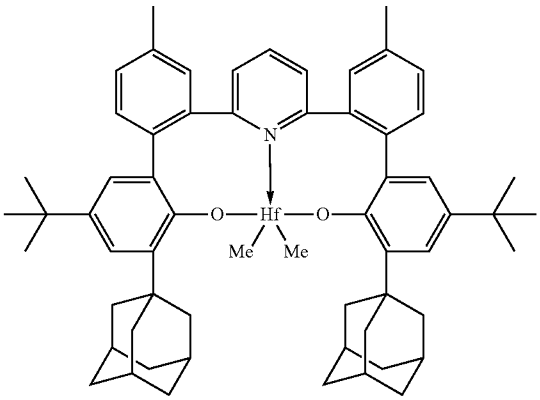

-continued
Complex 10
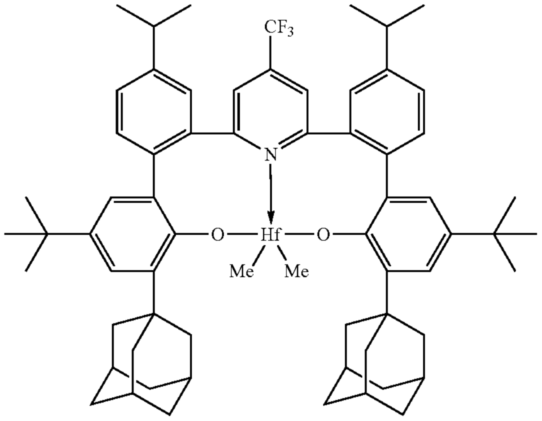
Complex 11
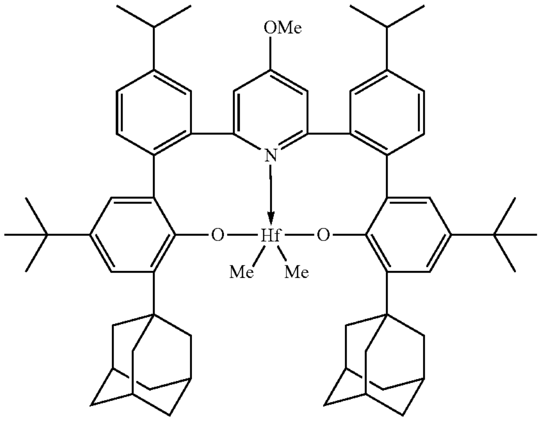
Complex 12
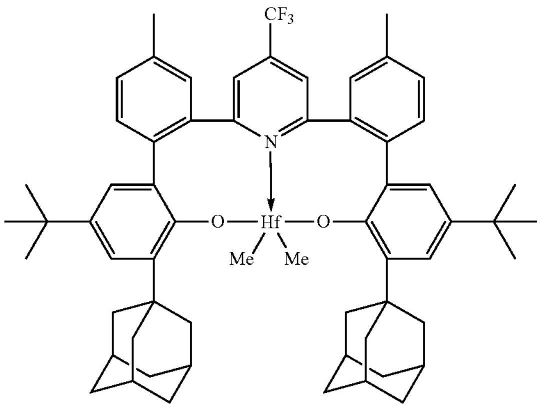
-continued
Complex 13
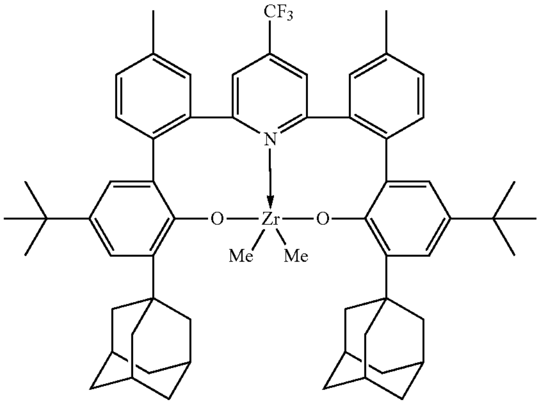
Complex 14
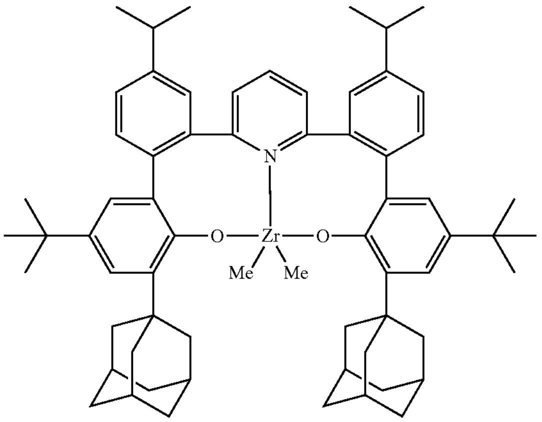
Complex 15
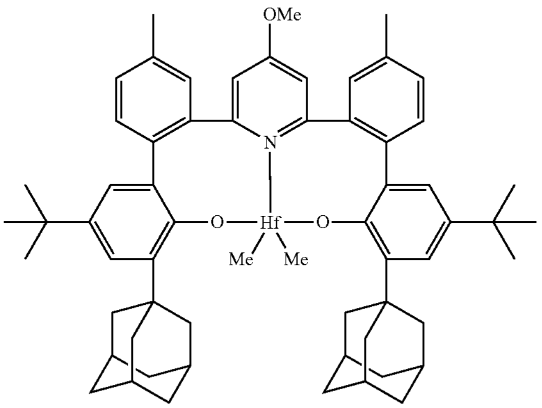

-continued
Complex 16
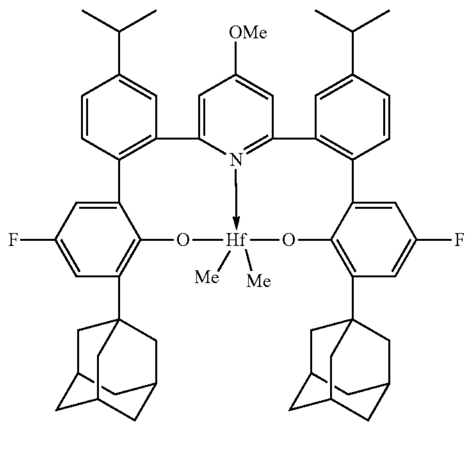
Complex 17
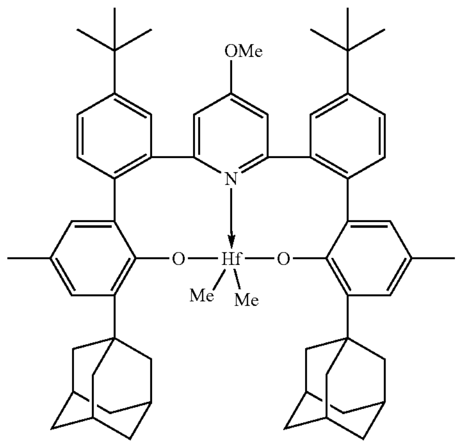
Complex 18
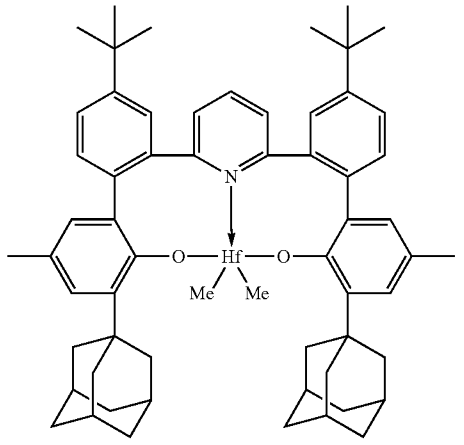
-continued
Complex 19
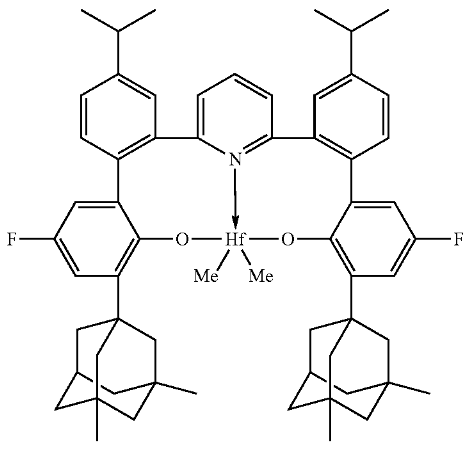
Complex 20
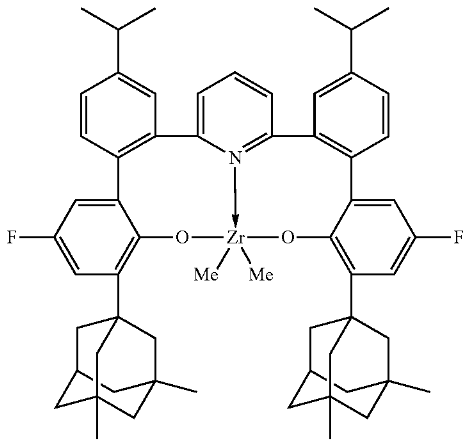
Complex 21
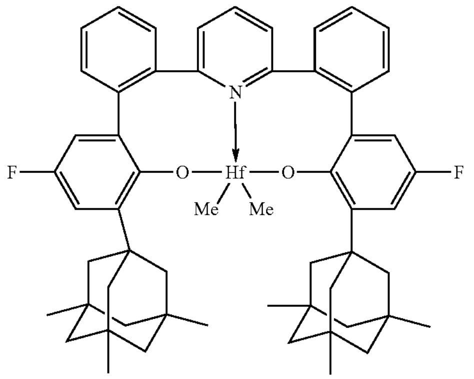

-continued
Complex 22
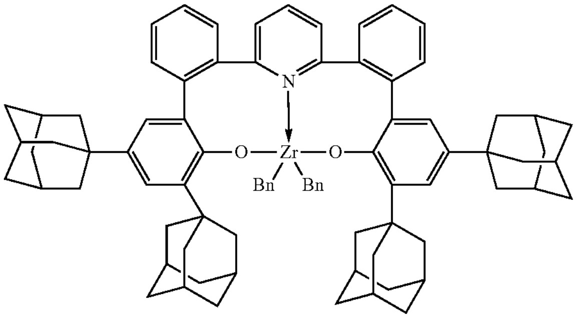
Complex 23
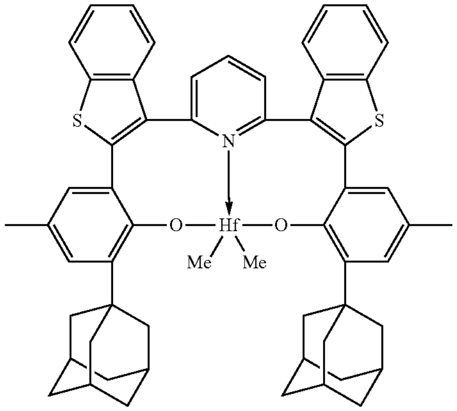
Complex 24
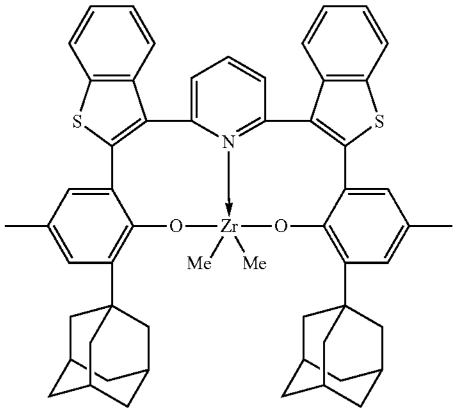
-continued
Complex 25
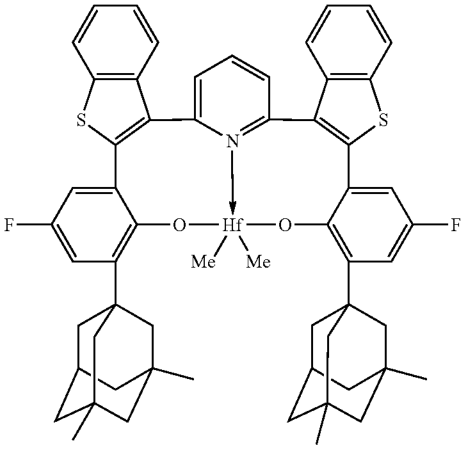
Complex 26
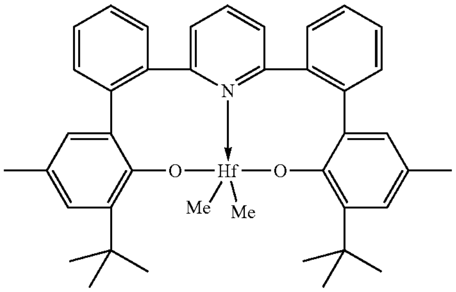
Complex 27
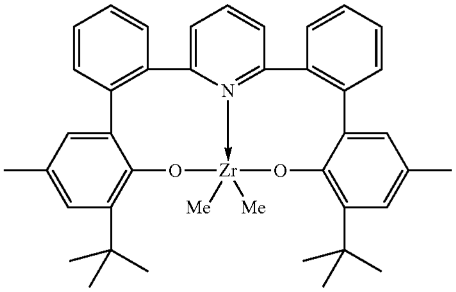
Complex 29
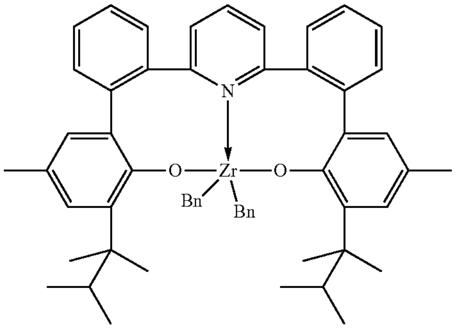

-continued

Complex 30

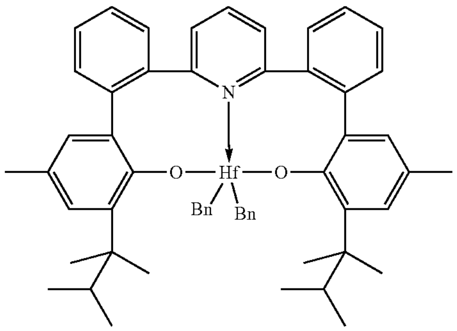

Complex 31

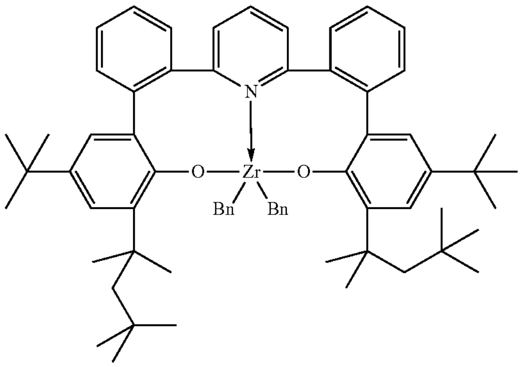

Complex 32

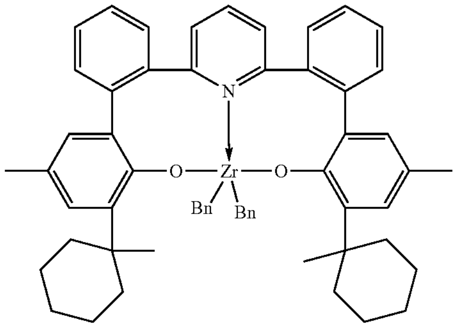

Complex 33

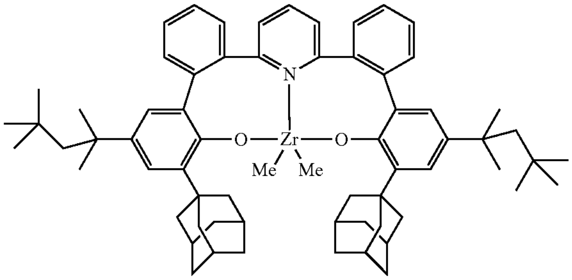

In some embodiments, two or more different catalyst compounds are present in the catalyst system used herein. In some embodiments, two or more different catalyst compounds are present in the reaction zone where the process (es) described herein occur. It is preferable to use the same activator for the transition metal compounds, however, two different activators, such as a non-coordinating anion activator and an alumoxane, can be used in combination. If one or more transition metal compounds contain an X group which is not a hydride, hydrocarbyl, or substituted hydrocarbyl, then the alumoxane can be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds.

Ligand Synthesis

The bis(phenol) ligands may be prepared using the general methods shown in Scheme 1. The formation of the bis(phenol) ligand by the coupling of compound A with compound B (method 1) may be accomplished by known Pd- and Ni-catalyzed couplings, such as Negishi, Suzuki, or Kumada couplings. The formation of the bis(phenol) ligand by the coupling of compound C with compound D (method 2) may also be accomplished by known Pd- and Ni-catalyzed couplings, such as Negishi, Suzuki, or Kumada couplings. Compound D may be prepared from compound E by reaction of compound E with either an organolithium reagent or magnesium metal, followed by optional reaction with a main-group metal halide (e.g. $ZnCl_2$) or boron-based reagent (e.g. $B(O^iPr)_3$, $^iPrOB(pin)$). Compound E may be prepared in a non-catalyzed reaction from by the reaction of an aryllithium or aryl Grignard reagent (compound F) with a dihalogenated arene (compound G), such as 1-bromo-2-chlorobenzene. Compound E may also be prepared in a Pd- or Ni-catalyzed reaction by reaction of an arylzinc or arylboron reagent (compound F) with a dihalogenated arene (compound G).

Scheme 1.

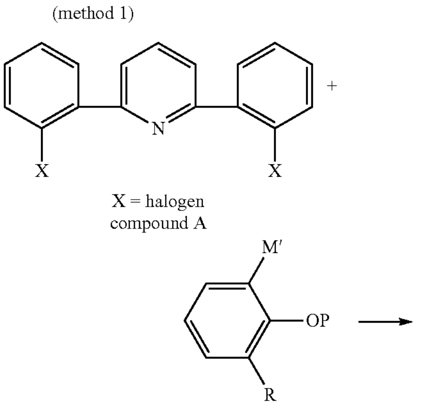

-continued

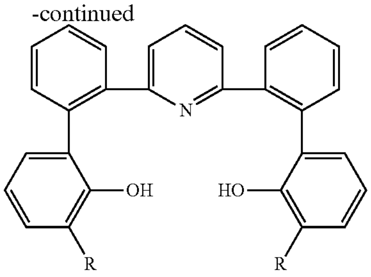

bis(phenol) ligand (method 2)

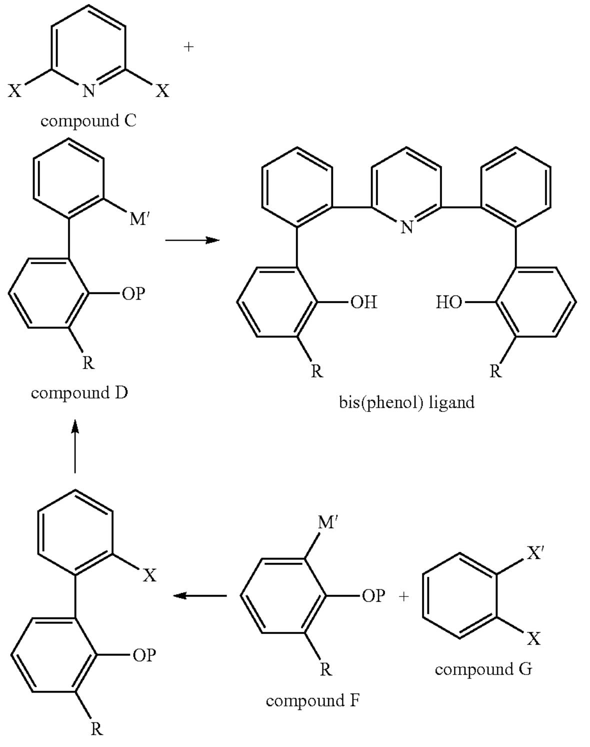

compound C compound D bis(phenol) ligand

X = halogen
compound E compound F compound G where M' is a group 1, 2, 12, or 13 element or substituted element such as Li, MgCl, MgBr, ZnCl, $B(OH)_2$, B(pinacolate), P is a protective group such as methoxymethyl (MOM), tetrahydropyranyl (THP), t-butyl, allyl, ethoxymethyl, trialkylsilyl, t-butyldimethylsilyl, or benzyl, R is a $C_1$-$C_{40}$ alkyl, substituted alkyl, aryl, tertiary alkyl, cyclic tertiary alkyl, adamantanyl, or substituted adamantanyl and each X' and X is halogen, such as Cl, Br, F or I.

It is preferred that the bis(phenol) ligand and intermediates used for the preparation of the bis(phenol) ligand are prepared and purified without the use of column chromatography. This may be accomplished by a variety of methods that include distillation, precipitation and washing, formation of insoluble salts (such as by reaction of a pyridine derivative with an organic acid), and liquid-liquid extraction. Preferred methods include those described in Practical Process Research and Development—*A Guide for Organic Chemists* by Neal C. Anderson (ISBN: 1493300125X).

Synthesis of Carbene Bis(Phenol) Ligands

The general synthetic method to produce carbene bis (phenol) ligands is shown in Scheme 2. A substituted phenol can be ortho-brominated then protected by a known phenol protecting group, such as methoxymethylether (MOM), tetrahydropyranylether (THP), t-butyldimethylsilyl (TBDMS), benzyl (Bn), etc. The bromide is then converted to a boronic ester (compound I) or boronic acid which can be used in a Suzuki coupling with bromoaniline. The biphenylaniline (compound J) can be bridged by reaction with dibromoethane or condensation with oxalaldehyde, then deprotected (compound K). Reaction with triethyl orthoformate forms an iminium salt that is deprotonated to a carbene.

Scheme 2.

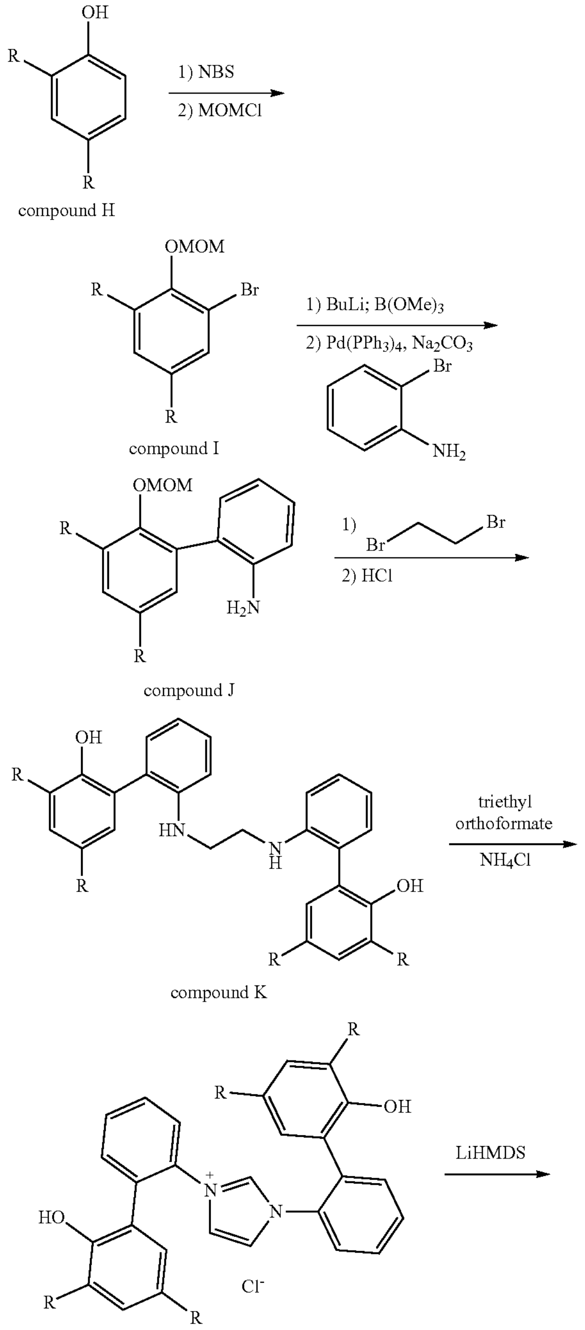

compound H compound I compound J compound K iminium salt of bis(phenol) carbene ligand -continued

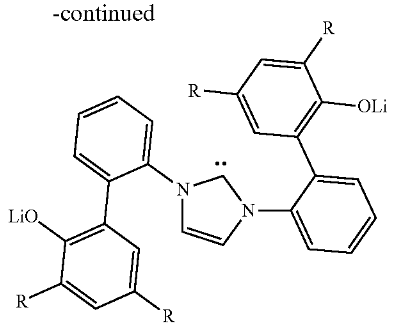

lithium bis(phenolate) carbene

To substituted phenol (compound H) dissolved in methylene chloride, is added an equivalent of N-bromosuccinimide and 0.1 equivalent of diisopropylamine. After stirring at ambient temperature until completion, the reaction is quenched with a 10% solution of HCl. The organic portion is washed with brine, dried over magnesium sulfate, filtered, and concentrated under reduced pressure to give a bromophenol, typically as a solid. The substituted bromophenol, methoxymethylchloride, and potassium carbonate are dissolved in dry acetone and stirred at ambient temperature until completion of the reaction. The solution is filtered and the filtrate concentrated to give protected phenol (compound I). Alternatively, the substituted bromophenol and an equivalent of dihydropyran is dissolved in methylene chloride and cooled to 0° C. A catalytic amount of para-toluenesulfonic acid is added and the reaction stirred for 10 minutes, then quenched with trimethylamine. The mixture is washed with water and brine, then dried over magnesium sulfate, filtered, and concentrated under reduced pressure to give a tetrahydropyran-protected phenol.

Aryl bromide (compound I) is dissolved in THF and cooled to −78° C. n-Butyllithium is added slowly, followed by trimethoxy borate. The reaction is allowed to stir at ambient temperature until completion. The solvent is removed and the solid boronic ester washed with pentane. A boronic acid can be made from the boronic ester by treatment with HCl. The boronic ester or acid is dissolved in toluene with an equivalent of ortho-bromoaniline and a catalytic amount of palladium tetrakistriphenylphosphine. An aqueous solution of sodium carbonated is added and the reaction heated at reflux overnight. Upon cooling, the layers are separated and the aqueous layer extracted with ethyl acetate. The combined organic portions are washed with brine, dried ($MgSO_4$), filtered, and concentrated under reduced pressure. Column chromatography is typically used to purify the coupled product (compound J).

The aniline (compound J) and dibromoethane (0.5 equiv.) are dissolved in acetonitrile and heated at 60° C. overnight. The reaction is filtered and concentrated to give an ethylene bridged dianiline. The protected phenol is deprotected by reaction with HCl to give a bridged bisamino(biphenyl)ol (compound K).

The diamine (compound K) is dissolved in triethylorthoformate. Ammonium chloride is added and the reaction heated at reflux overnight. A precipitate is formed which is collected by filtration and washed with ether to give the iminium salt. The iminium chloride is suspended in THF and treated with lithium or sodium hexamethyldisilylamide. Upon completion, the reaction is filtered and the filtrate concentrated to give the carbene ligand.

Preparation of Bis(Phenolate) Complexes

Transition metal or Lanthanide metal bis(phenolate) complexes are used as catalyst components for olefin polymerization in the present invention. The terms "catalyst" and "catalyst complex" are used interchangeably. The preparation of transition metal or Lanthanide metal bis(phenolate) complexes may be accomplished by reaction of the bis (phenol) ligand with a metal reactant containing anionic basic leaving groups. Typical anionic basic leaving groups include dialkylamido, benzyl, phenyl, hydrido, and methyl. In this reaction, the role of the basic leaving group is to deprotonate the bis(phenol) ligand. Suitable metal reactants for this type of reaction include, but are not limited to, $HfBn_4$ ($Bn{=}CH_2Ph$), $ZrBn_4$, $TiBn_4$, $ZrBn_2Cl_2(OEt_2)$, $HfBn_2Cl_2(OEt_2)_2$, $Zr(NMe_2)_2Cl_2$(dimethoxyethane), $Zr(NEt_2)_2Cl_2$(dimethoxyethane), $Hf(NEt_2)_2Cl_2$(dimethoxyethane), $Hf(NMe_2)_2Cl_2$(dimethoxyethane), $Hf(NMe_2)_4$, $Zr(NMe_2)_4$, and $Hf(NEt_2)_4$. Suitable metal reagents also include $ZrMe_4$, $HfMe_4$, and other group 4 alkyls that may be formed in situ and used without isolation. Preparation of transition metal bis(phenolate) complexes is typically performed in etherial or hydrocarbon solvents or solvent mixtures at temperatures typically ranging from −80° C. to 120° C.

A second method for the preparation of transition metal or Lanthanide bis(phenolate) complexes is by reaction of the bis(phenol) ligand with an alkali metal or alkaline earth metal base (e.g., Na, BuLi, $^{i}$PrMgBr) to generate deprotonated ligand, followed by reaction with a metal halide (e.g., $HfCl_4$, $ZrCl_4$) to form a bis(phenolate) complex. Bis(phenolate) metal complexes that contain metal-halide, alkoxide, or amido leaving groups may be alkylated by reaction with organolithium, Grignard, and organoaluminum reagents. In the alkylation reaction the alkyl groups are transferred to the bis(phenolate) metal center and the leaving groups are removed. Reagents typically used for the alkylation reaction include, but are not limited to, MeLi, MeMgBr, $AlMe_3$, $Al(^{i}Bu)_3$, $AlOct_3$, and $PhCH_2MgCl$. Typically 2 to 20 molar equivalents of the alkylating reagent are added to the bis (phenolate) complex. The alkylations are generally performed in etherial or hydrocarbon solvents or solvent mixtures at temperatures typically ranging from −80° C. to 120° C.

Activators

The terms "cocatalyst" and "activator" are used herein interchangeably.

The catalyst systems described herein typically comprises a catalyst complex, such as the transition metal or Lanthanide bis(phenolate) complexes described above, and an activator such as alumoxane or a non-coordinating anion. These catalyst systems may be formed by combining the catalyst components described herein with activators in any manner known from the literature. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, ionizing activators, which may be neutral or ionic, and conventional-type cocatalysts. Preferred activators typically include alumoxane compounds, modified alumoxane compounds, and ionizing anion precursor compounds that abstract a reactive metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^{99}$)—O— sub-units, where $R^{99}$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), typically the maximum amount of activator is at up to a 5,000-fold molar excess Al/M over the catalyst compound (per metal catalytic site). The minimum activator-to-catalyst-compound is a 1:1 molar ratio. Alternate preferred ranges include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. Preferably, alumoxane is present at zero mole %, alternatively the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl) boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (III):

$$(Z)_d \quad + \quad (A^{d-}) \qquad \text{(III)}$$

wherein Z is (L-H) or a reducible Lewis Acid, L is an neutral Lewis base; H is hydrogen; $(L\text{-}H)^+$ is a Bronsted acid; $A^{d-}$ is a non-coordinating anion having the charge d−; and d is an integer from 1 to 3 (such as 1, 2 or 3), preferably Z is $(Ar_3C^+)$, where Ar is aryl or aryl substituted with a heteroatom, a $C_1$ to $C_{40}$ hydrocarbyl, or a substituted $C_1$ to $C_{40}$ hydrocarbyl. The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable $A^{d-}$ also include diboron compounds as disclosed in U.S. Pat. No. 5,447,895, which is fully incorporated herein by reference.

When Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_{d+}[Mt^{k+}Q_n]^{d-} \quad (V)$$

wherein:

E is nitrogen or phosphorous;

d is 1, 2 or 3; k is 1, 2, or 3; n is 1, 2, 3, 4, 5, or 6; n−k=d (preferably d is 1, 2 or 3; k is 3; n is 4, 5, or 6);

$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms;

Mt is an element selected from group 13 of the Periodic Table of the Elements, such as B or Al; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

$$[R^{1'}R^{2'}R^{3'}EH]^+[BR^{4'}R^{5'}R^{6'}R^{7'}]^- \quad (VI)$$

wherein: E is nitrogen or phosphorous; $R^{1'}$ is a methyl group; $R^{2'}$ and $R^{3'}$ are independently is $C_4$-$C_{50}$ hydrocarbyl group optionally substituted with one or more alkoxy groups, silyl groups, a halogen atoms, or halogen containing groups wherein $R^{2'}$ and $R^{3'}$ together comprise 14 or more carbon atoms; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

(VII)

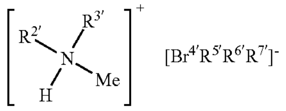

and

-continued (VIII)

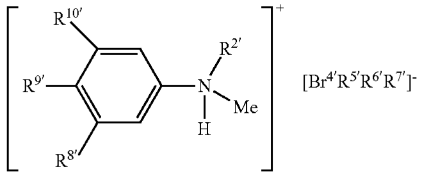

wherein:

N is nitrogen;

$R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms;

$R^{8'}$, $R^{9'}$, and $R^{10'}$ are independently a $C_4$-$C_{30}$ hydrocarbyl or substituted $C_4$-$C_{30}$ hydrocarbyl group;

B is boron;

and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII), or (VIII) herein, $R^{4'}$, $R^{5'}$, $R^{6'}$, and $R^{7'}$ are pentafluorophenyl.

Optionally, in any of Formulas (V), (VI), (VII), or (VIII) herein, $R^{4'}$, $R^{5'}$, $R^{6'}$, and $R^{7'}$ are perfluoronaphthalen-2-yl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_5$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternatively $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalen-2-yl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalen-2-yl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternatively when Q is a substituted phenyl group, then $R^{2'}$ is not a $C_1$-$C_{40}$ linear alkyl group, preferably $R^{2'}$ is not an optionally substituted $C_1$-$C_{40}$ linear alkyl group). Optionally, when Q is a fluorophenyl group (alternatively when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$, is not methyl, $R^{2'}$ is not $C_{18}$ alkyl and $R^{3'}$ is not $C_{18}$ alkyl, alternatively $R^{1'}$, is not methyl, $R^{2'}$ is not $C_{18}$ alkyl and $R^{3'}$ is not $C_{18}$ alkyl and at least one Q is not substituted phenyl, optionally all Q are not substituted phenyl.

Useful cation components in Formulas (III) and (V) to (VIII) include those represented by the formula:

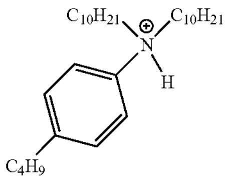
10

-continued

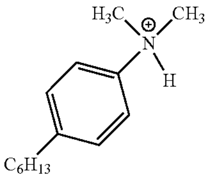
11

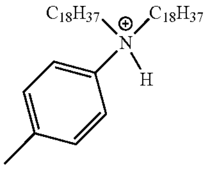
12

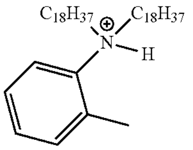
13

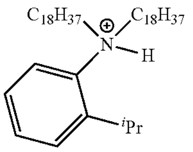
14

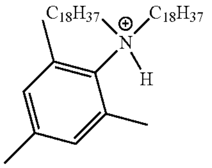
15

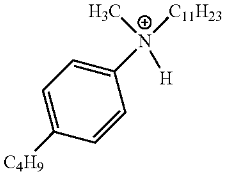
16

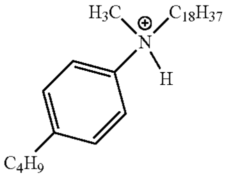
17

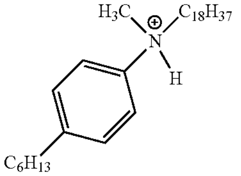
18

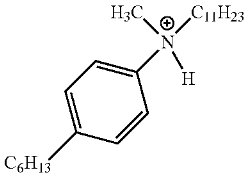
19

-continued
20
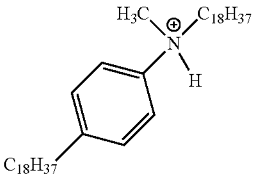
21
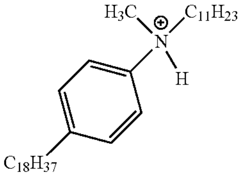
22
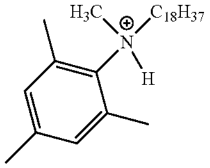
23
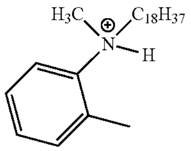
24
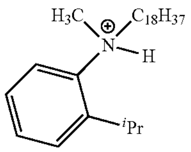
25
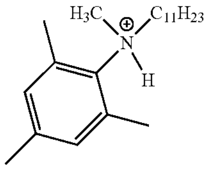
26
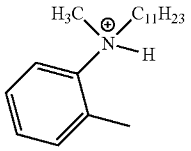
27
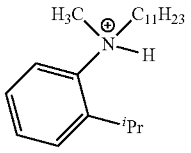
29
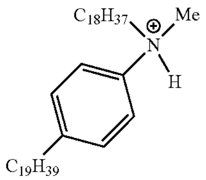
-continued
28
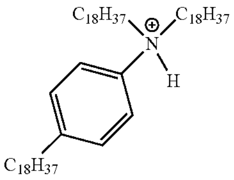
30
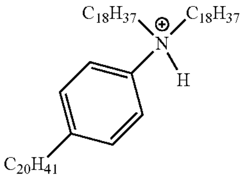
31
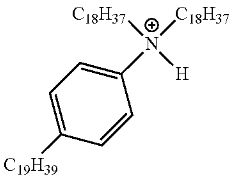
32
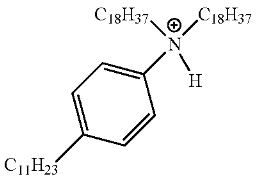
33
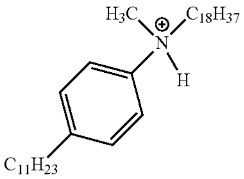
34
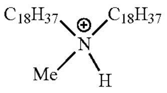
35
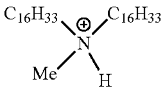
36
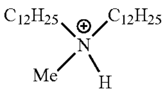
Useful cation components in Formulas (III) and (V) to (VIII) include those represented by the formulas:
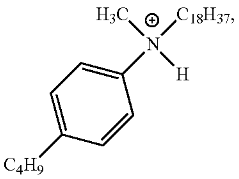

-continued

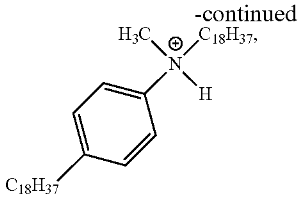

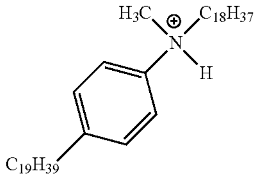

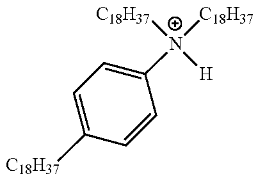

and

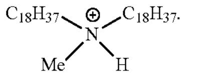

The anion component of the activators described herein includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphthalen-2-yl)borate.

In one embodiment, the borate activator comprises tetrakis(pentafluorophenyl)borate.

Anions for use in the non-coordinating anion activators described herein also include those represented by Formula 7, below:

Formula 7

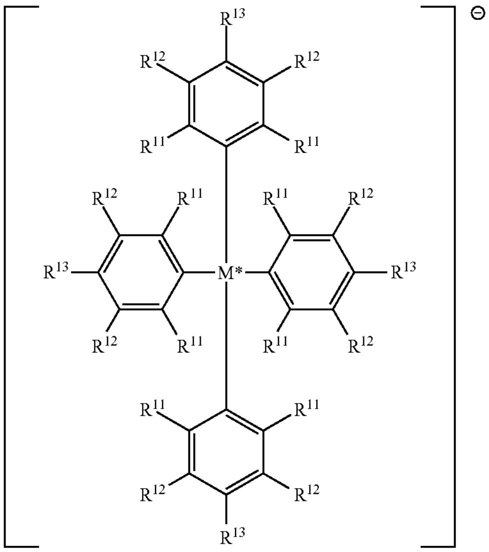

wherein:

M* is a group 13 atom, preferably B or Al, preferably B;

each $R^{11}$ is, independently, a halide, preferably a fluoride;

each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;

each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;

wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education, v.* 71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE A

| Element | Relative Volume |
|---|---|
| H | 1 |
| 1$^{st}$ short period, Li to F | 2 |
| 2$^{nd}$ short period, Na to Cl | 4 |

TABLE A-continued

| Element | Relative Volume |
|---|---|
| 1$^{st}$ long period, K to Br | 5 |
| 2$^{nd}$ long period, Rb to I | 7.5 |
| 3$^{rd}$ long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | $V_s$ | MV Per subst. (Å$^3$) | Calculated Total MV (Å$^3$) |
|---|---|---|---|---|---|
| tetrakis(perfluorophenyl)borate | 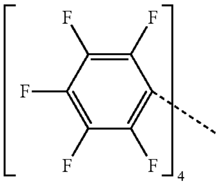 | $C_6F_5$ | 22 | 183 | 732 |
| tris(perfluorophenyl)-(perfluoronaphthalen-2-yl)borate | 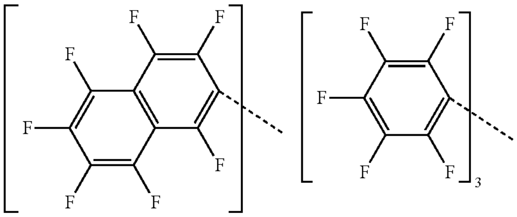 | $C_6F_5$<br>$C_{10}F_7$ | 22<br>34 | 183<br>261 | 810 |
| (perfluorophenyl)tris-(perfluoronaphthalen-2-yl)borate | 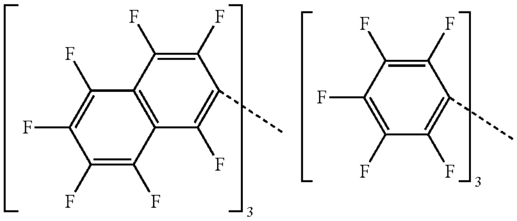 | $C_6F_5$<br>$C_{10}F_7$ | 22<br>34 | 183<br>261 | 966 |
| tetrakis(perfluoronaphthalen-2-yl)borate | 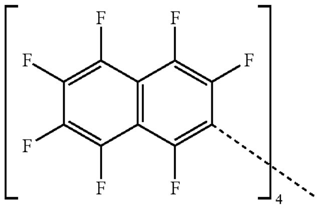 | $C_{10}F_7$ | 34 | 261 | 1044 |
| tetrakis(perfluorobiphenyl)borate | 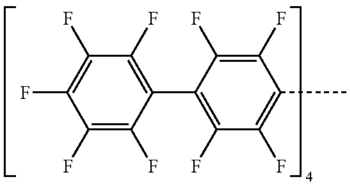 | $C_{12}F_9$ | 42 | 349 | 1396 |

TABLE B-continued

| Ion | Structure of Boron Substituents | Molecular Formula of Each Substituent | $V_s$ | MV Per subst. (Å$^3$) | Calculated Total MV (Å$^3$) |
|---|---|---|---|---|---|
| $[(C_6F_3(C_6F_5)_2)_4B]$ | 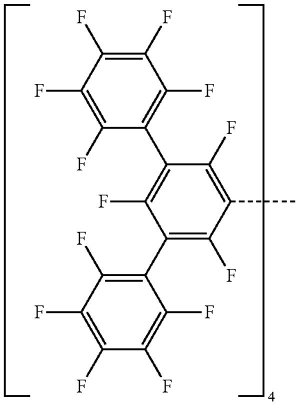 | $C_{18}F_{13}$ | 62 | 515 | 2060 |

The activators may be added to a polymerization in the form of an ion pair using, for example, [M2HTH]+[NCA]− in which the di(hydrogenated tallow)methylamine ("M2HTH") cation reacts with a basic leaving group on the transition metal complex to form a transition metal complex cation and [NCA]−. Alternatively, the transition metal complex may be reacted with a neutral NCA precursor, such as $B(C_6F_5)_3$, which abstracts an anionic group from the complex to form an activated species. Useful activators include di(hydrogenated tallow)methylammonium[tetrakis(pentafluorophenyl)borate] (i.e., $[M2HTH]B(C_6F_5)_4$) and di(octadecyl)tolylammonium [tetrakis(pentafluorophenyl)borate] (i.e., $[DOdTH]B(C_6F_5)_4$).

Activator compounds that are particularly useful in this invention include one or more of:

N,N-di(hydrogenated tallow)methylammonium [tetrakis (perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl) borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate], N-dodecyl-N-decyl-tolylammonium [tetrakis(perfluorophenyl)borate], N-methyl-N-octadecylanilinium [tetrakis(perfluorophenyl) borate], N-methyl-N-hexadecylanilinium [tetrakis(perfluorophenyl) borate], N-methyl-N-tetradecylanilinium [tetrakis(perfluorophenyl) borate], N-methyl-N-dodecylanilinium [tetrakis(perfluorophenyl) borate], N-methyl-N-decylanilinium [tetrakis(perfluorophenyl)borate], and N-methyl-N-octylanilinium [tetrakis(perfluorophenyl)borate].

Additional useful activators and the synthesis non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred activators for use herein also include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalen-2-yl)borate, N,N-dimethylanilinium tetrakis(perfluoronaphthalen-2-yl) borate, N,N-dimethylanilinium tetrakis(perfluorobiphenyl) borate, N,N-dimethylanilinium tetrakis(perfluorophenyl)borate, N,N-dimethylanilinium tetrakis(3,5-bis (trifluoromethyl)phenyl)borate, triphenylcarbenium tetrakis (perfluoronaphthalen-2-yl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$; 1-(4-(tris(pentafluorophenyl)borate)-2,3,5,6-tetrafluorophenyl)pyrrolidinium; and tetrakis (pentafluorophenyl)borate, 4-(tris(pentafluorophenyl) borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthalen-2-yl)borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis (perfluoronaphthalen-2-yl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthalen-2-yl)borate, N,N-dialkylanilinium tetrakis(perfluoronaphthalen-2-yl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternatively from 0.5:1 to 200:1, alternatively from 1:1 to 500:1 alternatively from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 (the disclosures of which are incorporated herein by reference in their entirety) which discuss the use of an alumoxane in combination with an ionizing activator).

Optional Scavengers, Co-Activators, Chain Transfer Agents

In addition to activator compounds, scavengers or co-activators may be used. A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Co-activators can include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used as scavengers to deactivate impurities in feed or reactors.

Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and dialkyl zinc, such as diethyl zinc.

Chain transfer agents may be used in the compositions and or processes described herein. Useful chain transfer agents are typically hydrogen, alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Polymerization Processes

Solution polymerization processes can be used to carry out the polymerization reactions disclosed herein in any suitable manner known to one having ordinary skill in the art. In particular embodiments, the polymerization processes may be carried out in continuous polymerization processes. The term "batch" refers to processes in which the complete reaction mixture is withdrawn from the polymerization reactor vessel at the conclusion of the polymerization reaction. In contrast, in a continuous polymerization process, one or more reactants are introduced continuously to the reactor vessel and a solution comprising the polymer product is withdrawn concurrently or near concurrently. A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, et al. (2000) *Ind. Eng. Chem. Res*., v. 29, pgs. 4627.

In a typical solution process, catalyst components, solvent, monomers and hydrogen (when used) are fed under pressure to one or more reactors. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The monomers are dissolved/dispersed in the solvent either prior to being fed to the first reactor or dissolve in the reaction mixture. The solvent and monomers are generally purified to remove potential catalyst poisons prior entering the reactor. The feedstock may be heated or cooled prior to feeding to the first reactor. Additional monomers and solvent may be added to the second reactor, and it may be heated or cooled. The catalysts/activators can be fed in the first reactor or split between two reactors. In solution polymerization, polymer produced is soluble and remains dissolved in the solvent under reactor conditions, forming a polymer solution (also referred as to effluent).

The solution polymerization process of this invention uses stirred reactor system comprising one or more stirred polymerization reactors. Generally the reactors should be operated under conditions to achieve a thorough mixing of the reactants. In a multiple reactor system, the first polymerization reactor preferably operates at lower temperature. The residence time in each reactor will depend on the design and the capacity of the reactor. The catalysts/activators can be fed into the first reactor only or split between two reactors. In an alternative embodiment, a loop reactor and plug flow reactors are can be employed for current invention.

The polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. The lean phase and volatiles removed downstream of the liquid phase separation can be recycled to be part of the polymerization feed.

A polymer can be recovered from the effluent of either reactor or the combined effluent, by separating the polymer from other constituents of the effluent. Conventional separation means may be employed. For example, polymer can be recovered from effluent by coagulation with a non-solvent such as isopropyl alcohol, acetone, or n-butyl alcohol, or the polymer can be recovered by heat and vacuum stripping the solvent or other media with heat or steam. One or more conventional additives such as antioxidants can be incorporated in the polymer during the recovery procedure. Other methods of recovery such as by the use of lower critical solution temperature (LCST) followed by devolatilization are also envisioned.

Suitable diluents/solvents for conducting the polymerization reaction include non-coordinating, inert liquids. In particular embodiments, the reaction mixture for the solution polymerization reactions disclosed herein may include at least one hydrocarbon solvent. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); halogenated and perhalogenated hydrocarbons, such as perfluorinated $C_4$-$C_{10}$ alkanes, chlorobenzene, and mixtures thereof; and aromatic and alkyl-substituted aromatic compounds, such as benzene, toluene, mesitylene, ethylbenzene, xylene, and mixtures thereof. Mixtures of any of the foregoing hydrocarbon solvents may also be used. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

Any olefinic feed can be polymerized using polymerization methods and solution polymerization conditions disclosed herein. Suitable olefinic feeds may include any $C_2$-$C_{40}$ alkene, which may be straight chain or branched, cyclic or acyclic, and terminal or non-terminal, optionally containing heteroatom substitution. In more specific embodiments, the olefinic feed may comprise a $C_2$-$C_{20}$ alkene, particularly linear alpha olefins, such as, for example, ethene, propene, 1-butene, 1-pentene, 1-hexene, 1-octene, 1-decene, or 1-dodecene. Other suitable olefinic monomers may include ethylenically unsaturated monomers, vinyl monomers and cyclic olefins. Non-limiting olefinic monomers may also include norbomene, isobutylene, isoprene, vinylbenzocyclobutane, styrene, alkyl substituted styrene, cyclopentene, and cyclohexene. Any single olefinic monomer or any mixture of olefinic monomers may undergo polymerization according to the disclosure herein. Alternatively, diene is absent from the olefinic feed used herein.

In more particular embodiments, the one or more olefinic monomers present in the reaction mixtures disclosed herein comprise at least ethylene and propylene.

Preferred polymerizations can be run at any temperature and/or pressure suitable to obtain the desired polymers. Solution polymerization conditions suitable for use in the polymerization processes disclosed herein include temperatures ranging from about 0° C. to about 300° C., or from about 20° C. to about 200° C., or from about 35° C. to about 180° C. or from about 70° C. to about 140° C., or from about 60° C. to about 180° C., or from about 70° C. to about 170° C., or from about 90° C. to about 160°, or from about 100° C. to about 170° C. Pressures may range from about 0.1 MPa to about 15 MPa, or from about 0.2 MPa to about 12 MPa, or from about 0.5 MPa to about 10 MPa, or from about 1 MPa to about 7 MPa. Polymerization run times (residence time) may range up to about 300 minutes, particularly in a range from about 5 minutes to about 250 minutes, or from about 10 minutes to about 120 minutes.

Small amounts of hydrogen, for example 1-5,000 parts per million (ppm) by weight, based on the total solution fed to the reactor may be added to one or more of the feed streams of the reactor system in order to improve control of the melt index and/or molecular weight distribution. In some embodiments, hydrogen may be included in the reactor vessel in the solution polymerization processes. According to various embodiments, the concentration of hydrogen gas in the reaction mixture may range up to about 5,000 ppm, or up to about 4,000 ppm, or up to about 3,000 ppm, or up to about 2,000 ppm, or up to about 1,000 ppm, or up to about 500 ppm, or up to about 400 ppm, or up to about 300 ppm, or up to about 200 ppm, or up to about 100 ppm, or up to about 50 ppm, or up to about 10 ppm, or up to about 1 ppm. In some or other embodiments, hydrogen gas may be present in the reactor vessel at a partial pressure of about 0.007 to 345 kPa, or about 0.07 to 172 kPa, or about 0.7 to 70 kPa. In some embodiments hydrogen may not be added.

In one embodiment, the catalyst productivity for the propylene copolymer in the polymerization process is 100,000 kg polymer per kg of catalyst or more, 200,000 kg polymer per kg of catalyst or more, 300,000 kg polymer per kg of catalyst or more, 400,000 kg polymer per kg of catalyst or more, 500,000 kg polymer per kg of catalyst or more, 800,000 kg polymer per kg of catalyst or more, 1,000,000 kg polymer per kg of catalyst or more.

Propylene copolymers with long chain branching (LCB) architectures has advantage in a number of applications. In addition to the catalyst, process conditions play important roles in enhancing production of LCB products. In one embodiment, the polymerization is carried out at process condition with high polymer concentration and low monomer concentration. Preferably, the polymer concentration is 8 wt % or more, or 10 wt % or more, or 15 wt % or more, or 20 wt % or more. The ethylene concentration is 2 mole/liter or less, or 1.5 mole/liter or less, or 1.0 mole/liter or less, or 0.5 mole/liter or less, or 0.2 mole/liter or less. High monomer conversion is also in favor to the production of LCB polymer. In a preferred embodiment, the conversion is 30% or more, or 40% or more, or 50% or more, or 60% or more, or 70% or more, or 80% or more, or 85% or more, or 90% or more or 95% or more.

It was discovered that the inventive catalyst has the capability of producing high molecular weight and high tacticity propylene copolymer at high polymerization temperatures. In one embodiment, the polymerization temperatures in the polymerization process is 70° C. or higher, 80° C. or higher, 90° C. or higher, 100° C. or higher, 110° C. or higher, 120° C. or higher, 130° C. or higher, 140° C. or higher, 150° C. or higher. Molecular weight of the propylene copolymer decreases with polymerization temperature and increases with monomer concentration in the reaction media. Alternatively, the polymerization temperature is at least of TP1, wherein TP1=59.97*EXP(0.0115*MFR). Preferably, the polymerization temperature is at least of TP2, wherein TP2=60.199*EXP(0.0142*MFR). The unit of TP1 and TP2 is in ° C., MFR is melt flow rate in g/10 minutes measured at a temperature of 230° C. and a weight of 2.16 kg according to ASTM D1238.

In a preferred embodiment, the polymerization: 1) is conducted at temperatures of 70° C. or higher (preferably 80° C. or higher, preferably 85° C. or higher); 2) is conducted at a pressure of atmospheric pressure to 15 MPa (preferably from 0.35 to 12 MPa, preferably from 0.45 to 10 MPa, preferably from 0.5 to 10 MPa); 3) is conducted in an aliphatic hydrocarbon solvent (such as, isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics (such as toluene) are preferably present in the solvent at less than 1 wt %, preferably less than 0.5 wt %, preferably at 0 wt % based upon the weight of the solvents); 4) the polymerization preferably occurs in one reaction zone; 5) the productivity of the catalyst compound is 200,000 kg of polymer per kg of catalyst or more (preferably 300,000 kg of polymer per kg of catalyst or more, such as 350,000 kg of polymer per kg of catalyst or more, such as 400,000 kg of polymer per kg of catalyst or more, such as 500,000 kg of polymer per kg of catalyst or more, such as the catalyst efficiency can be of from about 100,000 kg of polymer per catalyst to about 1,500,000 kg of polymer per catalyst, such as 500,000 kg of polymer per kg of catalyst or more, such as the catalyst efficiency can be of from about 100,000 kg of polymer per catalyst to about 2,500,000 kg of polymer per catalyst); 6) the ethylene concentration is 1 mole/liter or less.

In embodiments herein, the invention relates to homogeneous polymerization processes where monomers (such as propylene), and optionally comonomer, are contacted with a catalyst system comprising an activator and at least one catalyst compound, as described above. The catalyst compound and activator may be combined in any order, and may be combined prior to contacting with the monomers. In one embodiment, the catalyst and the activator can be fed into the polymerization reactor in a form of dry powder or slurry without the need of preparing a homogenous catalyst solution by dissolving the catalyst into a carrying solvent. Catalyst and activator can be mixed prior to entering the reactor or contacted in the reactor. Separate solutions of catalyst and activator may be each be fed into the reactor.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes are preferred, such as a process where at least 90 wt % of the product produced is soluble in the reaction media.) In useful embodiments the process is a solution process. Alternatively, no solvent or diluent is present or added in the reaction medium, (except for the small amounts used as the carrier for the catalyst system or other additives, or amounts typically found with the monomer; e.g., propane in propylene), and the polymerization is run in a bulk process.

A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Alternatively two reactors in series configuration can be used for polymerization of propylene copolymers.

In one embodiment, the polymerization process includes two or more reactors in parallel configuration. The propylene copolymers produced from each reactor have different molecular weight and composition. Preferable one reactor is used to produce propylene copolymer with lower ethylene content and lower molecular weight than that produced from the second reactor. The mixture of the two reactor products has bimodal composition distribution. Preferably, the effluent from the two reactors are mixed or blended together and form a single stream for product recovery and finishing.

In one embodiment, the polymerization process includes two or more reactors in series configuration. Preferably, the catalyst is fed into the first reactor only. Alternatively, the catalyst feed is split between the reactors. The propylene copolymers produced from each reactor have different molecular weight and composition. Preferable one reactor is used to produce propylene copolymer with lower molecular weight than that produced from the second reactor. The mixture of the two reactor products has bimodal molecular weight distribution. Preferably, the Mw of the propylene copolymer derived from the second reactor is of 200,000 g/mole or more.

Other additives may also be used in the polymerization, as desired, such as one or more scavengers, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

In an alternate embodiment, the catalyst activity is at least 10,000 g/mmol/hour, preferably 100,000 or more g/mmol/hour, preferably 500,000 or more g/mmol/hr, preferably 1,000,000 or more g/mmol/hr, preferably 2,000,000 or more g/mmol/hr, preferably 5,000,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 40% or more, preferably 50% or more.

Polyolefin Products

This invention also relates to compositions of matter produced by the methods described herein. The processes described herein may be used to produce polymers of olefins or mixtures of olefins. Polymers that may be prepared include polymers of one or more $C_3$-$C_{20}$ alpha olefins containing 35 mol % ethylene or less (alternatively from 0.1 to 35 mol % ethylene). Preferred copolymers include copolymers of propylene with up to 35 mol % ethylene. Other preferred polymers include copolymers of propylene, ethylene and one or more $C_4$-$C_{20}$ olefin, with the copolymer preferably having an ethylene content of less than 35 mol % (alternatively having an ethylene content from 0.1 to 35 mol %). Preferably, diene is absent from the copolymers produced herein.

In a preferred embodiment, the process described herein produces propylene copolymers, such as propylene-ethylene having a Mw/Mn of between 1 to 10 (preferably 2 to 8, preferably 2 to 6, preferably 2 to 5).

In a preferred embodiment, the polymers produced herein are copolymers of propylene and ethylene, preferably having from 0.1 to 35 mol % (alternatively from 0.5 to 20 mole %, alternatively from 1 to 15 mole %, preferably from 3 to 10 mol %) of ethylene.

In another embodiment, the polymers produced herein are polymers of ethylene and one or more $C_3$-$C_{20}$ alpha olefins, preferably having from 0.1 to 35 mol % of ethylene. In another embodiment, the polymers produced herein are terpolymers of propylene and ethylene and one or more $C_4$-$C_{20}$ alpha olefins, preferably having from 0.1 to 35 mol % of ethylene.

In another embodiment, the polymers produced herein are copolymers of ethylene and a $C_4$ to $C_{20}$ olefin comonomer (preferably ethylene and/or $C_4$ to $C_{12}$ alpha-olefin, preferably ethylene, butene, hexene, octene, decene, dodecene, preferably ethylene, butene, hexene, octene) preferably having from 7 to 35 wt % (alternately from 10 to 32 wt %, alternately from 11 to 25 wt %) of one or more of $C_4$ to $C_{20}$ olefin comonomer (preferably $C_4$ to $C_{12}$ alpha-olefin, preferably butene, hexene, octene, decene, dodecene, preferably ethylene, butene, hexene, octene).

In another embodiment, the polymers produced herein are copolymers of propylene preferably having from 7 to 35 wt % (alternately from 10 to 32 wt %, alternately from 11 to 25 wt %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

Alternatively, the copolymers produced herein are copolymers of propylene and from 5 to 35 wt % (alternately from 10 to 32 wt %, alternately from 11 to 25 wt %) of one, two, three, four or more of ethylene, butene, hexene, octene, decene, dodecene, preferably ethylene, butene, hexene, and octene.

Preferably the copolymers produced herein are copolymers of propylene and from 5 to 35 mol % (alternatively from 7 to 30 mol %, alternatively from 10 to 27 mol %) of ethylene.

Alternatively, the polymers produced herein are copolymers of propylene and ethylene, preferably having from 0.1 to 35 mol % (alternatively from 0.5 to 30 mol %, alternatively from 5 to 26 mol %, preferably from 10 to 24 mol %) of ethylene. Alternatively, the polymers produced herein are copolymers of propylene preferably having from 0.1 to 26 wt % (alternately from 0.3 to 22 wt %, alternately from 3 to 19 wt %, preferably from 7 to 17 wt %) of ethylene.

Alternatively, the polymers produced herein are copolymers of ethylene and a $C_4$-$C_8$ alpha olefin, preferably having from 0.1 to 35 mol % (alternatively from 0.5 to 30 mol %, alternatively from 5 to 26 mol %, preferably from 10 to 24 mol %) of ethylene.

In an embodiment the polymers produced herein are copolymers of ethylene and a $C_3$ to $C_{20}$ alpha olefin, having from 0.1 to 35 mol % (alternatively from 0.5 to 30 mol %, alternatively from 5 to 26 mol %, preferably from 10 to 24 mol %) of ethylene.

In embodiments, the propylene copolymer has a weight average molecular weight (Mw) of 50,000 g/mol or more, or about 100,000 g/mol or more, or about 150,000 g/mol or more, or about 200,000 g/mol or more, or about 300,000 g/mole or more, or about 400,000 g/mol or more; a number average molecular weight (Mn) of 25,000 g/mol or more, 50,000 g/mol or more, 75,000 g/mol or more, 100,000 g/mol or more, 150,000 g/mol or more, 200,000 g/mol or more; an MWD (Mw/Mn, also referred to as PDI) in a range of 1.5 to 15, or 2.0 to 10, or 2.0 to 5, or 2.5 to 10. For the purposes of claims (unless stated otherwise), the moments of molecular weight (Mz, Mw, Mn, etc.) are determined by using high temperature Gel Permeation Chromatography (see GPC-4D section for details) using an infrared detector (GPC-IR).

In embodiments, the propylene copolymer has a melt flow rate (MFR) of 800 g/10 minutes or less, or 600 g/10 minutes or less, or 400 g/10 minutes or less, or 200 g/10 minutes or less, or 100 g/10 minutes or less, or 80 g/10 minutes or less, or 60 g/10 minutes or less, or 30 g/10 minutes or less, or 10 g/10 minutes or less, or 5 g/10 minutes or less, or 3 g/10 minutes or less, or 1 g/10 minutes or less. Alternatively, the propylene copolymer has a melt flow rate (MFR) of 0.1 g/10 minutes or more, 1.0 g/10 minutes or more, or 100 g/10 minutes or more, or 500 g/10 minutes or more, or 800 g/10 minutes or more, or 1200 g/10 minutes or more, or 1500 g/10 minutes or more. Preferably, the propylene copolymer has a melt flow rate (MFR) from 0.1 to 1000 g/10 min (alternatively from 0.5 to 200 g/10 min, from 0.5 to 100 g/10 min, from 1 to 100 g/10 min, from 2 to 50 g/10 min, from 2 to 30 g/10 min).

In embodiments, the propylene copolymer has a Brookfield viscosity of 500 mPa·sec or more, or 1,000 mPa·sec or more, or 5,000 mPa·sec or more, or 10,000 mPa·sec or more, or 100,000 mPa·sec or more. Brookfield viscosity is determined according to the procedure of ASTM D2983 at a temperature of 190° C.

In embodiments, the propylene copolymer has a melting temperature of 155° C. or less, 140° C. or less, 130° C. or less, 110° C. or less, 90° C. or less. In another embodiment, the polymer produced herein can have a melting point of at least 10° C., or at least 20° C., or at least 30° C., or at least 50° C., or at least 60° C. For example, the polymer can have a melting point from at least 10° C. to about 130° C. Alternatively, the polymer produced herein has a melting temperature of 10° C. or less, preferably 5° C. or less. In another embodiment, the polymer produced herein is amorphous without measurable melting temperature in DSC.

In embodiments, the propylene copolymer has a crystallization temperature of 130° C. or less, 120° C. or less, 110° C. or less, 100° C. or less, 80° C. or less. In another embodiment, the polymer produced herein can have a crystallization point of at least −10° C., or at least 10° C., or at least 15° C., or at least 20° C., or at least 30° C. For example, the polymer can have a crystallization point from at least −10° C. to about 130° C. In another embodiment, the polymer produced herein is amorphous without measurable crystallization temperature in DSC.

In embodiments, the propylene copolymer has a glass transition temperature of 5° C. or less, 0° C. or less, −10° C. or less, −20° C. or less, −25° C. or less, −30° C. or less. Preferably the propylene copolymer has a glass transition temperature from −40 to −2° C. (alternatively from −35 to −5° C., from −35 to −15° C., from −35 to −20° C., from −33 to −25° C., from −20 to −10° C.).

In embodiments, the propylene copolymer has a heat of fusion of 100 J/g or less, 80 J/g or less, 70 J/g or less. In another embodiment, the polymer produced herein can have a heat of fusion of at least 5 J/g, or at least 10 J/g, or at least 15 J/g, or at least 20 J/g. For example, the polymer can have a heat of fusion from at least 5 J/g to about 180 J/g. In another embodiment, the polymer produced herein is amorphous without measurable crystallization peak and melting peaks in DSC.

In embodiments, the propylene copolymer has long chain branched architecture. The degree of long chain branched is measured by a branching index measured using GPC-4D. Preferably the branching index, $g'_{vis}$, is 0.95 or less, or 0.90 or less. Alternatively, the branching index, $g'_{vis}$, is from 0.8 to 1.0 (alternatively from 0.85 to 0.99, from 0.9 to 0.98, from 0.85 to 0.90, from 0.90 to 1.0, from 0.9 to 0.95).

In embodiments, the propylene copolymer has a complex shear viscosity at the frequency of 0.1 rad/sec and the temperature of 190° C. of 500 Pa·s or more, 1,000 Pa·s or more, 2,000 Pa·s or more, 5,000 Pa·s or more, 10,000 Pa·s or more. In another embodiment, the propylene copolymer has a complex shear viscosity at the frequency of 10 rad/sec and the temperature of 190° C. of 50 Pa·s or more, 100 Pa·s or more, 500 Pa·s or more, 1,000 Pa·s or more, 1,500 Pa·s or more. In another embodiment, the propylene copolymer has a shear thinning ratio of 1.2 or more, 2.0 or more, 5.0 or more, 8.0 or more, 10 or more. The shear thinning ratio is defined as the ratio of complex viscosity at a frequency of 0.1 rad/s to the complex viscosity at a frequency of 100 rad/s and the complex viscosity is measured at a temperature of 190° C.

The polymerization can be carried out in multiple reactors in series and parallel configurations. In one embodiments, the copolymer is a reactor blend of a first polymer component and a second polymer component. Thus, the comonomer content of the copolymer can be adjusted by adjusting the comonomer content of the first polymer component, adjusting the comonomer content of second polymer component, and/or adjusting the ratio of the first polymer component to the second polymer component present in the copolymer.

In embodiments where the copolymer is a reactor blended polymer, the ethylene content of the first polymer component may be greater than 5 wt %, greater than 7 wt %, greater than 10 wt %, greater than 12 wt %, greater than 15 wt %, or greater than 17 wt %, based upon the total weight of the first polymer component. The ethylene content of the second polymer component may be less than 30 wt %, less than 20 wt %, less than 15 wt %, less than 10 wt %, less than 7 wt %, or less than 5 wt %, based upon the total weight of the first polymer component.

In embodiments, the weight average molecular weight of the first polymer component is greater than that of the second polymer component. In embodiments, the weight average molecular weight of the first polymer component is greater than about 150,000 g/mol, or about 200,000 g/mol, or about 250,000 g/mol. Preferably, the weight average molecular weight of the second polymer component is less than about 400,000 g/mol, or about 300,000 g/mol, or about 250,000 g/mol to less than about 200,000 g/mol, or about 150,000 g/mol, or about 100,000 g/mol.

By definition, a blocky copolymer is one in which the product of the reactivity ratios ($r_1r_2$) is greater than 1. A copolymerization between monomers "E" and "P" in the presence of catalyst "M" can be represented by the following reaction schemes and rate equations where $R_{11}$ is the rate of "E" insertion after "E", $R_{12}$ is the rate of "P" insertion after "E", $R_{21}$ is the rate of "E" insertion after "P", $R_{22}$ is the rate of "P" insertion after "P", and $k_{11}$, $k_{12}$, $k_{21}$, and $k_{22}$ are the corresponding rate constants for each. The reactions scheme and rate equations are illustrated below.

$$M\text{-}E+E \rightarrow M\text{-}E\text{-}E \quad R_{11}=k_{11}[M\text{-}E][E]$$

$$M\text{-}E+P \rightarrow M\text{-}P\text{-}E \quad R_{12}=k_{12}[M\text{-}E][P]$$

$$M\text{-}P+E \rightarrow M\text{-}E\text{-}P \quad R_{21}=k_{21}[M\text{-}P][E]$$

$$M\text{-}P+E \rightarrow M\text{-}P\text{-}P \quad R_{22}=k_{22}[M\text{-}P][P]$$

The reactivity ratios $r_1$ and $r_2$ are:

$$r_1 = \frac{k_{11}}{k_{12}}$$

$$r_2 = \frac{k_{22}}{k_{21}}$$

$$r_1r_2 = \frac{k_{11}k_{22}}{k_{12}k_{21}}.$$

The product of $r_1 \times r_2$ provides information on how the different monomers distribute themselves along the polymer chain. Below, are illustrations of alternating, random and blocky copolymers and how the product of $r_1 \times r_2$ relates to each:

$r_1r_2$ = 0 alternating copolymerization
EPEPEPEPEPEPEPEPEPEP $r_1r_2$ = 1 random copolymerization
PPEPEPEPPEPPPEEPEEPE $r_1r_2$ > 1 blocky copolymerization
PPPPEEEEEEEPPPEEEEEPP $r_1$ and $r_2$ also represent the reactivity of ethylene and propylene in the copolymer, respectively, which are used to describe the characteristic of the catalyst system. $r_1r_2$, the product of $r_1$ and $r_2$, represents the distribution of monomers in the main chain of the copolymer. In one embodiment, the $r_1r_2$ of the propylene copolymer is in range of 0.9 to 5.0, alternatively from 1.0 to 4.0, alternatively from 1.0 to 3.0, alternatively from 1.0 to 2.5, alternatively from 1.1 to 2.0, alternatively from 1.1 to 2.0, alternatively 1.2 to 2.0, alternatively 1.2 to 2.0, alternatively from 1.4 to 2.0, alternatively from 1.0 to 1.3, alternatively from 1.1 to 1.3, alternatively from 1.4 to 1.6. In some embodiments of the invention, the $r_1r_2$ is greater than 0.9, alternatively greater than 1.0, alternatively greater than 1.1, alternatively greater than 1,2, alternatively greater than 1.3, alternatively greater than 1,4, and with an upper limit of 5.0 or less, alternatively 4.0 or less, alternatively 3.0 or less, alternatively 2.8 or less, alternatively 2.5 or less, alternatively 2.2 or less, alternatively 2.0 or less.

In one embodiment, the $r_1r_2$ of the propylene copolymer is in range of 0.8 to 3.0, alternatively from 0.9 to 2.6, alternatively from 1.0 to 2.2, alternatively from 1.1 to 1.8.

In some embodiments of the invention, $r_1r_2$ is greater than 1.12−(0.0157x), alternatively greater than 1.15−(0.0157x), alternatively greater than 1.20−(0.0157x), alternatively greater than 1.3−(0.0157x) where x is the wt % of ethylene as measured by $^{13}$C NMR.

$^{13}$C-NMR Spectroscopy on Polyolefins

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 120° C. using a 125 MHz (or higher) NMR spectrometer. Polymer resonance peaks are referenced to mmmm=21.83 ppm. Calculations involved in the characterization of polymers by NMR are described by F. A. Bovey in *Polymer Conformation and Configuration* (Academic Press, New York 1969) and J. Randall in *Polymer Sequence Determination,* 13*C-NMR Method* (Academic Press, New York, 1977).

Preferred copolymers produced herein have a ratio of m to r (m/r) of more than 1. The propylene tacticity index, expressed herein as "m/r", is determined by 13C nuclear magnetic resonance (NMR). The propylene tacticity index m/r is calculated as defined in H. N. Cheng, (1984) *Macromolecules*, v. 17, pg. 1950. The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred propylene polymers produced herein have isotactic stereo-regular propylene crystallinity. The term "stereo-regular" as used herein means that the predominant number, i.e. greater than 80%, of the propylene residues in the polypropylene exclusive of any other monomer such as ethylene, has the same 1,2 insertion and the stereo-chemical orientation of the pendant methyl groups is the same, either meso or racemic.

The "mm triad tacticity index" of a polymer is a measure of the relative isotacticity of a sequence of three adjacent propylene units connected in a head-to-tail configuration. In the present invention, the mm triad tacticity index of a polypropylene homopolymer or copolymer is expressed as 100 times the mm Fraction; this product equals the % mm. The mm Fraction is the ratio of the number of units of meso tacticity to all of the propylene triads in the copolymer:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

PPP(mm)

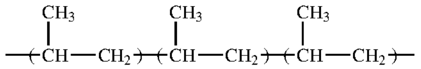

PPP(mr)

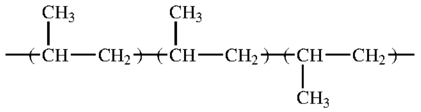

PPP(rr)

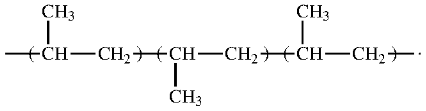

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C-NMR spectrum, see 1) J. A. Ewen, *Catalytic Polymerization of Olefins: Proceedings of the International Symposium on Future Aspects of Olefin Polymerization*, T. Keii and K. Soga, Eds. (Elsevier, 1986), pp. 271-292; and 2) US Patent Application Publication No. US2004/054086 (paragraphs [0043] to [0054]).

Similarly m diads and r diads can be calculated as follows where mm, mr and mr are defined above.

$$m = \text{mm} + 1/2\ mr$$

$$r = rr + 1/2\ mr$$

$^{13}$C NMR was used to determine monomer content and sequence distribution for the ethylene-propylene copolymers using the procedure from J. C. Randall's paper: *Polymer Reviews,* 1989, v. 29(2), pp. 201-317. Included in the paper are measurement and calculations for 1,2 propylene addition triad sequence distributions termed EEE, EEP, PEP, EPE, EPP and PPP and reported as mole fractions. The propylene content in mol %, run number, average sequence length, and diad/triad distributions were all calculated per the method established in the above paper. Calculations for $r_1r_2$ were based on the equation $r_1r_2=4*[EE]*[PP]/[EP]^2$; where [EE], [EP], [PP] are the diad molar concentrations; E is ethylene, P is propylene. For other copolymers of ethylene, a similar methodology is used.

In some embodiments of the invention, EEE triad sequence distribution is greater than $(3\times10^{-5})x^2+0.0005x-0.0039$, alternatively greater than $(3\times10^{-5})x^2+0.0005x-0.0034$. Alternatively greater than $(3\times10^{-5})x^2+0.0005x-0.0029$, where x is the wt % of ethylene as measured by $^{13}C$ NMR.

In another embodiment of the invention, the polymers produced herein have regio defects (as determined by $^{13}C$ NMR), based upon the total propylene monomer. Three types defects are defined to be the regio defects: 2,1-erythro, 2,1-threo, and 3,1-isomerization as well as a defect followed by ethylene insertion. The structures and peak assignments for these are given in [L. Resconi, et al. (2000), *Chem. Rev.*, v. 100, pp. 1253-1345]. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect (2,1 defects) | Chemical shift range (ppm) |
|---|---|
| αβ + 2,1-threo + 2,1-erythro (2,1-P) | 35.70-34.09 |
| (CH) defect (2,1-E) | 34.06-33.88 |
| (CH) defect (2,1-EE) | 33.72-33.42 |
| βγ (2*2,1EE) | 27.90-27.51 |

The average integral for each defect is divided by the integral for total area ($CH_3$, CH, $CH_2$), and multiplied by 100 to determine the total defect concentration, reported as mol % regio defects (also called regio errors). Definition of species (αβ and βγ) are as defined in Randall in "A Review Of High Resolution Liquid Carbon Nuclear Magnetic Resonance Characterization of Ethylene-Based Polymers", *Polymer Reviews*, v. 29:2,201-5 pg. 317 (1989). The sum of the different types of measured regio defects (i.e. 2,1-E+2,1-P+2,1-EE) may be presented as the "total regio defects" in units of mol %.

In an embodiment of the invention, the total regio defects is from 0.1 to 2 mol % (alternatively from 0.1 to 1.0 mol %, from 0.5 to 1.0 mol %, from 0.1 to 0.4 mol %, from 0.5 to 1.5 mol %). In another embodiment of the invention, the polymer had total regio defects (also called total regio errors) from 0.01 to 1.2 mol %, preferably from 0.05 to 1.0 mol %, alternatively from 0.08 to 0.8 mol %, alternatively from 0.10 to about 0.7 mol %.

Propylene copolymers produced herein may have an mm triad tacticity index of three propylene units, as measured by $^{13}C$ NMR, of 75% or greater, 80% or greater, 82% or greater, 85% or greater, 90% or greater, 95% or greater, 96% or greater, 97% or greater, 98% or greater, 99% or greater. In one or more embodiments, propylene copolymers produced herein have an mm triad tacticity index of three propylene units, as measured by $^{13}C$ NMR, from 90% to 100% (alternatively from 95% to 99.9%, from 96 to 99.8%, from 97 to 99% from 98 to 99.9%, from 99 to 99.9%, from 97 to 99.5%).

In a preferred embodiment of the invention, the polymer is a propylene-ethylene copolymer that has one, two, three, four, five, six, seven, eight, nine, ten, eleven, twelve, thirteen, or fourteen of the following properties:

a) an Mw of 50,000 g/mol or more, alternatively 100,000 g/mol or more;
b) an Mn of 25,000 g/mol or more, alternatively 50,000 g/mol or more;
c) an Mw/Mn of 1.5 to 15, alternatively 2.0 to 10;
d) a melt flow rate of 800 g/10 minutes or less, alternatively 600 g/10 minutes or less;
e) a Brookfield viscosity of 500 mPa·sec or more, alternatively 1,000 mPa·sec or more;
f) an ethylene content of 5 to 29 mol %, alternatively from 5 to 26 mol %;
g) a Tm of 155° C. or less, alternatively 140° C. or less;
h) a Tc of 120° C. or less, alternatively 100° C. or less, alternatively from 0 to 120° C., from 0 to 100° C.;
i) a heat of fusion of 100 J/g or less, alternatively 80 J/g or less;
j) an $r_1r_2$ of the copolymer in range of 0.92 to 3.0, alternatively from 1.0 to 2.6 (alternatively 0.8 to 3.0, alternatively from 0.9 to 2.6);
k) total regio defects of from 0.01 to 2 mol %, alternatively 0.01 to 1.2, alternatively from 0.05 to 1.0 mol %;
l) an $r_1r_2$ greater than 1.12−(0.0157x), alternatively greater than 1.15−(0.0157x), alternatively greater than 1.20−(0.0157x), alternatively greater than 1.3−(0.0157x), where x is the wt % of ethylene as measured by $^{13}C$ NMR,
m) an mm triad tacticity index of 90% or greater, alternatively 95% or greater, and
n) an EEE triad sequence distribution greater than $(3\times10^{-5})x^2+0.0005x-0.0039$, alternatively greater than $(3\times10^{-5})x^2+0.0005x-0.0034$. Alternatively greater than $(3\times10^{-5})x^2+0.0005x-0.0029$, where x is the wt % of ethylene as measured by $^{13}C$ NMR.

Preferably, the copolymer has a Tm of 150° C. or less and a heat of fusion of 5 J/g to 80 J/g.

This invention also relates to copolymers comprising 5 to 29 mol % (such as 5 to 26 mol %) ethylene and 95 to 71 mol % propylene (such as 95 to 74), where the copolymer has:

i) an $r_1r_2$ of the copolymer in range of 0.8 to 3.0, alternatively 0.9 to 3.0, alternatively 1.0 to 2.5, alternatively from 1.1 to 2.0 (alternatively 0.9 to 2.6);
ii) regio defects of from 0.01 to 2 mol %, alternatively from 0.01 to 1.2 mol %, alternatively from 0.05 to 1.0 mol %, alternatively from 0.5 to 1.0 mol %; and
iii) an mm triad tacticity of 90% or greater, alternatively 95% or greater.

This invention also relates to copolymers comprising 5 to 29 mol % ethylene and 95 to 71 mol % propylene, where the copolymer has:

i) an $r_1r_2$ greater than 1.12−(0.0157x), alternatively greater than 1.15−(0.0157x), alternatively greater than 1.20−(0.0157x), alternatively greater than 1.3−(0.0157x), where x is the wt % of ethylene as measured by $^{13}C$ NMR;
ii) regio defects of from 0.01 to 2 mol %, alternatively from 0.5 to 1.0 mol %; and
iii) an mm triad tacticity of 90% or greater, alternatively 95% or greater.

This invention also relates to copolymers comprising 5 to 26 mol % ethylene and 95 to 74 mol % propylene, where the copolymer has:

i) an $r_1r_2$ of the copolymer in range of 0.9 to 3.0, alternatively from 1.0 to 2.6;
ii) regio defects of from 0.01 to 1.2 mol %, alternatively from 0.05 to 1.0 mol %; and
iii) an mm triad tacticity of 75% or greater, alternatively 80% or greater mm triad tacticity; and one or more of the following:
a) an Mw of 50,000 g/mol or more, alternatively 100,000 g/mol or more;
b) an Mn of 25,000 g/mol or more, alternatively 50,000 g/mol or more;
c) an Mw/Mn of 1.5 to 15, alternatively 2.0 to 10;
d) a melt flow rate of 800 g/10 minutes or less, alternatively 600 g/10 minutes or less;
e) a Brookfield viscosity of 500 mPa·sec or more, alternatively 1,000 mPa·sec or more;
f) a Tm of 155° C. or less, alternatively 140° C. or less;
g) a Tc of 120° C. or less, alternatively 100° C. or less (such as 0 to 120° C.); and/or
h) a heat of fusion of 100 J/g or less, alternatively 80 J/g or less;
i) an $r_1r_2$ is greater than 1.12−(0.0157x) where x is the wt % of ethylene as measured by $^{13}C$ NMR;
j) an EEE triad sequence distribution greater than $(3\times10^{-5})x^2+0.0005x-0.0039$, alternatively greater than $(3\times10^{-5})x^2+0.0005x-0.0034$. Alternatively greater than $(3\times10^{-5})x^2+0.0005x-0.0029$, where x is the wt % of ethylene as measured by $^{13}C$ NMR.

Blends

In another embodiment, the polymer (preferably the propylene copolymer) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from BASF); phosphites (e.g., IRGAFOS™ 168 available from BASF); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Any of the foregoing polymers and compositions in combination with optional additives (see, for example, US Patent Application Publication No. 2016/0060430, paragraphs [0082]-[0093]) may be used in a variety of end-use applications. Such end uses may be produced by methods known in the art. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags. Preferred end uses also include thermoplastic polyolefin (TPO) roof sheeting, foam, nonwovens, 3D printing, and recycling solutions.

Films

Specifically, any of the foregoing polymers, such as the foregoing propylene copolymers or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene and propylene copolymer can be coextruded together into a film then oriented. Likewise, oriented propylene copolymer could be laminated to oriented polyethylene or oriented polyethylene could be coated onto propylene copolymer then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 m. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

In another embodiment, this invention relates to:

1. A polymerization process comprising contacting, in a homogeneous phase, one or more $C_3$ to $C_{20}$ alpha olefins (such as propylene) and ethylene with a catalyst system comprising activator and catalyst compound represented by the Formula (I):

(I)

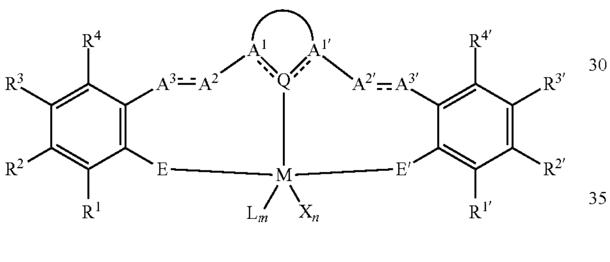

wherein:

M is a group 3, 4, 5, or 6 transition metal or a Lanthanide;

E and E' are each independently O, S, or $NR^9$ where $R^9$ is independently hydrogen, a $C_1$-$C_{40}$ hydrocarbyl, a $C_1$-$C_{40}$ substituted hydrocarbyl or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$A^3{=}A^2$, is a divalent group containing 2 to 40 non-hydrogen atoms that links $A^1$ to the E-bonded aryl group via a 2-atom bridge;

$A^{2'}{=}A^{3'}$ is a divalent group containing 2 to 40 non-hydrogen atoms that links $A^{1'}$ to the E'-bonded aryl group via a 2-atom bridge;

L is a Lewis base; X is an anionic ligand; n is 1, 2 or 3; m is 0, 1, or 2; n+m is not greater than 4;

each of $R^1$, $R^2$, $R^3$, $R^4$, $R^{1'}$, $R^{2'}$, $R^{3'}$, and $R^{4'}$ is independently hydrogen, a $C_1$-$C_{40}$ hydrocarbyl, a $C_1$-$C_{40}$ substituted hydrocarbyl, a heteroatom or a heteroatom-containing group, and one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group; and obtaining a copolymer comprising 0.1 to 35 mole % ethylene and 99.9 to 65 mole % propylene.

2. The process of paragraph 1 where the catalyst compound is represented by the Formula (II):

(II)

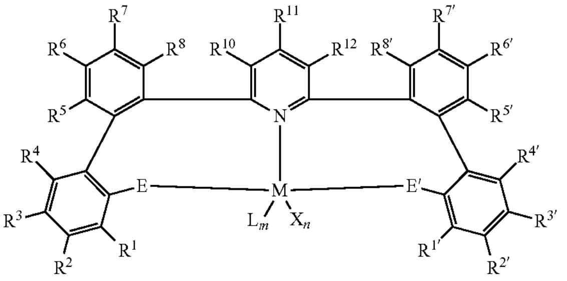

wherein:

M is a group 3, 4, 5, or 6 transition metal or a Lanthanide;

E and E' are each independently O, S, or $NR^9$, where $R^9$ is independently hydrogen, a $C_1$-$C_{40}$ hydrocarbyl, a $C_1$-$C_{40}$ substituted hydrocarbyl, or a heteroatom-containing group;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; any two L groups may be joined together to form a bidentate Lewis base;

an X group may be joined to an L group to form a monoanionic bidentate group;

any two X groups may be joined together to form a dianionic ligand group;

each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, a $C_1$-$C_{40}$ hydrocarbyl, a $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

3. The process of paragraph 1 or 2 wherein the M is Hf, Zr or Ti.

4. The process of paragraph 1, 2 or 3 wherein E and E' are each O.

5. The process of paragraph 1, 2, 3, or 4 wherein $R^1$ and $R^{1'}$ is independently a $C_4$-$C_{40}$ tertiary hydrocarbyl group.

6. The process of paragraph 1, 2, 3, or 4 wherein $R^1$ and $R^{1'}$ is independently a $C_4$-$C_{40}$ cyclic tertiary hydrocarbyl group.

7. The process of paragraph 1, 2, 3, or 4 wherein $R^1$ and $R^{1'}$ is independently a $C_4$-$C_{40}$ polycyclic tertiary hydrocarbyl group.

8. The process any of paragraphs 1 to 7 wherein each X is, independently, selected from the group consisting of substituted or unsubstituted hydrocarbyl radicals having from 1 to 20 carbon atoms, hydrides, amides, alkoxides, sulfides, phosphides, halides, and a combination thereof, (two X's may form a part of a fused ring or a ring system).

9. The process any of paragraphs 1 to 8 wherein each L is, independently, selected from the group consisting of: ethers, thioethers, amines, phosphines, ethyl ether, tetrahydrofuran, dimethylsulfide, triethylamine, pyridine, alkenes, alkynes, allenes, and carbenes and a combinations thereof, optionally two or more L's may form a part of a fused ring or a ring system).

10. The process of paragraph 1, wherein M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

11. The process of paragraph 1, wherein M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

12. The process of paragraph 1, wherein M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

13. The process of paragraph 1, wherein Q is nitrogen, $A^1$ and $A^{1'}$ are both carbon, both $R^1$ and $R^{1'}$ are hydrogen, both E and E' are $NR^9$, where $R^9$ is selected from a $C_1$-$C_{40}$ hydrocarbyl, a $C_1$-$C_{40}$ substituted hydrocarbyl, or a heteroatom-containing group.

14. The process of paragraph 1, wherein Q is carbon, $A^1$ and $A^{1'}$ are both nitrogen, and both E and E' are oxygen.

15. The process of paragraph 1, wherein Q is carbon, $A^1$ is nitrogen, $A^{1'}$ is $C(R^{22})$, and both E and E' are oxygen, where $R^{22}$ is selected from hydrogen, $C_1$-$C_{20}$ hydrocarbyl, $C_1$-$C_{20}$ substituted hydrocarbyl.

16. The process of paragraph 1, wherein the heterocyclic Lewis base is selected from the groups represented by the following formulas:

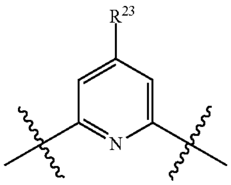
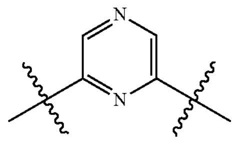

-continued

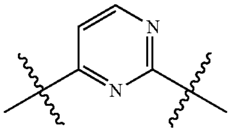
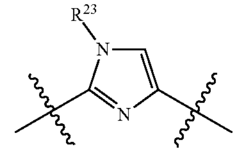
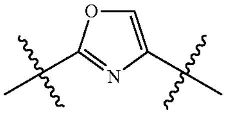
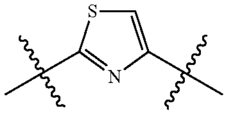
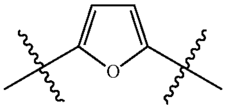
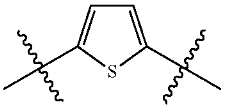
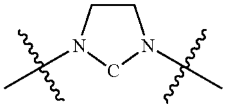
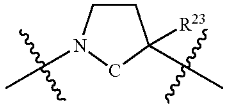
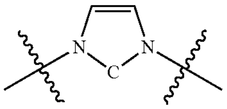
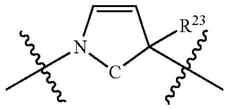

where each $R^{23}$ is independently selected from hydrogen, $C_1$-$C_{20}$ alkyls, and $C_1$-$C_{20}$ substituted alkyls.

17. The process of paragraph 2, wherein M is Zr or Hf, both E and E' are oxygen, and both $R^1$ and $R^{1'}$ are $C_4$-$C_{20}$ cyclic tertiary alkyls.

18. The process of paragraph 2, wherein M is Zr or Hf, both E and E' are oxygen, and both $R^1$ and $R^{1'}$ are adamantan-1-yl or substituted adamantan-1-yl.

19. The process of paragraph 2, wherein M is Zr or Hf, both E and E' are oxygen, and each of $R^1$, $R^{1'}$, $R^3$ and $R^{3'}$ are adamantan-1-yl or substituted adamantan-1-yl.

20. The process of paragraph 2, wherein M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

21. The process of paragraph 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_{20}$ alkyls.

22. The process of paragraph 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_3$ alkyls.

23. The process of paragraph 1 wherein the catalyst compound is represented by one or more of the following formulas:

Complex 1

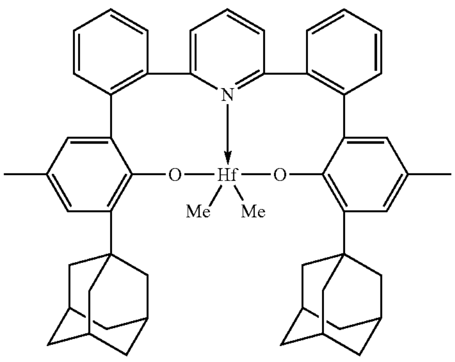

-continued
Complex 2
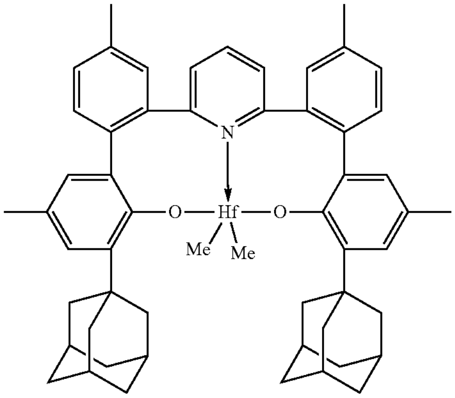
Complex 3
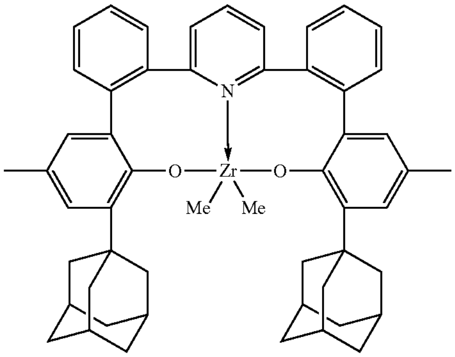
Complex 4
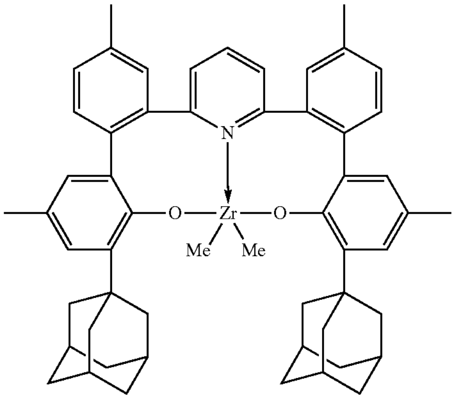
Complex 5
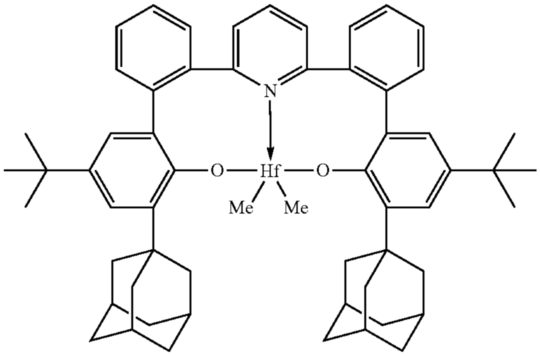
-continued
Complex 6
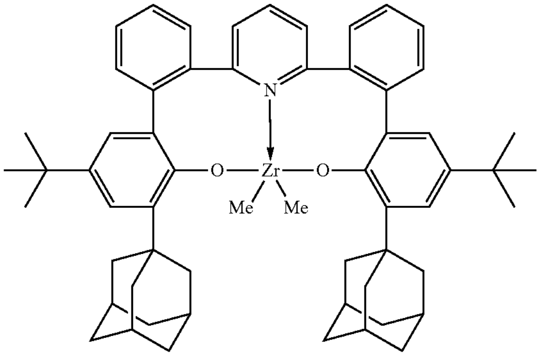
Complex 7
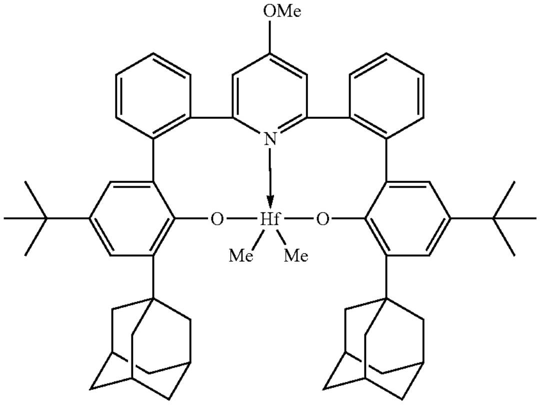
Complex 8
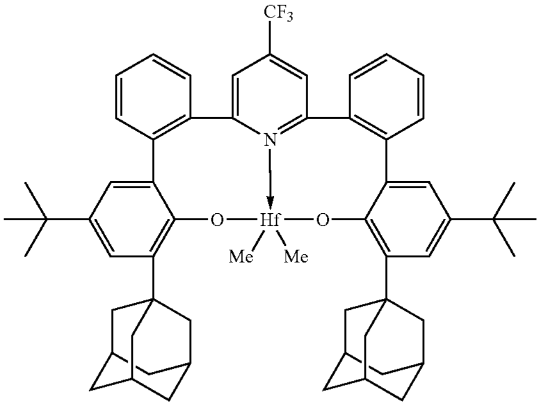
Complex 9
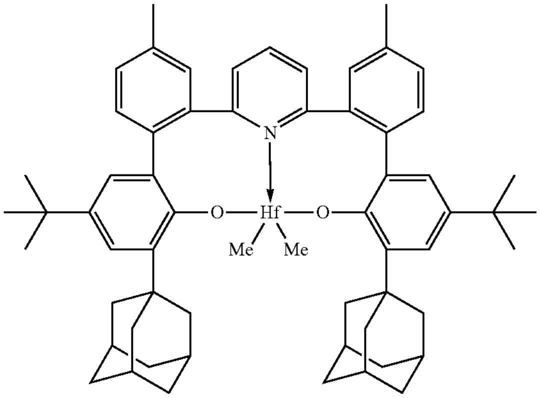

-continued
Complex 10
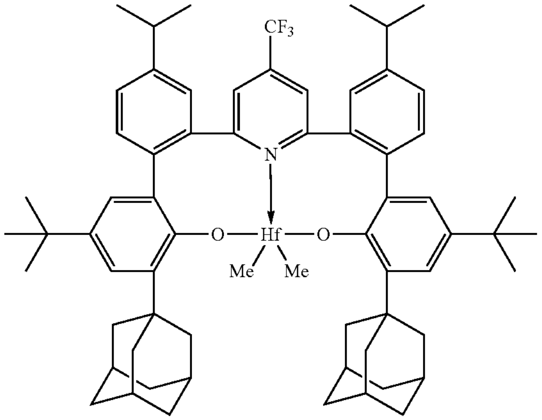
Complex 11
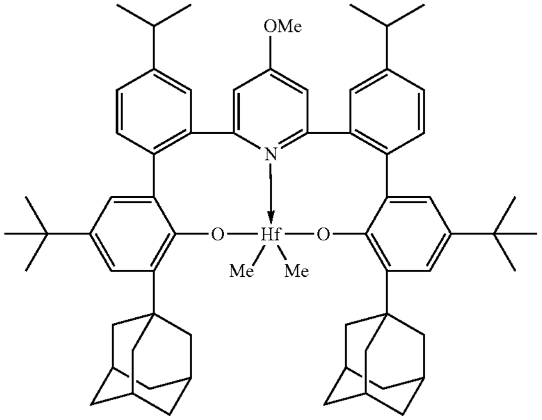
Complex 12
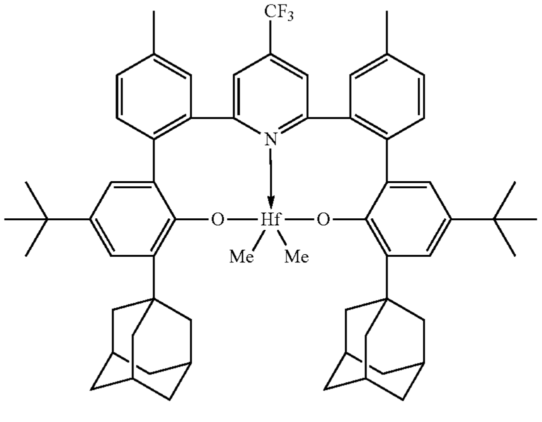
-continued
Complex 13
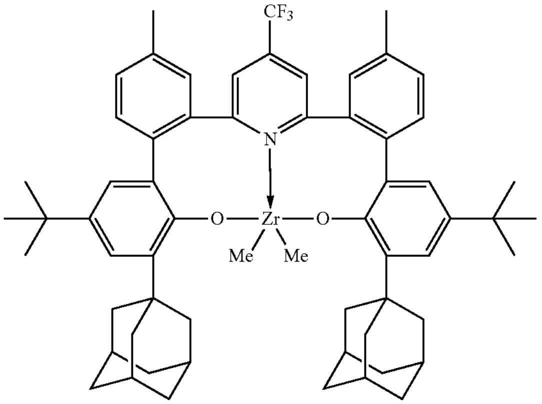
Complex 14
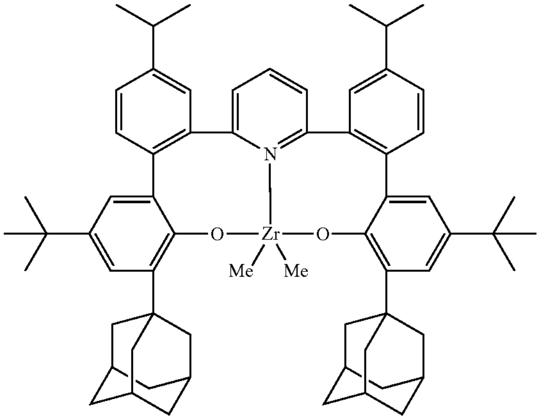
Complex 15
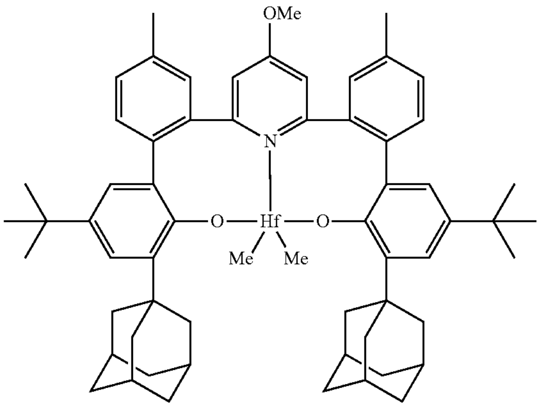

-continued
Complex 16
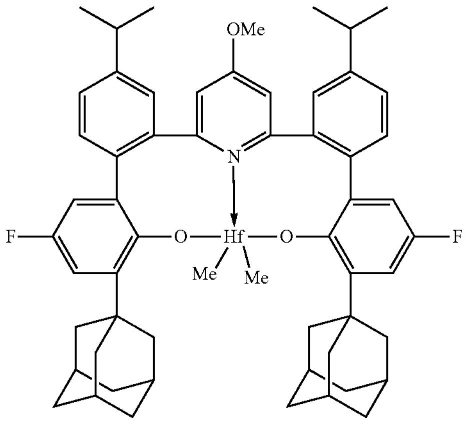
Complex 17
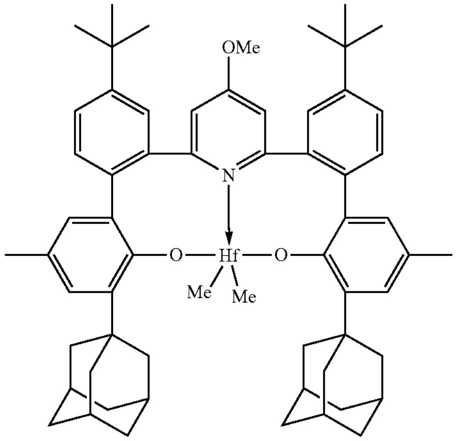
Complex 18
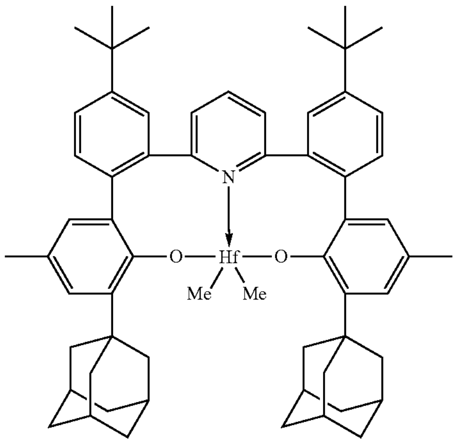
-continued
Complex 19
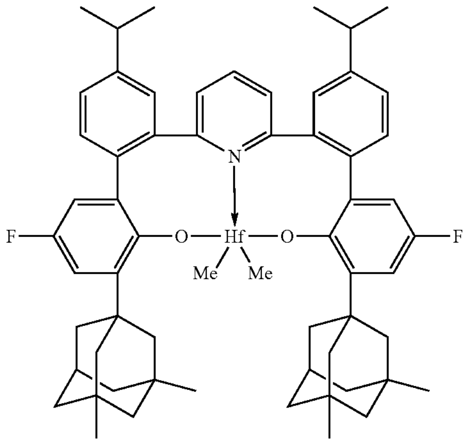
Complex 20
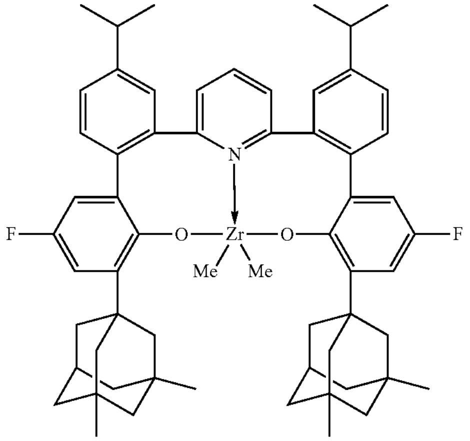
Complex 21
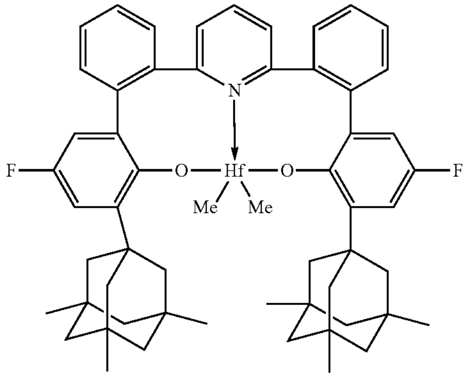

-continued
Complex 22
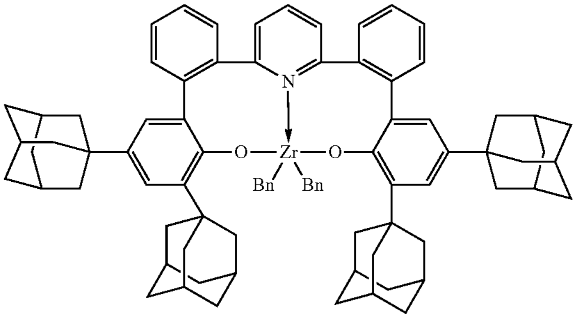
Complex 23
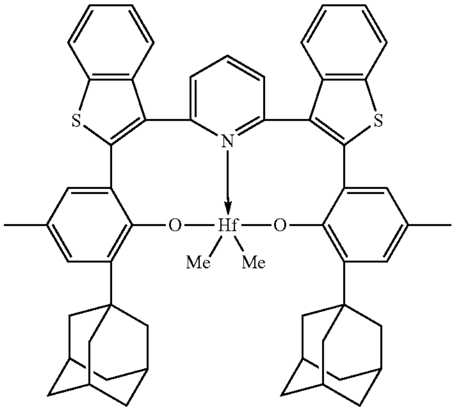
Complex 24
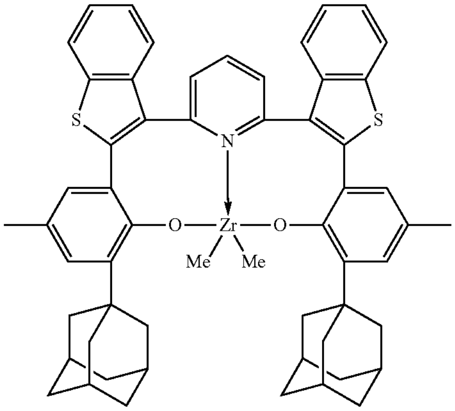
-continued
Complex 25
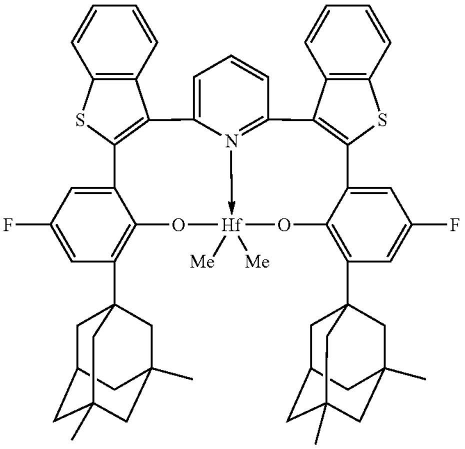
Complex 26
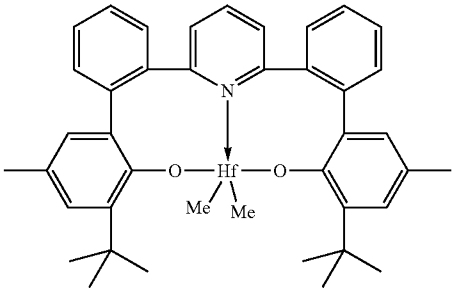
Complex 27
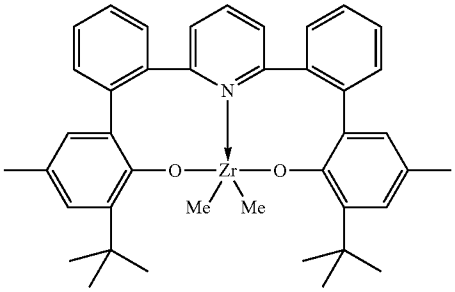
Complex 29
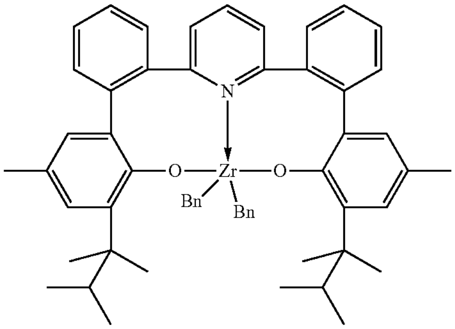

-continued

Complex 30

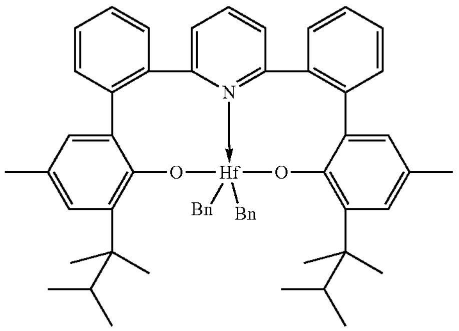

Complex 31

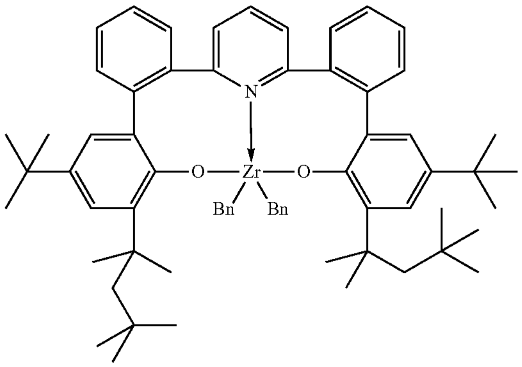

Complex 32

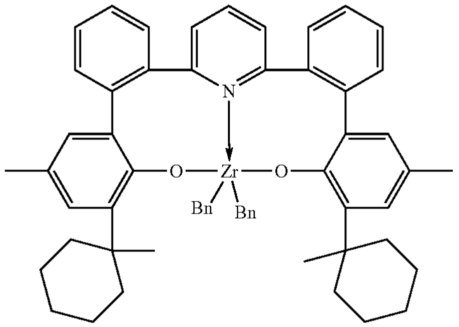

Complex 33

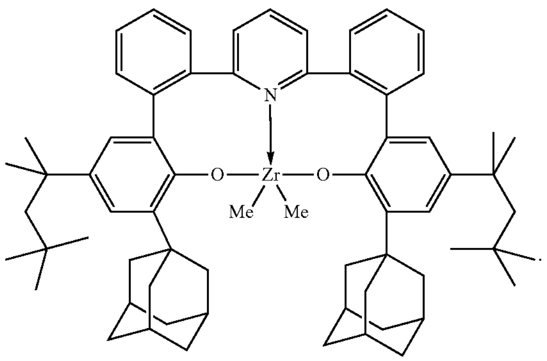

24. The process of paragraph 23 wherein the catalyst compound is any of complexes 1 to 8.

25. The process of paragraph 1, wherein the activator comprises an alumoxane or a non-coordinating anion.

26. The process of paragraph 1, wherein the activator is soluble in non-aromatic-hydrocarbon solvent.

27. The process of paragraph 1, wherein the catalyst system is free of aromatic solvent.

28. The process of paragraph 24, wherein the activator is represented by the formula:

$(Z)_d^+(A^{d-})$ wherein Z is (L-H) or a reducible Lewis Acid, L is an neutral Lewis base; H is hydrogen; $(L-H)^+$ is a Bronsted acid; $A^{d-}$ is a non-coordinating anion having the charge d−; and d is an integer from 1 to 3.

29. The process of paragraph 1, wherein the activator is represented by the formula:

$$[R^{1'}R^{2'}R^{3'}EH]_{d+}[Mt^{k+}Q_n]^{d-} \quad (V)$$

wherein:

E is nitrogen or phosphorous;

d is 1, 2 or 3; k is 1, 2, or 3; n is 1, 2, 3, 4, 5, or 6; n−k=d;

$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms;

Mt is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

30. The process of paragraph 1, wherein the activator is represented by the formula:

$(Z)_d^+ (A^{d-})$ wherein $A^{d-}$ is a non-coordinating anion having the charge d−; and d is an integer from 1 to 3 and $(Z)_d^+$ is represented by one or more of:

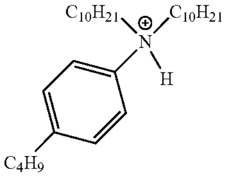

10

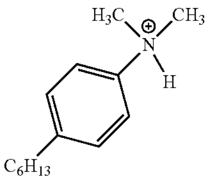

11

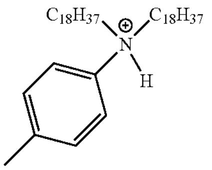

12

-continued
13
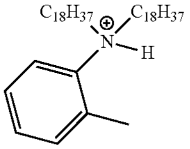
14
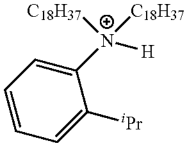
15
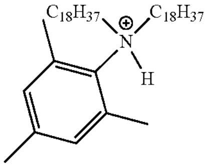
16
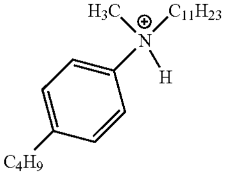
17
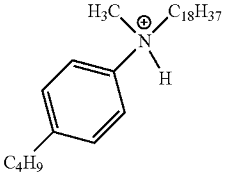
18
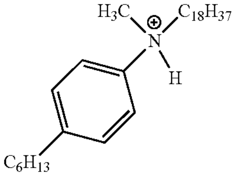
19
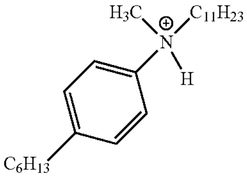
20
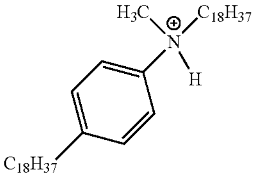
21
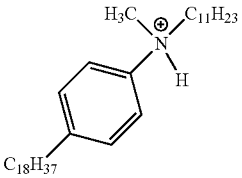
-continued
22
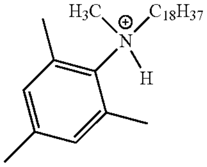
23
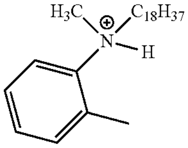
24
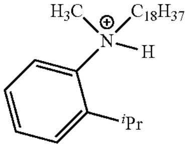
25
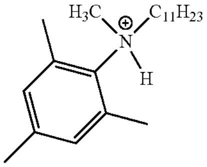
26
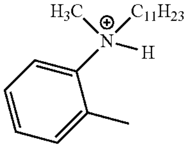
27
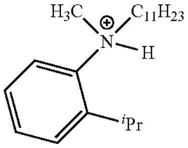
29
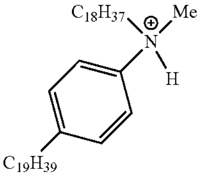
28
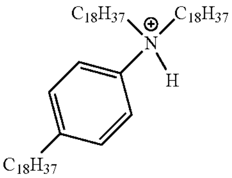
30
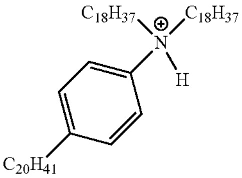

-continued

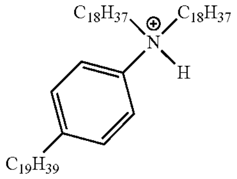

31

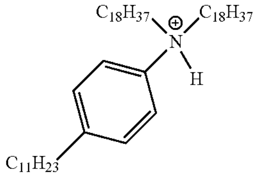

32

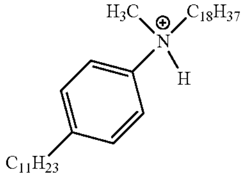

33

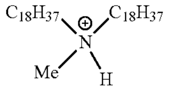

34

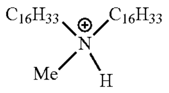

35

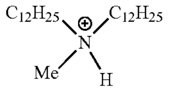

36

31. The process of paragraph 1, wherein the activator is one or more of:

N-methyl-4-nonadecyl-N-octadecylbenzenaminium tetrakis (pentafluorophenyl)borate, N-methyl-4-nonadecyl-N-octadecylbenzenaminium tetrakis (perfluoronaphthalen-2-yl)borate, dioctadecylmethylammonium tetrakis(pentafluorophenyl) borate, dioctadecylmethylammonium tetrakis(perfluoronaphthalen-2-yl)borate, N,N-dimethylanilinium tetrakis(pentafluorophenyl)borate, triphenylcarbenium tetrakis(pentafluorophenyl)borate, trimethylammonium tetrakis(perfluoronaphthalen-2-yl)borate, triethylammonium tetrakis(perfluoronaphthalen-2-yl)borate, tripropylammonium tetrakis(perfluoronaphthalen-2-yl)borate, tri(n-butyl)ammonium tetrakis(perfluoronaphthalen-2-yl) borate, tri(t-butyl)ammonium tetrakis(perfluoronaphthalen-2-yl)borate, N,N-dimethylanilinium tetrakis(perfluoronaphthalen-2-yl) borate, N,N-diethylanilinium tetrakis(perfluoronaphthalen-2-yl)borate, N,N-dimethyl-(2,4,6-trimethylanilinium) tetrakis(perfluoronaphthalen-2-yl)borate, tropillium tetrakis(perfluoronaphthalen-2-yl)borate, triphenylcarbenium tetrakis(perfluoronaphthalen-2-yl)borate, triphenylphosphonium tetrakis(perfluoronaphthalen-2-yl) borate, triethylsilylium tetrakis(perfluoronaphthalen-2-yl)borate, benzene(diazonium) tetrakis(perfluoronaphthalen-2-yl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate,

[4-t-butyl-$PhNMe_2H$][$(C_6F_3(C_6F_5)_2)_4B$], trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl) borate, dimethyl(t-butyl)ammonium tetrakis-(2,3,4,6-tetrafluorophenyl)borate, N,N-dimethylanilinium tetrakis-(2,3,4,6-tetrafluorophenyl) borate, N,N-diethylanilinium tetrakis-(2,3,4,6-tetrafluorophenyl) borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl) borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl) borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl) phenyl)borate,
N,N-diethylanilinium tetrakis(3,5-bis(trifluoromethyl)phenyl)borate,
N,N-dimethyl-(2,4,6-trimethylanilinium) tetrakis(3,5-bis (trifluoromethyl)phenyl)borate,
tropillium tetrakis(3,5-bis(trifluoromethyl)phenyl)borate,
triphenylcarbenium tetrakis(3,5-bis(trifluoromethyl)phenyl) borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl) borate).

32. The process of paragraph 1, wherein the process is a solution process.

33. The process of paragraph 1 wherein the process occurs at a temperature of from about 0° C. to about 300° C., at a pressure in the range of from about 0.35 MPa to about 10 MPa, and at a residence time up to 300 minutes.

34. The process of any of paragraphs 1 to 33 wherein the process occurs at a polymerization temperature of at least of TP1° C., wherein TP1=59.97*EXP (0.0115*MFR), where MFR is the melt flow rate of the copolymer product.

35. The process of any of paragraphs 1 to 34 wherein the catalyst activity is 200 kg polymer per kg of catalyst or more, preferably 200,000 kg polymer per kg of catalyst or more.

36. The process of any of paragraphs 1 to 35 wherein the copolymer has a long chain branching index, $g'_{vis}$, of 0.95 or less as determined by GPC-3D or GPC4-D, in event of conflict, GPC-4D shall control.

37. The process of any of paragraphs 1 to 36 wherein the copolymer has an Mw of 50,000 g/mol or more, alternatively 100,000 g/mol or more.

38. The process of any of paragraphs 1 to 37, wherein the copolymer has an Mn of 25,000 g/mol or more, alternatively 50,000 g/mol or more.

39. The process of any of paragraphs 1 to 38, wherein the copolymer has an Mw/Mn of 1.5 to 15, alternatively 2.0 to 10.

40. The process of any of paragraphs 1 to 39, wherein the copolymer has a melt flow rate of 1500 g/10 min or less, alternatively 800 g/10 min or less, alternatively 600 g/10 min or less.

41. The process of any of paragraphs 1 to 40, wherein the copolymer has a Brookfield viscosity of 500 mPa·sec or more, alternatively 800 mPa·sec or more, alternatively 1000 mPa·sec or more, measured at 190° C.

42. The process of any of paragraphs 1 to 41, wherein the copolymer has an ethylene content of 5 to 26 mol %.

43. The process of any of paragraphs 1 to 42, wherein the copolymer has a Tm of 155° C. or less, alternatively 140° C. or less.

44. The process of any of paragraphs 1 to 43, wherein the copolymer has a Tc of 120° C. or less, alternatively 100° C. or less (such as 0° C. to 120° C.).

45. The process of any of paragraphs 1 to 44, wherein the copolymer has a heat of fusion of 100 J/g or less, alternatively 80 J/g or less.

46. The process of any of paragraphs 1 to 45, wherein the copolymer has a Tm of 150° C. or less and a heat of fusion of 5 J/g to 80 J/g.

47. The process of any of paragraphs 1 to 46, wherein the $r_1r_2$ of the copolymer is in range of 0.8 to 3.0, alternatively from 0.9 to 2.6.

48. The process of any of paragraphs 1 to 47, wherein the copolymer has regio defects of from 0.01 to 1.2 mol %, alternatively from 0.05 to 1.0 mol %.

49. The process of any of paragraphs 1 to 48, wherein the copolymer has an mm triad tacticity of 75% or greater, alternatively 80% or greater, alternatively from 75 to 99% mm triad tacticity.

50. The process of any of paragraphs 1 to 35, wherein the copolymer has 1, 2, 3, 4, 5, 6, 7, 8, 9, 10, 11 or 12 of the following:
a) an Mw of 50,000 g/mol or more, alternatively 100,000 g/mol or more;
b) an Mn of 25,000 g/mol or more, alternatively 50,000 g/mol or more;
c) an Mw/Mn of 1.5 to 15, alternatively 2.0 to 10;
d) a melt flow rate of 800 g/10 minutes or less, alternatively 600 g/10 minutes or less;
e) a Brookfield viscosity of 500 mPa·sec or more, alternatively 1,000 mPa·sec or more;
f) an ethylene content of 5 to 26 mol %;
g) a Tm of 155° C. or less, alternatively 140° C. or less;
h) a Tc of 120° C. or less, alternatively 100° C. or less (such as 0° C. to 120° C.);
i) a heat of fusion of 100 J/g or less, alternatively 80 J/g or less;
j) an $r_1r_2$ of the copolymer in range of 0.8 to 3.0, alternatively from 0.9 to 2.6;
k) regio defects of from 0.01 to 1.2 mol %, alternatively from 0.05 to 1.0 mol %; and
l) an mm triad tacticity of 75% or greater, alternatively 80% or greater mm triad tacticity.

51. A copolymer comprising 0.1 to 35 mol % ethylene and 99.9 to 65 mol % propylene, wherein the copolymer has:
a) an Mw of 50,000 g/mol or more, alternatively 100,000 g/mol or more;

b) an Mn of 25,000 g/mol or more, alternatively 50,000 g/mol or more;

c) an Mw/Mn of 1.5 to 15, alternatively 2.0 to 10;

d) a melt flow rate of 800 g/10 minutes or less, alternatively 600 g/10 minutes or less;

e) a Brookfield viscosity of 500 mPa·sec or more, alternatively 1,000 mPa·sec or more;

f) an ethylene content of 5 to 26 mol %;

g) a Tm of 155° C. or less, alternatively 140° C. or less;

h) a Tc of 120° C. or less, alternatively 100° C. or less;

i) a heat of fusion of 100 J/g or less, alternatively 80 J/g or less;

j) an $r_1r_2$ of the copolymer in range of 0.8 to 3.0, alternatively from 0.9 to 2.6;

k) regio defects of from 0.01 to 1.2 mol %, alternatively from 0.05 to 1.0 mol %; and l) an mm triad tacticity of 75% or greater, alternatively 80% or greater mm triad tacticity.

52. A copolymer comprising 5 to 26 mol % ethylene and 95 to 74 mol % propylene, wherein the copolymer has:

i) an $r_1r_2$ of the copolymer in range of 0.8 to 3.0, alternatively from 0.9 to 2.6;

ii) regio defects of from 0.01 to 1.2 mol %, alternatively from 0.05 to 1.0 mol %; and iii) an mm triad tacticity of 75% or greater, alternatively 80% or greater mm triad tacticity, preferably the copolymer also has a Tm of 150° C. or less and an Hf of 80 J/g or less.

53. The process of any of paragraphs 1 to 50 wherein the process occurs at a temperature of from about 140° C. to about 65° C. and the catalyst activity is 100,000 kg polymer per kg of catalyst or more.

Test Methods

Dynamic shear melt rheology test: Dynamic shear melt rheological data was measured using with the Advanced Rheometrics Expansion System (ARES-G2) from TA Instruments. A sample of approximately 1.0 gm weight is compression molded in a disk (diameter=25 mm, thickness=2 mm) at 190° C. and no stabilizers were added. Then the sample is mounted between the parallel plates (diameter=25 mm) of the ARES-G2. The test temperature is 190° C., the applied strain is 10%, and the angular frequency was varied from 0.1 rad/s to 200 rad/s. A nitrogen stream was purged through a force convection oven to minimize cross-linking or degradation during the experiments. A sinusoidal shear strain is applied to the material. A small strain amplitude is applied within the linear visco-elastic regime. The complex modulus (G*), complex viscosity (η*) and the phase angle (δ) are measured at each frequency. As those of ordinary skill in the art will be aware, the resulting steady-state stress will also oscillate sinusoidally at the same frequency but will be shifted by a phase angle δ with respect to the strain wave. For purely elastic materials δ=0° (stress is in phase with strain) and for purely viscous materials, δ=90°. For viscoelastic materials, 0<δ<90. Complex viscosity, loss modulus (G") and storage modulus (G') as function of frequency are provided by the small amplitude oscillatory shear test. Dynamic viscosity is also referred to as complex viscosity or dynamic shear viscosity. The phase or the loss angle (δ), is the inverse tangent of the ratio of G" (shear loss modulus) to G' (shear storage modulus).

Shear Thinning Ratio: Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 100 rad/sec.

Gel Permeation Chromatography GPC-4D: Unless otherwise indicated, the distribution and the moments of molecular weight (Mw, Mn, Mw/Mn, etc.) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 mLmL/min and the nominal injection volume is 200 µL. The whole system including transfer lines, columns, and detectors are contained in an oven maintained at 145° C. The polymer sample is weighed and sealed in a standard vial with 80-µL flow marker (Heptane) added to it. After loading the vial in the autosampler, polymer is automatically dissolved in the instrument with 8 mLmL added TCB solvent. The polymer is dissolved at 160° C. with continuous shaking for about 1 hour for most PE samples or 2 hour for PP samples. The TCB densities used in concentration calculation are 1.463 g/mLmL at room temperature and 1.284 g/mLmL at 145° C. The sample solution concentration is from 0.2 to 2.0 mg/mLmL, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 g/mol to 10,000,000 g/mol. The MW at each elution volume is calculated with (1):

$$\log M = \frac{\log(K_{PS}/K)}{a+1} + \frac{a_{PS}+1}{a+1}\log M_{PS} \quad (1)$$

where the variables with subscript "PS" stand for polystyrene while those without a subscript are for the test samples. In this method, $\alpha_{PS}$=0.67 and $K_{PS}$=0.000175 while a and K are for other materials as calculated and published in literature (Sun, T. et al. (2001) *Macromolecules*, v. 34, pg. 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers. Concentrations are expressed in $g/cm^3$, molecular weight is expressed in g/mol, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000 TC) as a function of molecular weight. The short-chain branch (SCB) content per 1000 TC (SCB/1000 TC) is then computed as a function of molecular weight by applying a chain-end correction to the $CH_3$/1000 TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC. \tag{2}$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}. \tag{3}$$

Then the same calibration of the $CH_3$ and $CH_2$ signal ratio, as mentioned previously in obtaining the $CH_3$/1000 TC as a function of molecular weight, is applied to obtain the bulk CH3/1000 TC. A bulk methyl chain ends per 1000 TC (bulk CH3end/1000 TC) is obtained by weight-averaging the chain-end correction over the molecular-weight range. Then, $$w2b = f * \text{bulk CH3}/1000TC \tag{4}$$

$$\text{bulk } SCB/1000TC = \text{bulk CH3}/1000TC - \text{bulk CH3}end/1000TC \tag{5}$$

and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c \tag{6}$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and Ko is the optical constant for the system:

$$K_o = \frac{4\pi^2 n^2 (dn/dc)^2}{\lambda^4 N_A} \tag{7}$$

where $N_A$ is Avogadro's number, and (dn/dc) is the refractive index increment for the system. The refractive index, n=1.500 for TCB at 145° C. and $\lambda$=665 nm. For the purpose of this invention and the claims thereto, dn/dc=0.104 and $A_2$ is 0.0006 for propylene copolymers.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the IR5 broadband channel output. The viscosity MW at each point is calculated as $$M = K_{PS} M^{\alpha_{PS}+1} / [\eta],$$

where $\alpha_{PS}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as $$g'_{vis} = \frac{[\eta]_{avg}}{KM_v^{\alpha}},$$

where $M_V$ is the viscosity-average molecular weight based on molecular weights determined by LS analysis and the K and a are for the reference linear polymer, which are, for purposes of the present disclosure, $\alpha$=0.705 and K=0.0002288 for linear propylene polymers. Concentrations are expressed in $g/cm^3$, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, et al. (2001) *Macromolecules*, v. 34(19), pp. 6812-6820.

Gel Permeation Chromotography GPC-3D: Molecular weights (number average molecular weight (Mn), weight average molecular weight (Mw), and z-average molecular weight (Mz)) may be determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B columns for separation using a flow rate of 0.54 ml/min and a nominal injection volume of 300 microliter. The detectors and columns were contained in an oven maintained at 135° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, et al. (2001) in *Macromolecules*, v. 34(19), pp. 6812-6820, incorporated herein by reference.

Solvent for the SEC experiment was prepared by dissolving 6 grams of butylated hydroxy toluene as an antioxidant in 4 liters of Aldrich reagent grade 1,2,4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI} / (dn/\mathrm{dc})$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc) =0.1048 for ethylene-propylene copolymers, and (dn/dc) =0.01048–0.0016ENB for EPDM, where ENB is the ENB content in weight percent in the ethylene-propylene-diene terpolymer. The value (dn/dc) is otherwise taken as 0.1 for other polymers and copolymers. Units of parameters used throughout this description of the SEC method are: concentration is expressed in g/cm$^3$, molecular weight is expressed in g/mol, and intrinsic viscosity is expressed in dL/g.

The light scattering detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, ΔR(θ) is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015–0.00001EE for ethylene-propylene copolymers, where EE is the ethylene content in weight percent in the ethylene-propylene copolymer. P(θ) is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

Branching Index ($g'_{vis}$): A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, ηs, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c is concentration 5 and was determined from the DRI output.

The branching index ($g'_{vis}$) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'_{vis} = \frac{[\eta]_{avg}}{kM_v^{\alpha}}.$$

The intrinsic viscosity of the linear polymer of equal molecular weight and same composition is calculated using Mark-Houwink equation, where the K and a are determined based on the composition of linear ethylene/propylene copolymer and linear ethylene-propylene-diene terpolymers using a standard calibration procedure. $M_V$ is the viscosity-average molecular weight based on molecular weights determined by LS analysis, while a and K are as calculated in the published in literature (T. Sun, et al. (2001) *Macromolecules*, v. 34(19), pp. 6812-6820).

Branching index, g'(vis), is determined by GPC-4D unless otherwise indicated. In event of conflict, GPD-4D shall be used.

Unless stated otherwise, ethylene content of propylene-ethylene copolymers is determined using FTIR according ASTM D3900. For the claims herein, ethylene content is determined by FTIR according to ASTM D3900.

Brookfield viscosity is determined according to ASTM D2983 at a temperature of 190° C.

Polymer microstructure was determined by $^{13}$CNMR as described above.

Comonomer content by $^{13}$CNMR Except for ethylene content of propylene-ethylene copolymers, the comonomer content and sequence distribution of the polymers can be measured using $^{13}$C nuclear magnetic resonance (NMR), see U.S. Pat. No. 6,525,157. Calculations involved in the characterization of polymers by NMR follow the work of J. Randall in *Polymer Sequence Determination, 13C-NMR Method*, Academic Press, New York, 1977 and Frank Bovey et. al. (1976) *Macromolecules*, v. 9, pp. 76-80. Typically polymer samples for $^{13}$C NMR spectroscopy are dissolved in 1,1,2,2-tetrachloroethane-$d_2$ at 140° C. with a concentration of 67 mg/mL and the samples are recorded at 120° C. using a NMR spectrometer with a $^{13}$C NMR frequency of 125 MHz or greater using a 90° pulse and gated decoupling.

$^1$H-NMR data of the polymer was collected at 120° C. using a 10 mm cryoprobe with a field of at least 600 MHz Bruker instrument with 1,1,2,2-tetrachloroethane-d2 (tce-d2). Samples were prepped with a concentration of 30 mg/mL at 140° C. Data was recorded with a 30° pulse, 5 second delay, 512 transients. Signals were integrated and the numbers of unsaturation types per 1,000 carbons per 1,000 carbons were reported. The shift regions for unsaturations were in the following table.

| Species | Shift Region (ppm) | Number of hydrogens per structure | Calculation |
|---|---|---|---|
| Vinyl | 4.95-5.10 | 2 | (Vinyl/2)*1000/(total) |
| Vinylidene | 4.70-4.84 | 2 | (Vinylidene/2)*1000/(total) |
| Vinylene | 5.31-5.55 | 2 | (Vinylene/2)*1000/(total) |
| Trisubstituted | 5.11-5.30 | 1 | (trisub/1)*1000/(total) |
| Aliphatic | 0-2.1 | 2 | |
| Total | | | Vinyl + vinylidene + vinylene + trisub*2 + aliphatic/2 |

Differential Scanning Calorimetry

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 or DSC2500 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the *Polymer Handbook*, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Experimental

A 10 wt % solution of bis(hydrogenated tallow alkyl) methylammonium tetrakis(pentafluorophenyl)borate (M2HTH-BF20) in methylcyclohexane solution was purchased from Boulder Scientific. N,N-dimethylanilinium tetrakis(pentafluorophenyl)borate (DMAH-BF20), N,N-dimethylanilinium tetrakis(heptafluoronaphthalen-2-yl)borate (DMAH-BF28) were purchased from WR Grace and Co. Triphenylcarbenium tetrakis(pentafluorophenyl)borate (T-BF20) was provided by Asahi Glass Corporation. Cat-Hf and Cat-Zr were prepared as described below.

Starting Materials

2-Isopropoxy-4,4,5,5-tetramethyl-1,3,2-dioxaborolane (Aldrich), 2,6-dibromopyridine (Aldrich), 2-bromoiodobenzene (Acros), 2.5 M $^n$BuLi in hexanes (Chemetall GmbH), $Pd(PPh_3)_4$(Aldrich), methoxymethyl chloride (Aldrich), NaH (60% wt. in mineral oil, Aldrich), THF (Merck), ethyl acetate (Merck), methanol (Merck), toluene (Merck), hexanes (Merck), dichloromethane (Merck), $HfCl_4$ (<0.05% Zr, Strem), $ZrCl_4$ (Strem), $Cs_2CO_3$ (Merck), $K_2CO_3$ (Merck), $Na_2SO_4$ (Akzo Nobel), silica gel 60 (40-63 um; Merck), $CDCl_3$ (Deutero GmbH) were used as received. Benzene-$d_6$ (Deutero GmbH) and dichloromethane-$d_2$ (Deutero GmbH) were dried over MS 4A prior use. THF for organometallic synthesis was freshly distilled from sodium benzophenone ketyl. Toluene and hexanes for organometallic synthesis were dried over MS 4A. 2-(Adamantan-1-yl)-4-(tert-butyl)phenol was prepared from 4-tert-butylphenol (Merck) and adamantanol-1 (Aldrich) as described in *Organic Letters*, 2015, 17(9), 2242-2245.

2-(Adamantan-1-yl)-6-bromo-4-(tert-butyl)phenol

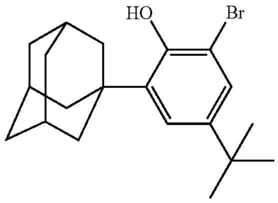 [SMILES: CC(C)(C)c1cc(Br)c(O)c(C23CC4CC(CC(C4)C2)C3)c1]

To a solution of 57.6 g (203 mmol) of 2-(adamantan-1-yl)-4-(tert-butyl)phenol in 400 mL of chloroform a solution of 10.4 mL (203 mmol) of bromine in 200 mL of chloroform was added dropwise for 30 minutes at room temperature. The resulting mixture was diluted with 400 mL of water. The obtained mixture was extracted with dichloromethane (3×100 mL), the combined organic extract was washed with 5% $NaHCO_3$, dried over $Na_2SO_4$, and then evaporated to dryness. Yield 71.6 g (97%) of a white solid. $^1$H NMR ($CDCl_3$, 400 MHz): δ 7.32 (d, J=2.3 Hz, 1H), 7.19 (d, J=2.3 Hz, 1H), 5.65 (s, 1H), 2.18-2.03 (m, 9H), 1.78 (m, 6H), 1.29 (s, 9H). $^{13}$C NMR ($CDCl_3$, 100 MHz): δ 148.07, 143.75, 137.00, 126.04, 123.62, 112.11, 40.24, 37.67, 37.01, 34.46, 31.47, 29.03.

(1-(3-Bromo-5-(tert-butyl)-2-(methoxymethoxy)phenyl)adamantane

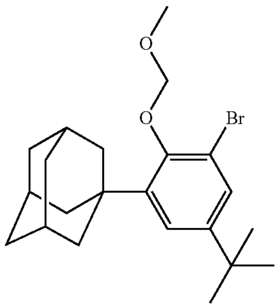 [SMILES: COCOc1c(Br)cc(C(C)(C)C)cc1C12CC3CC(CC(C3)C1)C2]

To a solution of 71.6 g (197 mmol) of 2-(adamantan-1-yl)-6-bromo-4-(tert-butyl)phenol in 1,000 mL of THF 8.28 g (207 mmol, 60% wt. in mineral oil) of sodium hydride was added portionwise at room temperature. To the resulting suspension 16.5 mL (217 mmol) of methoxymethyl chloride was added dropwise for 10 minutes at room temperature. The obtained mixture was stirred overnight, then poured into 1,000 mL of water. The obtained mixture was extracted with dichloromethane (3×300 mL), the combined organic extract was washed with 5% $NaHCO_3$, dried over $Na_2SO_4$ and then evaporated to dryness. Yield 80.3 g (~quant.) of a white solid. $^1$H NMR ($CDCl_3$, 400 MHz): δ 7.39 (d, J=2.4 Hz, 1H), 7.27 (d, J=2.4 Hz, 1H), 5.23 (s, 2H), 3.71 (s, 3H), 2.20-2.04 (m, 9H), 1.82-1.74 (m, 6H), 1.29 (s, 9H). $^{13}$C NMR ($CDCl_3$, 100 MHz): δ 150.88, 147.47, 144.42, 128.46, 123.72, 117.46, 99.53, 57.74, 41.31, 38.05, 36.85, 34.58, 31.30, 29.08.

(2-(3-Adamantan-1-yl)-5-(tert-butyl)-2-(methoxymethoxy)phenyl)-4,4,5,5-tetramethyl-1,3,2-dioxaborolane

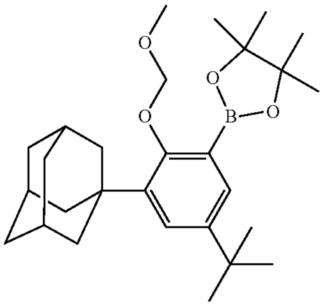 [SMILES: COCOc1c(B2OC(C)(C)C(C)(C)O2)cc(C(C)(C)C)cc1C12CC3CC(CC(C3)C1)C2]

To a solution of 22.5 g (55.0 mmol) of (1-(3-bromo-5-(tert-butyl)-2-(methoxymethoxy)phenyl)adamantane in 300 mL of dry THF 23.2 mL (57.9 mmol, 2.5 M) of $^n$BuLi in hexanes was added dropwise for 20 minutes at −80° C. The reaction mixture was stirred at this temperature for 1 hour followed by addition of 14.5 mL (71.7 mmol) of 2-isopropoxy-4,4,5,5-tetramethyl-1,3,2-dioxaborolane. The obtained suspension was stirred at room temperature for 1 hour, then poured into 300 mL of water. The obtained mixture was extracted with dichloromethane (3×300 mL), the combined organic extract was dried over $Na_2SO_4$, and then evaporated to dryness. Yield 25.0 g (~quant.) of a colorless viscous oil. $^1$H NMR ($CDCl_3$, 400 MHz): δ 7.54 (d, J=2.5 Hz, 1H), 7.43 (d, J=2.6 Hz, 1H), 5.18 (s, 2H), 3.60 (s, 3H), 2.24-2.13 (m, 6H), 2.09 (br. s., 3H), 1.85-1.75 (m, 6H), 1.37 (s, 12H), 1.33 (s, 9H). $^{13}$C NMR ($CDCl_3$, 100 MHz): δ 159.64, 144.48, 140.55, 130.58, 127.47, 100.81, 83.48, 57.63, 41.24, 37.29, 37.05, 34.40, 31.50, 29.16, 24.79.

1-(2'-Bromo-5-(tert-butyl)-2-(methoxymethoxy)-[1,1'-biphenyl]-3-yl)adamantane

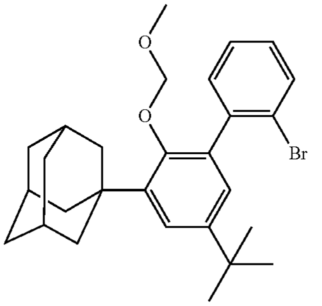 [SMILES: COCOc1c(-c2ccccc2Br)cc(C(C)(C)C)cc1C12CC3CC(CC(C3)C1)C2]

To a solution of 25.0 g (55.0 mmol) of (2-(3-adamantan-1-yl)-5-(tert-butyl)-2-(methoxymethoxy)phenyl)-4,4,5,5-tetramethyl-1,3,2-dioxaborolane in 200 mL of dioxane 15.6 g (55.0 mmol) of 2-bromoiodobenzene, 19.0 g (137 mmol) of potassium carbonate, and 100 mL of water were subsequently added. The mixture obtained was purged with argon for 10 minutes followed by addition of 3.20 g (2.75 mmol) of $Pd(PPh_3)_4$. Thus obtained mixture was stirred for 12 hours at 100° C., then cooled to room temperature and diluted with 100 mL of water. The obtained mixture was extracted with dichloromethane (3×100 mL), the combined organic extract was dried over $Na_2SO_4$ and then evaporated to dryness. The residue was purified by flash chromatography on silica gel 60 (40-63 um, eluent: hexane-dichloromethane=10:1, vol.). Yield 23.5 g (88%) of a white solid. $^1$H NMR ($CDCl_3$, 400 MHz): δ 7.68 (dd, J=1.0, 8.0 Hz, 1H), 7.42 (dd, J=1.7, 7.6 Hz, 1H), 7.37-7.32 (m, 2H), 7.20 (dt, J=1.8, 7.7 Hz, 1H), 7.08 (d, J=2.5 Hz, 1H), 4.53 (d, J=4.6 Hz, 1H), 4.40 (d, J=4.6 Hz, 1H), 3.20 (s, 3H), 2.23-2.14 (m, 6H), 2.10 (br. s., 3H), 1.86-1.70 (m, 6H), 1.33 (s, 9H). $^{13}$C NMR ($CDCl_3$, 100 MHz): δ 151.28, 145.09, 142.09, 141.47, 133.90, 132.93, 132.41, 128.55, 127.06, 126.81, 124.18, 123.87, 98.83, 57.07, 41.31, 37.55, 37.01, 34.60, 31.49, 29.17.

2-(3'-(Adamantan-1-yl)-5'-(tert-butyl)-2'-(methoxymethoxy)-[1,1'-biphenyl]-2-yl)-4,4,5,5-tetramethyl-1,3,2-dioxaborolane

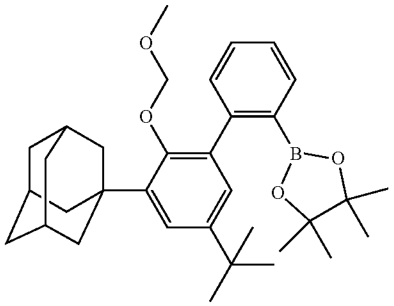 [SMILES: COCOc1c(-c2ccccc2B2OC(C)(C)C(C)(C)O2)cc(C(C)(C)C)cc1C12CC3CC(CC(C3)C1)C2]

To a solution of 30.0 g (62.1 mmol) of 1-(2'-bromo-5-(tert-butyl)-2-(methoxymethoxy)-[1,1'-biphenyl]-3-yl)adamantane in 500 mL of dry THF 25.6 mL (63.9 mmol, 2.5 M) of $^n$BuLi in hexanes was added dropwise for 20 minutes at −80° C. The reaction mixture was stirred at this temperature for 1 hour followed by addition of 16.5 mL (80.7 mmol) of 2-isopropoxy-4,4,5,5-tetramethyl-1,3,2-dioxaborolane. The obtained suspension was stirred at room temperature for 1 hour, then poured into 300 mL of water. The obtained mixture was extracted with dichloromethane (3×300 mL), the combined organic extract was dried over $Na_2SO_4$ and then evaporated to dryness. Yield 32.9 g (~quant.) of a colorless glassy solid. $^1$H NMR ($CDCl_3$, 400 MHz): δ 7.75 (d, J=7.3 Hz, 1H), 7.44-7.36 (m, 1H), 7.36-7.30 (m, 2H), 7.30-7.26 (m, 1H), 6.96 (d, J=2.4 Hz, 1H), 4.53 (d, J=4.7 Hz, 1H), 4.37 (d, J=4.7 Hz, 1H), 3.22 (s, 3H), 2.26-2.14 (m, 6H), 2.09 (br. s., 3H), 1.85-1.71 (m, 6H), 1.30 (s, 9H), 1.15 (s, 6H), 1.10 (s, 6H). $^{13}$C NMR ($CDCl_3$, 100 MHz): δ 151.35, 146.48, 144.32, 141.26, 136.15, 134.38, 130.44, 129.78, 126.75, 126.04, 123.13, 98.60, 83.32, 57.08, 41.50, 37.51, 37.09, 34.49, 31.57, 29.26, 24.92, 24.21.

(2',2'''-(Pyridine-2,6-diyl)bis((3-adamantan-1-yl)-5-(tert-butyl)-[1,1'-biphenyl]-2-ol))

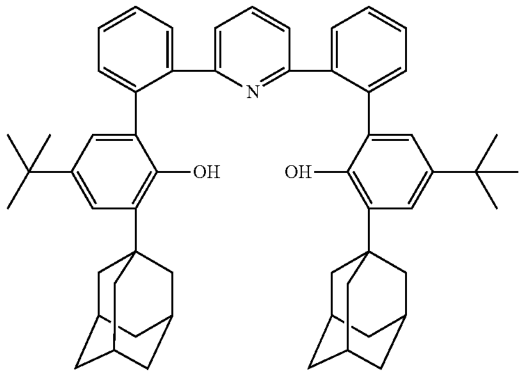 [SMILES: CC(C)(C)c1cc(-c2ccccc2-c2cccc(-c3ccccc3-c3cc(C(C)(C)C)cc(C45CC6CC(CC(C6)C4)C5)c3O)n2)c(O)c(C23CC4CC(CC(C4)C2)C3)c1]

To a solution of 32.9 g (62.0 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 140 mL of dioxane 7.35 g (31.0 mmol) of 2,6-dibromopyridine, 50.5 g (155 mmol) of cesium carbonate and 70 mL of water were subsequently added. The mixture obtained was purged with argon for 10 minutes followed by addition of 3.50 g (3.10 mmol) of $Pd(PPh_3)_4$. This mixture was stirred for 12 hours at 100° C., then cooled to room temperature and diluted with 50 mL of water. The obtained mixture was extracted with dichloromethane (3×50 mL), the combined organic extract was dried over $Na_2SO_4$ and then evaporated to dryness. To the resulting oil 300 mL of THF, 300 mL of methanol, and 21 mL of 12 N HCl were subsequently added. The reaction mixture was stirred overnight at 60° C. and then poured into 500 mL of water. The obtained mixture was extracted with dichloromethane (3×350 mL), the combined organic extract was washed with 5% $NaHCO_3$, dried over $Na_2SO_4$, and then evaporated to dryness. The residue was purified by flash chromatography on silica gel 60 (40-63 um, eluent: hexane-ethyl acetate=10:1, vol.). The obtained glassy solid was triturated with 70 mL of n-pentane, the precipitate obtained was filtered off, washed with 2×20 mL of n-pentane, and dried in vacuo. Yield 21.5 g (87%) of a mixture of two isomers as a white powder. $^1$H NMR ($CDCl_3$, 400 MHz): δ 8.10+6.59 (2s, 2H), 7.53-7.38 (m, 10H), 7.09+7.08 (2d, J=2.4 Hz, 2H), 7.04+6.97 (2d, J=7.8 Hz, 2H), 6.95+6.54 (2d, J=2.4 Hz), 2.03-1.79 (m, 18H), 1.74-1.59 (m, 12H), 1.16+1.01 (2s, 18H). $^{13}$C NMR ($CDCl_3$, 100 MHz, minor isomer shifts labeled with *): δ 157.86, 157.72*, 150.01, 149.23*, 141.82*, 141.77, 139.65*, 139.42, 137.92, 137.43, 137.32*, 136.80, 136.67*, 136.29*, 131.98*, 131.72, 130.81, 130.37*, 129.80, 129.09*, 128.91, 128.81*, 127.82*, 127.67, 126.40, 125.65*, 122.99*, 122.78, 122.47, 122.07*, 40.48, 40.37*, 37.04, 36.89*, 34.19*, 34.01, 31.47, 29.12, 29.07*.

Dimethylhafnium(2',2'''-(pyridine-2,6-diyl)bis((3-adamantan-1-yl)-5-(tert-butyl)-[1,1'-biphenyl]-2-olate)) (Cat-Hf)

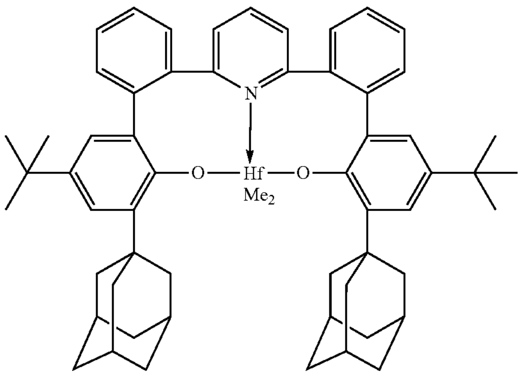

To a suspension of 3.22 g (10.05 mmol) of hafnium tetrachloride (<0.05% Zr) in 250 mL of dry toluene 14.6 mL (42.2 mmol, 2.9 M) of MeMgBr in diethyl ether was added in one portion via syringe at 0° C. The resulting suspension was stirred for 1 minute, and 8.00 g (10.05 mmol) of (2',2'''-(pyridine-2,6-diyl)bis((3-adamantan-1-yl)-5-(tert-butyl)-[1,1'-biphenyl]-2-ol)) was added portionwise for 1 minute. The reaction mixture was stirred for 36 hours at room temperature and then evaporated to near dryness. The solid obtained was extracted with 2×100 mL of hot toluene, and the combined organic extract was filtered through a thin pad of Celite 503. Next, the filtrate was evaporated to dryness. The residue was triturated with 50 mL of n-hexane, the obtained precipitate was filtered off (G3), washed with 20 mL of n-hexane (2×20 mL), and then dried in vacuo. Yield 6.66 g (61%, ~1:1 solvate with n-hexane) of a light-beige solid. Anal. Calc. for $C_{59}H_{69}HfNO_2$×1.0 ($C_6H_{14}$): C, 71.70; H, 7.68; N, 1.29. Found: C, 71.95; H, 7.83; N, 1.18. $^1$H NMR ($C_6D_6$, 400 MHz): δ 7.58 (d, J=2.6 Hz, 2H), 7.22-7.17 (m, 2H), 7.14-7.08 (m, 4H), 7.07 (d, J=2.5 Hz, 2H), 7.00-6.96 (m, 2H), 6.48-6.33 (m, 3H), 2.62-2.51 (m, 6H), 2.47-2.35 (m, 6H), 2.19 (br.s, 6H), 2.06-1.95 (m, 6H), 1.92-1.78 (m, 6H), 1.34 (s, 18H), −0.12 (s, 6H). $^{13}$C NMR ($C_6D_6$, 100 MHz): δ 159.74, 157.86, 143.93, 140.49, 139.57, 138.58, 133.87, 133.00, 132.61, 131.60, 131.44, 127.98, 125.71, 124.99, 124.73, 51.09, 41.95, 38.49, 37.86, 34.79, 32.35, 30.03.

Dimethylzirconium(2',2'''-(pyridine-2,6-diyl)bis((3-adamantan-1-yl)-5-(tert-butyl)-[1,1'-biphenyl]-2-olate)) (Cat-Zr)

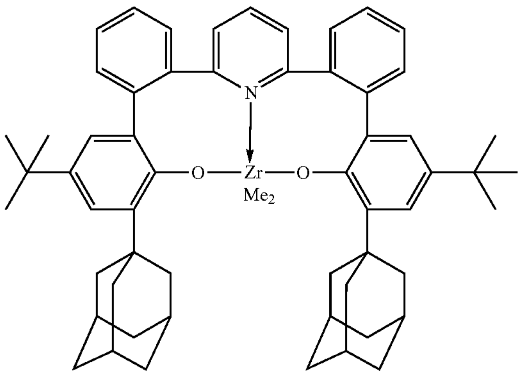

To a suspension of 2.92 g (12.56 mmol) of zirconium tetrachloride in 300 mL of dry toluene 18.2 mL (52.7 mmol, 2.9 M) of MeMgBr in diethyl ether was added in one portion via syringe at 0° C. To the resulting suspension 10.00 g (12.56 mmol) of (2',2'''-(pyridine-2,6-diyl)bis((3-adamantan-1-yl)-5-(tert-butyl)-[1,1'-biphenyl]-2-ol)) was immediately added in one portion. The reaction mixture was stirred for 2 hours at room temperature and then evaporated to near dryness. The solid obtained was extracted with 2×100 mL of hot toluene, and the combined organic extract was filtered through a thin pad of Celite 503. Next, the filtrate was evaporated to dryness. The residue was triturated with 50 mL of n-hexane, the obtained precipitate was filtered off (G3), washed with n-hexane (2×20 mL), and then dried in vacuo. Yield 8.95 g (74%, ~1:0.5 solvate with n-hexane) of a beige solid. Anal. Calc. for $C_{59}H_{69}ZrNO_2$×0.5 ($C_6H_{14}$): C, 77.69; H, 7.99; N, 1.46. Found: C, 77.90; H, 8.15; N, 1.36. $^1$H NMR ($C_6D_6$, 400 MHz): δ 7.56 (d, J=2.6 Hz, 2H), 7.20-7.17 (m, 2H), 7.14-7.07 (m, 4H), 7.07 (d, J=2.5 Hz, 2H), 6.98-6.94 (m, 2H), 6.52-6.34 (m, 3H), 2.65-2.51 (m, 6H), 2.49-2.36 (m, 6H), 2.19 (br.s., 6H), 2.07-1.93 (m, 6H), 1.92-1.78 (m, 6H), 1.34 (s, 18H), 0.09 (s, 6H). $^{13}$C NMR ($C_6D_6$, 100 MHz): (159.20, 158.22, 143.79, 140.60, 139.55, 138.05, 133.77, 133.38, 133.04, 131.49, 131.32, 127.94, 125.78, 124.65, 124.52, 42.87, 41.99, 38.58, 37.86, 34.82, 32.34, 30.04.

Polymerization

Polymerizations described as Examples 1-24 and Comparative Examples C01-C014 were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of liquid were controlled using Coriolis mass flow controller (Quantim series from Brooks). Ethylene flowed as a gas under its own pressure through a Brooks flow controller. Ethylene and propylene feeds were combined into one stream and then mixed with a pre-chilled isohexane stream that had been cooled to at least 0° C. The mixture was then fed to the reactor through a single line. Solutions of tri(n-octyl)aluminum were added to the combined solvent and monomer stream just before they entered the reactor. Catalyst solution was fed to the reactor using an ISCO syringe pump through a separated line.

Isohexane (used as solvent), and monomers (e.g., propylene and ethylene) were purified over beds of alumina and molecular sieves. Toluene, methylcyclohexane and isohexane used for preparing catalyst solutions were purified by the same technique.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The detailed polymerization process conditions and physical properties of the polymers produced are listed in Tables 2 to 4 below. All the reactions were carried out at a pressure of about 2.4 MPa/g unless otherwise mentioned. The complex Cat-Hf was used for Examples 01 to 08. The catalyst solution was prepared by combining complex Cat-Hf (ca. 20 mg) with N,N-dimethylanilinium tetrakis(pentafluorophenyl)borate (DMAH-BF20) at a molar ratio of about 1:1 in 900 ml of toluene. A solution of tri-n-octyl aluminum (TNOA) (25 wt % in hexane, Sigma Aldrich) was further diluted in isohexane at a concentration of $2.7\times10^{-3}$ mol/liter. Molecular weight for samples in Example 02 and 03 were measured using GPC-4D with IR detector only.

Examples 09 to 14 followed the same polymerization procedure as used for Examples 01 to 08 except that complex Cat-Zr was used. The process condition for a few samples was adjusted in favor of long chain branching architecture production. In examples 15 to 17, the catalyst solution was prepared by combining complex Cat-Zr (ca. 20 mg) with dimethylanilinium tetrakis(heptafluoronaphthalen-2-yl) borate (DMAH-BF28) at a molar ratio of about 1:1 in 900 ml of toluene. In Example 18 to 20, the catalyst solution was prepared by combining complex Cat-Zr (ca. 20 mg) with M2HTH-BF20 at a molar ratio of about 1:1 in 900 ml of toluene. In Examples 21 to 23, separate solutions of Cat-Zr and M2HTH-BF20 were prepared; each solutions was approximately 0.025 mM in concentration in isohexane solvent. The solutions were each fed into the reactor separately for in situ activation. In Example 24, the catalyst solution was prepared by combining complex Cat-Zr (ca. 20 mg) with T-BF20 at a molar ratio of about 1:1 in 900 ml of toluene. Molecular weight for samples in Example 07, 08, 10-14 and 17-23 were measured using GPC-4D with IR detector only.

TABLE 2

| Example # | 01 | 02 | 03 | 04 |
|---|---|---|---|---|
| Polymerization temperature (° C.) | 110 | 100 | 90 | 120 |
| Ethylene feed rate (g/min) | 0.90 | 0.90 | 0.90 | 0.90 |
| Propylene feed rate (g/min) | 14 | 14 | 14 | 14 |
| Isohexane feed rate (g/min) | 47.7 | 47.7 | 47.7 | 47.7 |
| Catalyst | Cat-Hf | Cat-Hf | Cat-Hf | Cat-Hf |
| Activator | DMAH-BF20 | DMAH-BF20 | DMAH-BF20 | DMAH-BF20 |
| Catalyst feed rate (mol/min) | 4.432E−08 | 4.432E−08 | 4.432E−08 | 4.432E−08 |
| TNOA feed rate (mol/min) | 3.693E−06 | 3.693E−06 | 3.693E−06 | 3.693E−06 |
| Collection time (min) | 40 | 40 | 40 | 40 |
| Polymer made (gram) | 432.7 | 458.1 | 468.1 | 413.9 |
| Conversion (%) | 72.6% | 76.8% | 78.5% | 69.4% |
| Catalyst productivity (kg poly/kg catalyst) | 243,420 | 257,709 | 263,335 | 232,844 |
| Complex viscosity at 0.1 rad/sec (Pa · s) | | 2,278 | 17,032 | |
| Complex viscosity at 100 rad/s (Pa · s) | | 430 | 895 | |
| Shear thinning ratio (—) | | 5.30 | 19.04 | |
| MFR (g/10 min) | 79.6 | 19.6 | 5.3 | 314.5 |
| Mn_IR (g/mol) | | 81,336 | 111,642 | |
| Mw_IR (g/mol) | | 196,312 | 280,077 | |
| Mz_IR (g/mol) | | 361,993 | 529,449 | |
| Tc (° C.) | 56.3 | 59.3 | 58.9 | 59.5 |
| Tm (° C.) | 102.2 | 103.1 | 104.5 | 100.7 |
| Tg (° C.) | −18.4 | −19.2 | −17.8 | −20.6 |
| Heat of fusion (J/g) | 56.5 | 56.5 | 58.9 | 55.0 |
| Ethylene content by FTIR (wt %) | 6.9% | 6.8% | 6.6% | 7.7% |
| Ethylene content by FTIR (mol %) | 10.0% | 9.9% | 9.6% | 11.1% |
| r1r2 (—) | | 1.20 | 1.22 | |
| Vinylenes/1000 Carbon | 0.07 | | | 0.12 |
| Trisubstituted olefin/1000 Carbon | 0.05 | | | 0.03 |
| Tc (° C.) | 16.9 | 10.9 | | |
| Tm (° C.) | 68.2 | 64.2 | | |
| Tg (° C.) | −29.9 | −30.2 | −32.3 | −36.0 |
| Heat of fusion (J/g) | 28.8 | 29.5 | | |
| Ethylene content by FTIR (wt %) | 13.1% | 13.6% | 17.0% | 17.6% |
| Ethylene content by FTIR (mol %) | 18.5% | 19.1% | 23.4% | 24.3% |
| r1r2 (—) | 1.16 | 1.16 | 1.17 | 1.14 |
| Vinylenes/1000 Carbon | | | 0.15 | |
| Trisubstituted olefin/1000 Carbon | | | 0.33 | |
| Vinyls/1000 Carbon | | | 0.32 | |
| Vinylidenes/1000 Carbon | | | 0.15 | |
| 1,2-Propylene addition sequence distribution | | | | |
| [EEE] | 0.006 | 0.007 | 0.016 | 0.016 |
| [EEP] | 0.050 | 0.051 | 0.081 | 0.086 |
| [PEP] | 0.111 | 0.112 | 0.126 | 0.130 |
| [EPE] | 0.031 | 0.032 | 0.049 | 0.050 |
| [EPP] | 0.214 | 0.218 | 0.251 | 0.253 |
| [PPP] | 0.588 | 0.580 | 0.476 | 0.466 |

TABLE 2-continued

| Example # | 01 | 02 | 03 | 04 |
|---|---|---|---|---|
| [EE] | 0.031 | 0.033 | 0.057 | 0.058 |
| [EP + PE] | 0.274 | 0.278 | 0.342 | 0.349 |
| [PP] | 0.695 | 0.689 | 0.601 | 0.592 |
| Triad tacticity index (% mm) | 97.8% | 97.4% | 95.7% | 96.5% |
| Total regio defects (mol %) | 0.298 | 0.275 | 0.113 | 0.180 |
| 2,1-E (mol %) | 0.110 | 0.110 | −0.070 | 0.030 |
| 2,1-EE (mol %) | 0.190 | 0.160 | 0.180 | 0.150 |
| 2,1-P (mol %) | 0 | 0 | 0 | 0 |
| Ethylene content by NMR (wt %) | 6.3% | 12.0% | 12.2% | 16.3% |
| Ethylene content by NMR (mol %) | 9.0% | 17.0% | 17.3% | 22.6% |

TABLE 3

| Example # | 09 | 10 | 11 |
|---|---|---|---|
| Polymerization temperature (° C.) | 93 | 100 | 90 |
| Ethylene feed rate (g/min) | 0.90 | 1.70 | 1.70 |
| Propylene feed rate (g/min) | 14 | 14 | 14 |
| Isohexane feed rate (g/min) | 47.7 | 47.7 | 47.7 |
| Catalyst | Cat-Zr | Cat-Zr | Cat-Zr |
| Activator | DMAH-BF20 | DMAH-BF20 | DMAH-BF20 |
| Catalyst feed rate (mol/min) | 2.428E−08 | 1.214E−08 | 1.214E−08 |
| TNOA feed rate (mol/min) | 3.693E−06 | 3.693E−06 | 3.693E−06 |
| Collection time (min) | 40 | 30 | 30 |
| Polymer made (gram) | 586.3 | 440.4 | 261.4 |
| Conversion (%) | 98.3% | 93.5% | 55.5% |
| Catalyst productivity (kg poly/kg catalyst) | 659,478 | 1,320,981 | 784,070 |
| Complex viscosity at 0.1 rad/sec (Pa · s) | 13,613 | | 4,078 |
| Complex viscosity at 100 rad/s (Pa · s) | 499 | | 847 |
| Shear thinning ratio (—) | 27.26 | | 4.81 |
| MFR (g/10 min) | 7.5 | 30.2 | 9.3 |
| Mn_IR (g/mol) | 90,916 | 26,722 | 142,241 |
| Mw_IR (g/mol) | 291,153 | 69,967 | 308,776 |
| Mz_IR (g/mol) | 607,460 | 141,492 | 533,118 |
| LCB index, g'vis, (—) | 0.779 | | |
| Tc (° C.) | 64.7 | 30.5 | 6.5 |
| Tm (° C.) | 111.6 | 85.7 | 55.1 |
| Tg (° C.) | −18.7 | −26.0 | −28.6 |
| Heat of fusion (J/g) | 63.7 | 36.5 | 14.9 |
| Ethylene content by FTIR (wt %) | 6.1% | 10.8% | 14.5% |
| Ethylene content by FTIR (mol %) | 8.9% | 15.4% | 20.2% |
| r1r2 (—) | 1.96 | 1.75 | 1.53 |
| 1,2-Propylene addition sequence distribution | | | |
| [EEE] | 0.003 | 0.009 | 0.015 |
| [EEP] | 0.019 | 0.048 | 0.073 |
| [PEP] | 0.061 | 0.091 | 0.110 |
| [EPE] | 0.013 | 0.030 | 0.045 |
| [EPP] | 0.126 | 0.180 | 0.212 |
| [PPP] | 0.778 | 0.641 | 0.544 |
| [EE] | 0.013 | 0.033 | 0.052 |
| [EP + PE] | 0.147 | 0.235 | 0.298 |
| [PP] | 0.841 | 0.731 | 0.650 |
| Triad tacticity index (% mm) | 98.6% | 98.5% | 98.6% |
| Total regio defects (mol %) | 0.550 | 0.635 | 0.583 |
| 2,1-E (mol %) | 0.340 | 0.260 | 0.240 |
| 2,1-EE (mol %) | 0.210 | 0.380 | 0.340 |
| 2,1-P (mol %) | 0 | 0 | 0 |
| Ethylene content by NMR (wt %) | 16.8% | 11.0% | 14.6% |
| Ethylene content by NMR (mol %) | 23.3% | 15.6% | 20.4% |
| Polymerization temperature (° C.) | 100 | 90 | 80 |
| Ethylene feed rate (g/min) | 1.92 | 1.92 | 1.92 |
| Propylene feed rate (g/min) | 14 | 14 | 14 |
| Isohexane feed rate (g/min) | 47.7 | 47.7 | 47.7 |

TABLE 3-continued

| Example # | 09 | 10 | 11 |
|---|---|---|---|
| Catalyst | Cat-Zr | Cat-Zr | Cat-Zr |
| Activator | DMAH-BF20 | DMAH-BF20 | DMAH-BF20 |
| Catalyst feed rate (mol/min) | 7.283E−09 | 4.855E−09 | 3.641E−09 |
| TNOA feed rate (mol/min) | 7.385E−06 | 7.385E−06 | 7.385E−06 |
| Collection time (min) | 30 | 30 | 30 |
| Polymer made (gram) | 336.1 | 270.7 | 238.7 |
| Conversion (%) | 70.4% | 56.7% | 50.0% |
| Catalyst productivity (kg poly/kg catalyst) | 1,680,452 | 2,030,331 | 2,387,259 |
| Complex viscosity at 0.1 rad/sec (Pa · s) | 3709.7 | 1920.4 | 29264.0 |
| Complex viscosity at 100 rad/s (Pa · s) | 746.9 | 593.7 | 2354.0 |
| Shear thinning ratio (—) | 4.97 | 3.23 | 12.43 |
| MFR (g/10 min) | 11.3 | 14.1 | 2.2 |
| Mn_IR (g/mol) | 82,200 | 120,523 | 152,114 |
| Mw_IR (g/mol) | 188,196 | 268,110 | 323,304 |
| Mz_IR (g/mol) | 334,266 | 461,623 | 543,880 |
| Tc (° C.) | 5.2 | 16.7 | 15.6 |
| Tm (° C.) | 56.2 | 54.3 | 50.4 |
| Tg (° C.) | −29.9 | −30.3 | −35.0 |
| Heat of fusion (J/g) | 31.8 | 6.2 | 3.0 |
| Ethylene content by FTIR (wt %) | 14.5% | 16.0% | 17.5% |
| Ethylene content by FTIR (mol %) | 20.3% | 22.2% | 24.1% |
| r1r2 (—) | 1.61 | 1.51 | 1.52 |
| 1,2-Propylene addition sequence distribution | | | |
| [EEE] | 0.016 | 0.020 | 0.024 |
| [EEP] | 0.074 | 0.084 | 0.091 |
| [PEP] | 0.106 | 0.113 | 0.116 |
| [EPE] | 0.045 | 0.052 | 0.055 |
| [EPP] | 0.209 | 0.221 | 0.227 |
| [PPP] | 0.550 | 0.509 | 0.487 |
| [EE] | 0.053 | 0.062 | 0.069 |
| [EP + PE] | 0.293 | 0.318 | 0.331 |
| [PP] | 0.655 | 0.620 | 0.600 |
| Triad tacticity index (% mm) | 97.5% | 97.5% | 97.4% |
| Total regio defects (mol %) | 0.673 | 0.617 | 0.691 |
| 2,1-E (mol %) | 0.240 | 0.200 | 0.160 |
| 2,1-EE (mol %) | 0.430 | 0.420 | 0.530 |
| 2,1-P (mol %) | 0 | 0 | 0 |
| Ethylene content by NMR (wt %) | 14.5% | 16.1% | 17.3% |
| Ethylene content by NMR (mol %) | 20.3% | 22.4% | 23.9% |

TABLE 4

| Example # | 15 | 16 | 17 | 18 | 19 |
|---|---|---|---|---|---|
| Polymerization temperature (° C.) | 90 | 70 | 80 | 90 | 80 |
| Ethylene feed rate (g/min) | 1.92 | 1.92 | 1.92 | 1.92 | 1.92 |
| Propylene feed rate (g/min) | 14 | 14 | 14 | 14 | 14 |
| Isohexane feed rate (g/min) | 47.7 | 47.7 | 47.7 | 47.7 | 47.7 |
| Catalyst | Cat-Zr | Cat-Zr | Cat-Zr | Cat-Zr | Cat-Zr |
| Activator | DMAH-BF28 | DMAH-BF28 | DMAH-BF28 | M2HTH-BF20 | M2HTH-BF20 |
| Catalyst feed rate (mol/min) | 7.283E−09 | 4.855E−09 | 4.855E−09 | 2.428E−08 | 1.942E−08 |
| TNOA feed rate (mol/min) | 7.385E−06 | 1.225E−05 | 7.385E−06 | 7.385E−06 | 7.385E−06 |
| Collection time (min) | 40 | 40 | 30 | 30 | 30 |
| Polymer made (gram) | 209.1 | 184.8 | 221.3 | 288.6 | 259.8 |
| Conversion (%) | 32.8% | 29.0% | 46.3% | 60.4% | 54.4% |
| Catalyst productivity (kg poly/kg catalyst) | 784,102 | 1,039,542 | 1,659,816 | 432,828 | 487,144 |
| Complex viscosity at 0.1 rad/sec (Pa · s) | | | 21,488 | 22,607 | 27,546 |
| Complex viscosity at 100 rad/s (Pa · s) | | | 2,010 | 1,746 | 2,087 |
| Shear thinning ratio (—) | | | 10.69 | 12.95 | 13.20 |
| MFR (g/10 min) | 15.7 | 2.5 | 2.1 | 2.2 | 1.5 |
| Mn_IR (g/mol) | | | 145,457 | 130,944 | 157,070 |
| Mw_IR (g/mol) | | | 307,442 | 286,842 | 336,777 |
| Mz_IR (g/mol) | | | 515,796 | 495,940 | 565,855 |

TABLE 4-continued

| Example # | 15 | 16 | 17 | 18 | 19 |
|---|---|---|---|---|---|
| Tc (° C.) | | | | 14.0 | 19.1 |
| Tm (° C.) | | | | 52.2 | 52.2 |
| Tg (° C.) | −34.7 | −39.3 | −31.4 | −30.9 | −31.6 |
| Heat of fusion (J/g) | | | | 8.4 | 2.3 |
| Ethylene content by FTIR (wt %) | 20.7% | 21.2% | 17.3% | 15.8% | 16.8% |
| Ethylene content by FTIR (mol %) | 28.1% | 28.7% | 23.8% | 21.9% | 23.3% |
| r1r2 (—) | | | 1.47 | 1.59 | 1.50 |
| Vinylenes/1000 Carbon | | | 0.03 | | 0 |
| Trisubstituted olefin/1000 Carbon | | | 0.14 | | 0.13 |
| Vinyls/1000 Carbon | | | 0.18 | | 0.2 |
| Vinylidenes/1000 Carbon | | | 0.09 | | 0.08 |
| 1,2-Propylene addition sequence distribution | | | | | |
| [EEE] | | | 0.023 | 0.020 | 0.021 |
| [EEP] | | | 0.094 | 0.082 | 0.088 |
| [PEP] | | | 0.120 | 0.112 | 0.117 |
| [EPE] | | | 0.055 | 0.049 | 0.053 |
| [EPP] | | | 0.230 | 0.215 | 0.225 |
| [PPP] | | | 0.478 | 0.522 | 0.496 |
| [EE] | | | 0.070 | 0.061 | 0.065 |
| [EP + PE] | | | 0.337 | 0.310 | 0.326 |
| [PP] | | | 0.593 | 0.629 | 0.609 |
| Triad tacticity index (% mm) | | | 96.9% | 99.6% | 97.4% |
| Total regio defects (mol %) | | | 0.453 | 0.612 | 0.513 |
| 2,1-E (mol %) | | | 0.150 | 0.170 | 0.140 |
| 2,1-EE (mol %) | | | 0.310 | 0.440 | 0.370 |
| 2,1-P (mol %) | | | 0 | 0 | 0 |
| Ethylene content by NMR (wt %) | | | 17.5% | 15.9% | 16.8% |
| Ethylene content by NMR (mol %) | | | 24.2% | 22.1% | 23.2% |
| Polymerization temperature (° C.) | 80 | 70 | 90 | 80 | 100 |
| Ethylene feed rate (g/min) | 1.92 | 1.92 | 1.92 | 1.92 | 1.92 |
| Propylene feed rate (g/min) | 14 | 14 | 14 | 14 | 14 |
| Isohexane feed rate (g/min) | 47.7 | 47.7 | 47.7 | 47.7 | 47.7 |
| Catalyst | Cat-Zr | Cat-Zr (in situ activation) | Cat-Zr (in situ activation) | Cat-Zr (in situ activation) | Cat-Zr |
| Activator | M2HTH-BF20 | M2HTH-BF20 | M2HTH-BF20 | M2HTH-BF20 | T-BF20 |
| Catalyst feed rate (mol/min) | 3.641E−09 | 1.942E−08 | 7.283E−09 | 6.069E−09 | 7.283E−09 |
| TNOA feed rate (mol/min) | 7.385E−06 | 7.385E−06 | 7.385E−06 | 7.385E−06 | 7.385E−06 |
| Collection time (min) | 40 | 30 | 40 | 40 | 20 |
| Polymer made (gram) | 259.7 | 215.2 | 374.8 | 262.8 | 264.2 |
| Conversion (%) | 40.8% | 45.1% | 58.8% | 41.3% | 83.0% |
| Catalyst productivity (kg poly/kg catalyst) | 1,947,962 | 403,516 | 1,405,460 | 1,182,599 | 1,981,443 |
| Complex viscosity at 0.1 rad/sec (Pa · s) | 34276.0 | 38432.4 | 22963.9 | 31218.7 | |
| Complex viscosity at 100 rad/s (Pa · s) | 2564.9 | 2553.8 | 1764.7 | 2456.2 | |
| Shear thinning ratio (—) | 13.36 | 15.05 | 13.01 | 12.71 | |
| MFR (g/10 min) | 1.9 | 1.0 | 2.9 | 2.0 | 11.2 |
| Mn_IR (g/mol) | 161,756 | 183,120 | 139,123 | 163,429 | |
| Mw_IR (g/mol) | 344,905 | 385,914 | 304,558 | 343,771 | |
| Mz_IR (g/mol) | 573,138 | 644,035 | 524,761 | 573,801 | |
| Tc (° C.) | | | 12.4 | | 13.5 |
| Tm (° C.) | | | 50.8 | | 68.3 |
| Tg (° C.) | −36.9 | −32.5 | −31.8 | −36.8 | −28.0 |
| Heat of fusion (J/g) | | | 9.4 | | 25.0 |
| Ethylene content by FTIR (wt %) | 19.4% | 17.6% | 15.6% | 18.7% | 12.7% |
| Ethylene content by FTIR (mol %) | 26.5% | 24.3% | 21.7% | 25.6% | 17.9% |
| r1r2 (—) | 1.57 | 1.47 | 1.55 | 1.49 | |
| Vinylenes/1000 Carbon | | 0.05 | | | |
| Trisubstituted olefin/1000 Carbon | | 0.14 | | | |
| Vinyls/1000 Carbon | | 0.13 | | | |
| Vinylidenes/1000 Carbon | | 0.12 | | | |
| 1,2-Propylene addition sequence distribution | | | | | |
| [EEE] | 0.031 | 0.035 | 0.020 | 0.029 | |
| [EEP] | 0.109 | 0.101 | 0.085 | 0.109 | |
| [PEP] | 0.121 | 0.130 | 0.115 | 0.123 | |

TABLE 4-continued

| Example # | 15 | 16 | 17 | 18 | 19 |
|---|---|---|---|---|---|
| [EPE] | 0.062 | 0.073 | 0.050 | 0.064 | |
| [EPP] | 0.229 | 0.214 | 0.217 | 0.230 | |
| [PPP] | 0.449 | 0.448 | 0.514 | 0.446 | |
| [EE] | 0.086 | 0.086 | 0.062 | 0.084 | |
| [EP + PE] | 0.351 | 0.360 | 0.316 | 0.356 | |
| [PP] | 0.563 | 0.555 | 0.622 | 0.561 | |
| Triad tacticity index (% mm) | 98.9% | | 96.2% | 95.9% | |
| Total regio defects (mol %) | 0.561 | 0.550 | 0.526 | 0.535 | |
| 2,1-E (mol %) | 0.070 | 0.170 | 0.180 | 0.140 | |
| 2,1-EE (mol %) | 0.490 | 0.370 | 0.350 | 0.400 | |
| 2,1-P (mol %) | 0 | 0 | 0 | 0 | |
| Ethylene content by NMR (wt %) | 19.6% | 21.7% | 16.3% | 19.5% | |
| Ethylene content by NMR (mol %) | 26.7% | 29.4% | 26.7% | 26.7% | |

Examples C01 to C14 are comparative examples. Examples C04 to C14 were made by following the same polymerization procedure as used for Examples 01 to 08 except that rac-dimethylsilyl bis(indenyl)hafnium dimethyl was used as the catalyst. The catalyst solution was prepared by combining rac-dimethylsilyl bis(indenyl)hafnium dimethyl (approximately 30 mL) with dimethylanilinium tetrakis(heptafluoronaphthalen-2-yl) borate (DMAH-BF28) at a molar ratio of about 1:1 in 900 ml of toluene. The scavenger feed solution rate was adjusted (from 0 to 5 ml/min) to reach the targeted conversion. The detailed process condition and some characterization data are listed in Table 5.

TABLE 5

| Example # | C01 | C02 | C03 | C04 | C05 |
|---|---|---|---|---|---|
| Polymerization temperature (° C.) | 64 | 50 | 55 | 50 | 97 |
| Ethylene feed rate (g/min) | 1.70 | 1.70 | 1.81 | 1.81 | 0.95 |
| Propylene feed rate (g/min) | 14 | 14 | 14 | 14 | 11 |
| Isohexane feed rate (g/min) | 54 | 54 | 54 | 54 | 41.7 |
| Catalyst feed rate (mol/min) | 1.122E−07 | 5.836E−08 | 4.489E−08 | 3.928E−08 | 1.684E−08 |
| Collection Time (min) | 40 | 40 | 40 | 40 | 40 |
| Polymer made (gram) | 523 | 205 | 371.2 | 301.9 | 135.2 |
| Conversion (%) | 83.3% | 32.7% | 58.7% | 47.7% | 28.3% |
| Catalyst productivity (kg poly/kg catalyst) | 235,420 | 177,408 | 417,631 | 388,174 | 405,480 |
| Complex viscosity at 0.1 rad/sec (Pa · s) | 783.0 | 13979.6 | 6265.0 | 873.7 | 435.3 |
| Complex viscosity at 100 rad/sec (Pa · s) | 455.1 | 1890.1 | 1360.0 | 308.1 | 265.8 |
| Shear thinning ratio (—) | 1.72 | 7.40 | 4.61 | 2.84 | 1.64 |
| MFR (g/10 min) | 13.2 | 1.8 | 2.8 | 2.6 | 57.7 |
| Mn_DRI (g/mol) | 105,010 | 150,721 | 151,803 | 159,273 | 53,625 |
| Mw_DRI (g/mol) | 208,482 | 311,210 | 284,398 | 311,836 | 119,617 |
| Mz_DRI (g/mol) | 337,586 | 512,389 | 450,049 | 499,883 | 196,073 |
| MWD (—) | 1.99 | 2.06 | 1.87 | 1.96 | 2.23 |
| Mn_LS (g/mol) | 116,591 | 177,920 | 169,154 | 179,218 | 61,488 |
| Mw_LS (g/mol) | 208,392 | 333,099 | 288,942 | 324,205 | 117,160 |
| Mz_LS (g/mol) | 317,228 | 480,976 | 421,162 | 471,669 | 181,950 |
| g'vis (—) | 0.97 | 0.99 | 1.00 | 0.99 | 0.94 |
| Tc (° C.) | 11.0 | | | | 23.4 |
| Tm (° C.) | 62.1 | | | | 59.9 |
| Tg (° C.) | −26.2 | −32.0 | −29.6 | −31.6 | −29.4 |
| Ethylene content by FTIR (wt %) | 12.9% | 18.2% | 14.6% | 16.5% | 15.8% |
| Ethylene content by FTIR(mol %) | 18.2% | 25.1% | 20.4% | 22.9% | 22.0% |
| Vinyls/1000 Carbon | 0.05 | 0.05 | 0.05 | 0.06 | 0.1 |
| Vinylenes/1000 Carbon | 0.02 | 0.02 | 0.02 | 0.03 | 0.02 |
| Trisubstituted olefin/1000 Carbon | 0.1 | 0.2 | 0.2 | 0.23 | 0.18 |
| Vinylidenes/1000 Carbon | 0.16 | 0.09 | 0.09 | 0.08 | 0.1 |
| r1r2 (—) | 0.91 | 0.78 | 0.81 | 0.82 | 0.81 |

TABLE 5-continued

| 1,2-Propylene addition sequence distribution | | | | | |
|---|---|---|---|---|---|
| EEE | 0.005 | 0.011 | 0.007 | 0.010 | 0.009 |
| EEP | 0.034 | 0.069 | 0.052 | 0.062 | 0.056 |
| PEP | 0.114 | 0.151 | 0.135 | 0.144 | 0.140 |
| EPE | 0.032 | 0.064 | 0.047 | 0.056 | 0.054 |
| EPP | 0.199 | 0.241 | 0.229 | 0.236 | 0.230 |
| PPP | 0.616 | 0.464 | 0.530 | 0.491 | 0.511 |
| EE | 0.022 | 0.046 | 0.033 | 0.041 | 0.037 |
| EP + PE | 0.262 | 0.370 | 0.323 | 0.349 | 0.337 |
| PP | 0.716 | 0.584 | 0.644 | 0.610 | 0.626 |
| Triad tacticity index (% mm) | 91.2% | 78.1% | 81.4% | 81.8% | 81.2% |
| Total regio defects (mol %) | 0.667 | 0.796 | 0.628 | 0.804 | 0.641 |
| 2,1-E (mol %) | 0.386 | 0.396 | 0.355 | 0.408 | 0.305 |
| 2,1-EE (mol %) | 0.281 | 0.400 | 0.273 | 0.396 | 0.336 |
| 2,1-P (mol %) | 0 | 0 | 0 | 0 | 0 |
| Ethylene content by NMR (wt %) | 11.3% | 17.3% | 14.3% | 16.1% | 15.2% |
| Ethylene content by NMR (mol %) | 16.0% | 23.9% | 20.1% | 22.4% | 21.2% |

| Example # | C06 | C07 | C08 | C09 | C10 |
|---|---|---|---|---|---|
| Polymerization temperature (° C.) | 97 | 97 | 97 | 63 | 63 |
| Ethylene feed rate (g/min) | 0.95 | 0.95 | 0.95 | 1.87 | 1.87 |
| Propylene feed rate (g/min) | 11 | 11 | 11 | 15 | 15 |
| Isohexane feed rate (g/min) | 41.7 | 41.7 | 41.7 | 66.5 | 66.5 |
| Catalyst feed rate (mol/min) | 2.806E−08 | 3.928E−08 | 5.051E−08 | 2.020E−08 | 3.367E−08 |
| Collection Time (min) | 40 | 40 | 40 | 35 | 40 |
| Polymer made (gram) | 163.6 | 190.7 | 214 | 269 | 418.2 |
| Conversion (%) | 34.2% | 39.9% | 44.8% | 45.6% | 62.0% |
| Catalyst productivity (kg poly/kg catalyst) | 294,463 | 245,196 | 213,979 | 768,648 | 627,301 |
| Complex viscosity at 0.1 rad/sec (Pa · s) | 276.7 | 219.0 | 94.3 | 1862.5 | 2433.9 |
| Complex viscosity at 100 rad/sec (Pa · s) | 185.7 | 153.4 | 75.6 | 730.3 | 813.0 |
| Shear thinning ratio (—) | 1.49 | 1.43 | 1.25 | 2.55 | 2.99 |
| MFR (g/10 min) | 77.2 | 96.2 | 203.1 | 11.1 | 10.7 |
| Mn_DRI (g/mol) | 57,894 | 52,837 | 43,118 | 96,570 | 104,192 |
| Mw_DRI (g/mol) | 114,401 | 109,686 | 95,660 | 194,233 | 206,877 |
| Mz_DRI (g/mol) | 187,279 | 180,192 | 161,642 | 313,674 | 339,936 |
| MWD (—) | 1.89 | 2.08 | 2.22 | 2.01 | 1.99 |
| Mn_LS (g/mol) | 61,389 | 54,706 | 47,484 | 105,303 | 113,711 |
| Mw_LS (g/mol) | 110,644 | 106,524 | 89,061 | 193,879 | 201,512 |
| Mz_LS (g/mol) | 167,447 | 164,924 | 135,192 | 282,972 | 291,635 |
| g'vis (—) | 0.95 | 0.94 | 0.93 | 0.97 | 0.98 |
| Tc (° C.) | 16.9 | 14.4 | 22.0 | | |
| Tm (° C.) | 57.0 | 57.1 | 57.6 | | |
| Tg (° C.) | −31.3 | −28.1 | −26.6 | | |
| Heat of fusion (J/g) | | | 26.5 | | |
| Ethylene content by FTIR (wt %) | 14.6% | 13.5% | 12.1% | 16.9% | 15.0% |
| Ethylene content by FTIR (mol %) | 20.4% | 19.0% | 17.1% | 23.3% | 20.9% |
| Vinyls/1000 Carbon | 0.1 | 0.11 | 0.12 | 0.05 | 0.06 |
| Vinylenes/1000 Carbon | 0.02 | 0.02 | 0.02 | 0.01 | 0.01 |
| Trisubstituted olefin/1000 Carbon | 0.15 | 0.14 | 0.15 | 0.17 | 0.21 |
| Vinylidenes/1000 Carbon | 0.11 | 0.14 | 0.13 | 0.1 | 0.08 |
| r1r2 (—) | 0.85 | 0.85 | 0.89 | 0.86 | 0.80 |
| 1,2-Propylene addition sequence distribution | | | | | |
| EEE | 0.008 | 0.007 | 0.005 | 0.010 | 0.006 |
| EEP | 0.050 | 0.045 | 0.040 | 0.063 | 0.052 |
| PEP | 0.133 | 0.126 | 0.118 | 0.142 | 0.132 |
| EPE | 0.049 | 0.044 | 0.041 | 0.054 | 0.050 |
| EPP | 0.221 | 0.210 | 0.207 | 0.234 | 0.230 |
| PPP | 0.540 | 0.568 | 0.589 | 0.498 | 0.530 |
| EE | 0.033 | 0.030 | 0.025 | 0.041 | 0.032 |
| EP + PE | 0.317 | 0.297 | 0.282 | 0.344 | 0.323 |

TABLE 5-continued

| | | | | | |
|---|---|---|---|---|---|
| PP | 0.651 | 0.673 | 0.692 | 0.614 | 0.645 |
| Triad tacticity index (% mm) | 84.9% | 90.5% | 88.6% | 93.7% | 92.9% |
| Total regio defects (mol %) | 0.681 | 0.782 | 0.690 | 0.733 | 0.713 |
| 2,1-E (mol %) | 0.327 | 0.376 | 0.332 | 0.412 | 0.394 |
| 2,1-EE (mol %) | 0.354 | 0.406 | 0.357 | 0.320 | 0.319 |
| 2,1-P (mol %) | 0 | 0 | 0 | 0 | 0 |
| Ethylene content by NMR (wt %) | 14.1% | 13.3% | 12.1% | 15.9% | 14.0% |
| Ethylene content by NMR (mol %) | 19.7% | 18.7% | 17.1% | 22.1% | 19.7% |

| Example # | C11 | C12 | C13 | C14 |
|---|---|---|---|---|
| Polymerization temperature (° C.) | 63 | 63 | 63 | 63 |
| Ethylene feed rate (g/min) | 1.87 | 2.26 | 1.87 | 1.87 |
| Propylene feed rate (g/min) | 15 | 18 | 15 | 15 |
| Isohexane feed rate (g/min) | 66.5 | 46.5 | 46.5 | 46.5 |
| Catalyst feed rate (mol/min) | 5.387E−08 | 1.347E−08 | 1.347E−08 | 8.979E−09 |
| Collection Time (min) | 40 | 40 | 40 | 40 |
| Polymer made (gram) | 523.1 | 269.6 | 244 | 105.6 |
| Conversion (%) | 77.5% | 33.3% | 36.2% | 15.7% |
| Catalyst productivity (kg poly/kg catalyst) | 490,425 | 1,010,851 | 914,865 | 593,979 |
| Complex viscosity at 0.1 rad/sec (Pa · s) | 1766.8 | 12678.5 | 7573.0 | 1147.9 |
| Complex viscosity at 100 rad/sec (Pa · s) | 644.9 | 1864.7 | 1475.3 | 537.7 |
| Shear thinning ratio (—) | 2.74 | 6.80 | 5.13 | 2.13 |
| MFR (g/10 min) | 13.4 | 4.7 | 3.9 | 5.5 |
| Mn_DRI (g/mol) | 97,753 | 137,516 | 134,768 | 137,044 |
| Mw_DRI (g/mol) | 192,447 | 261,802 | 257,414 | 272,795 |
| Mz_DRI (g/mol) | 310,483 | 418,811 | 414,954 | 444,342 |
| MWD (—) | 1.97 | 1.90 | 1.91 | 1.99 |
| Mn_LS (g/mol) | 107,278 | 154,819 | 150,568 | 151,794 |
| Mw_LS (g/mol) | 189,726 | 269,498 | 258,383 | 275,047 |
| Mz_LS (g/mol) | 281,812 | 389,986 | 370,311 | 395,045 |
| g'vis (—) | 0.97 | 0.99 | 0.99 | 0.99 |
| Tc (° C.) | 14.3 | | | |
| Tm (° C.) | 54.8 | | | |
| Tg (° C.) | −29.8 | −35.9 | −33.2 | −38.8 |
| Heat of fusion (J/g) | 12.6 | | | |
| Ethylene content by FTIR (wt %) | 13.9% | 20.2% | 18.6% | 23.1% |
| Ethylene content by FTIR (mol %) | 19.5% | 27.5% | 25.6% | 31.1% |
| Vinyls/1000 Carbon | 0.07 | 0.07 | 0.07 | 0.07 |
| Vinylenes/1000 Carbon | 0.02 | 0.02 | 0.04 | 0.02 |
| Trisubstituted olefin/1000 Carbon | 0.22 | 0.27 | 0.22 | 0.31 |
| Vinylidenes/1000 Carbon | 0.08 | 0.08 | 0.08 | 0.05 |
| r1r2 (—) | 0.84 | 0.72 | 0.78 | 0.74 |
| 1,2-Propylene addition sequence distribution | | | | |
| EEE | 0.006 | 0.013 | 0.012 | 0.020 |
| EEP | 0.044 | 0.083 | 0.077 | 0.106 |
| PEP | 0.125 | 0.159 | 0.151 | 0.166 |
| EPE | 0.043 | 0.076 | 0.070 | 0.091 |
| EPP | 0.218 | 0.257 | 0.248 | 0.258 |
| PPP | 0.565 | 0.412 | 0.442 | 0.359 |
| EE | 0.028 | 0.054 | 0.051 | 0.073 |
| EP + PE | 0.299 | 0.405 | 0.384 | 0.439 |
| PP | 0.674 | 0.540 | 0.566 | 0.488 |
| Triad tacticity index (% mm) | 93.6% | 94.3% | 91.9% | 91.3% |
| Total regio defects (mol %) | 0.760 | 0.448 | 0.686 | 0.620 |
| 2,1-E (mol %) | 0.447 | 0.139 | 0.299 | 0.172 |
| 2,1-EE (mol %) | 0.313 | 0.309 | 0.387 | 0.448 |
| 2,1-P (mol %) | 0 | 0 | 0 | 0 |
| Ethylene content by NMR (wt %) | 13.0% | 19.0% | 17.9% | 22.0% |
| Ethylene content by NMR (mol %) | 18.2% | 26.0% | 24.7% | 29.8% |

Polymerizations of Examples P01 to P19 were carried out using a solution process in a 28-liter continuous stirred-tank reactor (autoclave reactor). The autoclave reactor was equipped with an agitator, a pressure controller, and insulation to prevent heat loss. The reactor temperature was controlled by controlling the catalyst feed rates and heat removal was provided by feed chilling. All solvents and monomers were purified over beds of alumina and molecular sieves. The reactor was operated liquid full and at a pressure of 1,600 psig. Isohexane was used as a solvent. It was fed into the reactor using a turbine pump and its flow rate was controlled by a mass flow controller downstream. The compressed, liquefied propylene feed was controlled by a mass flow controller. Hydrogen (if used) was fed to the reactor through a thermal mass flow controller. Ethylene feed was also controlled by a mass flow controller. The ethylene, propylene and hydrogen (if used) were mixed into the isohexane steam at separate addition points via a manifold. A 3 wt % mixture of tri-n-octylaluminum in isohexane was also added to the manifold through a separate line (used as a scavenger) and the combined mixture of monomers, scavenger, and solvent was fed into the reactor through a single line.

The catalyst solution was prepared by combining complex Cat-Zr (ca. 250 mg) with N,N-dimethylanilinium tetrakis (pentafluorophenyl)borate (DMAH-BF20) at a molar ratio of about 1:1 in 4 liters of toluene. After the solids dissolved, with stirring, the solution was charged into an ISCO pump and metered into the reactor.

The catalyst feed rate was controlled along with the monomer feed rates and reaction temperature, as shown in Table 6. The polymers produced is also described in Table 6. The reactor product stream was treated with trace amounts of methanol to halt the polymerization. The mixture was then freed from solvent via a low-pressure flash separation, treated with Irganox™ 1076 then subjected to a devolatilizing extruder process. The dried polymer was then pelletized.

TABLE 6

| Example # | P01 | P02 | P03 | P04 | P05 |
|---|---|---|---|---|---|
| Polymerization temperature (° C.) | 88 | 104 | 114 | 125 | 135 |
| Ethylene feed rate (g/min) | 24.0 | 24.0 | 25.3 | 25.0 | 25.7 |
| Propylene feed rate (g/min) | 195.0 | 195.0 | 224.8 | 222.1 | 227.5 |
| Isohexane feed rate (g/min) | 857.49 | 734.00 | 602.00 | 499.1 | 443.0 |
| Catalyst feed rate (mol/min) | 1.335E−07 | 1.346E−07 | 1.045E−07 | 9.024E−08 | 8.917E−08 |
| TNOA feed rate (mol/min) | 2.208E−05 | 2.204E−05 | 2.204E−05 | 2.204E−05 | 2.207E−05 |
| Polymer yield (gram/min) | 95.8 | 93.3 | 101.7 | 100.3 | 101.2 |
| Conversion (%) | 43.8% | 42.6% | 40.7% | 40.6% | 39.9% |
| Catalyst productivity (kg poly/kg catalyst) | 784,232 | 756,937 | 1,063,188 | 1,214,466 | 1,239,263 |
| Complex viscosity at 0.1 rad/sec (Pa · s) | 16837.4 | 7026.3 | 4386.8 | 1780.0 | 640.3 |
| Complex viscosity at 100 rad/sec (Pa · s) | 1832.3 | 1157.9 | 878.5 | 549.6 | 295.6 |
| Shear thinning ratio (—) | 9.19 | 6.07 | 4.99 | 3.24 | 2.17 |
| MFR (g/10 min) | 1.4 | 3.7 | 5.8 | 13.9 | 38.4 |
| Mn_DRI (g/mol) | 143,390 | 108,209 | 92,192 | 72,208 | 50367 |
| Mw_DRI (g/mol) | 279,676 | 217,284 | 191,177 | 151,766 | 116560 |
| Mz_DRI (g/mol) | 456,441 | 362,821 | 324,251 | 253,335 | 199938 |
| MWD (—) | 1.95 | 2.01 | 2.07 | 2.10 | 2.31 |
| Mn_LS (g/mol) | 157,799 | 113,405 | 98,220 | 75,401 | 43216 |
| Mw_LS (g/mol) | 292,361 | 214,547 | 189,532 | 151,095 | 114984 |
| Mz_LS (g/mol) | 451,153 | 335,145 | 297,741 | 246,296 | 194989 |
| g'vis (—) | 1.01 | 0.98 | 0.96 | 0.95 | 0.92 |
| Tc (° C.) | | 18.9 | 19.0 | 20.6 | 21.5 |
| Tm (° C.) | | 52.1 | 52.7 | 54.1 | 55.6 |
| Tg (° C.) | −31.7 | −31.9 | −32.1 | −32.6 | −32.5 |
| Heat of fusion (J/g) | | 4.6 | 4.7 | 3.5 | 3.2 |
| Ethylene content by FTIR (wt %) | 17.0% | 17.0% | 17.2% | 17.4% | 17.7% |
| Ethylene content by FTIR (mol %) | 23.5% | 23.5% | 23.8% | 23.9% | 24.4% |
| Vinyls/1000 Carbon | 0.07 | 0.70 | 0.09 | 0.10 | 0.12 |
| Vinylenes/1000 Carbon | 0.00 | 0.00 | 0.02 | 0.03 | 0.06 |
| Trisubstituted olefin/1000 Carbon | −0.09 | 0.05 | 0.16 | 0.11 | 0.12 |
| Vinylidenes/1000 Carbon | 0.05 | 0.05 | 0.06 | 0.04 | 0.06 |
| r1r2 (—) | 1.55 | 1.57 | 1.57 | 1.55 | 1.51 |
| 1,2 propylene addtion sequence distribution | | | | | |
| EEE | 0.02 | 0.02 | 0.02 | 0.02 | 0.02 |
| EEP | 0.09 | 0.09 | 0.09 | 0.09 | 0.09 |
| PEP | 0.11 | 0.12 | 0.11 | 0.12 | 0.12 |
| EPE | 0.05 | 0.06 | 0.05 | 0.06 | 0.05 |
| EPP | 0.23 | 0.22 | 0.22 | 0.23 | 0.23 |
| PPP | 0.49 | 0.50 | 0.50 | 0.49 | 0.49 |
| EE | 0.067 | 0.068 | 0.067 | 0.070 | 0.067 |
| EP + PE | 0.325 | 0.325 | 0.323 | 0.329 | 0.328 |
| PP | 0.608 | 0.607 | 0.610 | 0.601 | 0.604 |
| Triad tacticity index (% mm) | 97.9% | 99.6% | 97.9% | 98.0% | 98.4% |

TABLE 6-continued

| | | | | | |
|---|---|---|---|---|---|
| Total regio defects (mol %) | 0.60 | 0.85 | 0.75 | 0.87 | 0.70 |
| 2,1-E (mol %) | 0.20 | 0.33 | 0.27 | 0.36 | 0.27 |
| 2,1-EE (mol %) | 0.41 | 0.52 | 0.48 | 0.51 | 0.44 |
| 2,1-P (mol %) | 0.00 | 0.00 | 0.00 | 0.00 | 0.00 |
| Ethylene content by NMR (wt %) | 16.8% | 17.1% | 16.9% | 17.3% | 17.1% |
| Ethylene content by NMR (mol %) | 23.2% | 23.7% | 23.4% | 23.9% | 23.6% |

| Example # | P06 | P07 | P08 | P09 | P10 |
|---|---|---|---|---|---|
| Polymerization temperature (° C.) | 145 | 150 | 155 | 160 | 80 |
| Ethylene feed rate (g/min) | 26.5 | 25.8 | 26.0 | 26.2 | 26.8 |
| Propylene feed rate (g/min) | 235.0 | 229.5 | 230.7 | 232.5 | 214.0 |
| Isohexane feed rate (g/min) | 389.0 | 372.1 | 345.1 | 320.7 | 1125.0 |
| Catalyst feed rate (mol/min) | 8.462E−08 | 9.184E−08 | 8.970E−08 | 1.030E−07 | 9.462E−08 |
| TNOA feed rate (mol/min) | 2.176E−05 | 2.178E−05 | 2.175E−05 | 2.176E−05 | 2.779E−05 |
| Polymer yield (gram/min) | 101.0 | 103.2 | 101.2 | 102.4 | 104.0 |
| Conversion (%) | 38.6% | 40.4% | 39.4% | 39.6% | 43.2% |
| Catalyst productivity (kg poly/kg catalyst) | 1,304,078 | 1,227,163 | 1,232,563 | 1,085,375 | 1,201,146 |
| Complex viscosity at 0.1 rad/sec (Pa · s) | 232.7 | 88.3 | 46.1 | 25.9 | 12289.6 |
| Complex viscosity at 100 rad/sec (Pa · s) | 153.2 | 68.3 | 35.4 | 20.1 | 1643.9 |
| Shear thinning ratio (—) | 1.52 | 1.29 | 1.30 | 1.29 | 7.48 |
| MFR (g/10 min) | 102.3 | 235.3 | 672.1 | 824.2 | 1.7 |
| Mn_DRI (g/mol) | 44069 | 37,201 | 36,038 | 26,015 | 132,922 |
| Mw_DRI (g/mol) | 95845 | 79,491 | 67,742 | 55,772 | 263,347 |
| Mz_DRI (g/mol) | 166706 | 137,526 | 111,835 | 93,113 | 436,845 |
| MWD (—) | 2.17 | 2.14 | 1.88 | 2.14 | 1.98 |
| Mn_LS (g/mol) | 46419 | 39148 | 37031 | 26631 | 150484 |
| Mw_LS (g/mol) | 92932 | 77093 | 65006 | 53970 | 285786 |
| Mz_LS (g/mol) | 155917 | 129045 | 106868 | 92239 | 443464 |
| g'vis (—) | 0.94 | 0.92 | 0.91 | 0.91 | 1.01 |
| Tc (° C.) | 22.8 | 22.5 | 21.7 | 21.8 | 20.0 |
| Tm (° C.) | 56.6 | 56.0 | 55.2 | 55.1 | 51.9 |
| Tg (° C.) | −33.7 | −33.1 | −33.4 | −34.1 | −31.5 |
| Heat of fusion (J/g) | 3.5 | 4.3 | 5.4 | 4.8 | 2.0 |
| Ethylene content by FTIR (wt %) | 17.8% | 18.0% | 17.8% | 18.0% | 16.7% |
| Ethylene content by FTIR (mol %) | 24.5% | 24.8% | 24.5% | 24.7% | 23.1% |
| Vinyls/1000 Carbon | 0.14 | 0.17 | 0.18 | 0.20 | 0.07 |
| Vinylenes/1000 Carbon | 0.07 | 0.10 | 0.12 | 0.16 | 0.01 |
| Trisubstituted olefin/1000 Carbon | 0.13 | 0.22 | 0.13 | 0.06 | 0.07 |
| Vinylidenes/1000 Carbon | 0.07 | 0.05 | 0.06 | 0.18 | 0.16 |
| r1r2 (—) | 1.47 | 1.43 | 1.45 | 1.40 | 1.45 |
| 1,2 propylene addtion sequence distribution | | | | | |
| EEE | 0.02 | 0.02 | 0.02 | 0.02 | 0.02 |
| EEP | 0.09 | 0.09 | 0.09 | 0.09 | 0.08 |
| PEP | 0.12 | 0.12 | 0.12 | 0.12 | 0.12 |
| EPE | 0.06 | 0.05 | 0.06 | 0.06 | 0.05 |
| EPP | 0.23 | 0.23 | 0.23 | 0.23 | 0.23 |
| PPP | 0.48 | 0.48 | 0.48 | 0.48 | 0.50 |
| EE | 0.069 | 0.066 | 0.067 | 0.066 | 0.063 |
| EP + PE | 0.334 | 0.333 | 0.333 | 0.336 | 0.325 |
| PP | 0.597 | 0.601 | 0.600 | 0.598 | 0.612 |
| Triad tacticity index (% mm) | 98.1% | 98.2% | 97.1% | 97.4% | 99.5% |
| Total regio defects (mol %) | 0.70 | 0.79 | 0.91 | 0.84 | 0.52 |
| 2,1-E (mol %) | 0.27 | 0.31 | 0.36 | 0.33 | 0.15 |
| 2,1-EE (mol %) | 0.43 | 0.48 | 0.55 | 0.51 | 0.37 |
| 2,1-P (mol %) | 0.00 | 0.00 | 0.00 | 0.00 | 0.00 |
| Ethylene content by NMR (wt %) | 17.3% | 17.1% | 17.3% | 17.3% | 16.5% |

TABLE 6-continued

| | | | | | |
|---|---|---|---|---|---|
| Ethylene content by NMR (mol %) | 23.9% | 23.7% | 23.9% | 23.9% | 22.9% |

| Example # | P11 | P12 | P13 | P14 | P15 |
|---|---|---|---|---|---|
| Polymerization temperature (° C.) | 74 | 70 | 126 | 126 | 126 |
| Ethylene feed rate (g/min) | 26.8 | 26.8 | 25.3 | 18.6 | 15.3 |
| Propylene feed rate (g/min) | 214.0 | 214.0 | 224.8 | 224.9 | 224.8 |
| Isohexane feed rate (g/min) | 1250.5 | 1292.2 | 477.2 | 477.2 | 477.3 |
| Catalyst feed rate (mol/min) | 5.078E−08 | 8.793E−08 | 8.737E−08 | 7.215E−08 | 7.014E−08 |
| TNOA feed rate (mol/min) | 1.806E−05 | 1.911E−05 | 1.996E−05 | 1.996E−05 | 1.994E−05 |
| Polymer yield (gram/min) | 102.8 | 96.8 | 98.2 | 96.7 | 98.5 |
| Conversion (%) | 42.7% | 40.2% | 39.2% | 39.7% | 41.0% |
| Catalyst productivity (kg poly/kg catalyst) | 2,211,635 | 1,203,240 | 1,227,162 | 1,464,461 | 1,534,034 |
| Complex viscosity at 0.1 rad/sec (Pa · s) | 18179.1 | 29172.7 | 1861.7 | 1114.8 | 946.0 |
| Complex viscosity at 100 rad/sec (Pa · s) | 1986.6 | 2389.0 | 563.9 | 421.0 | 368.0 |
| Shear thinning ratio (—) | 9.15 | 12.21 | 3.30 | 2.65 | 2.57 |
| MFR (g/10 min) | 1.1 | 0.6 | 13.5 | 21.9 | 25.7 |
| Mn_DRI (g/mol) | 149,865 | 175,700 | 69,000 | 71,436 | 71,984 |
| Mw_DRI (g/mol) | 296,354 | 337,184 | 153,335 | 146,940 | 147,213 |
| Mz_DRI (g/mol) | 486,551 | 542,328 | 270,704 | 247,357 | 247,533 |
| MWD (—) | 1.98 | 1.92 | 2.22 | 2.06 | 2.05 |
| Mn_LS (g/mol) | 168934 | 197596 | 77179 | 77713 | 74974 |
| Mw_LS (g/mol) | 305916 | 353773 | 151131 | 146809 | 145846 |
| Mz_LS (g/mol) | 455392 | 526794 | 242158 | 234643 | 233435 |
| g'vis (—) | 0.99 | 1.00 | 0.94 | 0.94 | 0.94 |
| Tc (° C.) | 18.6 | | 20.9 | 8.8 | 32.2 |
| Tm (° C.) | 51.2 | | 55.0 | 61.5 | 78.0 |
| Tg (° C.) | −31.5 | −31.5 | −32.4 | −29.5 | −25.9 |
| Heat of fusion (J/g) | 1.2 | | 2.9 | 20.2 | 38.1 |
| Ethylene content by FTIR (wt %) | 16.9% | 17.1% | 17.8% | 14.2% | 11.7% |
| Ethylene content by FTIR(mol %) | 23.4% | 23.6% | 24.5% | 19.8% | 16.6% |
| Vinyls/1000 Carbon | 0.07 | 0.05 | 0.09 | 0.08 | 0.06 |
| Vinylenes/1000 Carbon | 0.02 | 0.01 | 0.03 | 0.03 | 0.04 |
| Trisubstituted olefin/1000 Carbon | 0.09 | 0.07 | 0.03 | 0.07 | 0.02 |
| Vinylidenes/1000 Carbon | 0.14 | 0.15 | 0.19 | 0.15 | 0.14 |
| r1r2 (—) | 1.52 | 1.42 | 1.63 | 1.62 | 1.65 |
| 1,2 propylene addtion sequence distribution | | | | | |
| EEE | 0.02 | 0.02 | 0.03 | 0.01 | 0.01 |
| EEP | 0.09 | 0.09 | 0.09 | 0.07 | 0.05 |
| PEP | 0.12 | 0.12 | 0.12 | 0.10 | 0.09 |
| EPE | 0.05 | 0.05 | 0.05 | 0.04 | 0.03 |
| EPP | 0.23 | 0.23 | 0.23 | 0.21 | 0.19 |
| PPP | 0.50 | 0.49 | 0.49 | 0.57 | 0.63 |
| EE | 0.064 | 0.064 | 0.073 | 0.047 | 0.033 |
| EP + PE | 0.323 | 0.330 | 0.328 | 0.280 | 0.242 |
| PP | 0.613 | 0.607 | 0.600 | 0.673 | 0.725 |
| Triad tacticity index (% mm) | 98.0% | 99.0% | 98.0% | 98.6% | 98.9% |
| Total regio defects (mol %) | 0.53 | 0.49 | 0.61 | 0.65 | 0.77 |
| 2,1-E (mol %) | 0.18 | 0.14 | 0.18 | 0.28 | 0.39 |
| 2,1-EE (mol %) | 0.35 | 0.35 | 0.43 | 0.37 | 0.38 |
| 2,1-P (mol %) | 0.00 | 0.00 | 0.00 | 0.00 | 0.00 |
| Ethylene content by NMR (wt %) | 16.4% | 16.7% | 17.5% | 13.7% | 11.2% |
| Ethylene content by NMR (mol %) | 22.8% | 23.1% | 24.2% | 19.2% | 16.0% |

| Example # | P16 | P17 | P18 | P19 |
|---|---|---|---|---|
| Polymerization temperature (° C.) | 126 | 126 | 126 | 126 |
| Ethylene feed rate (g/min) | 12.0 | 8.3 | 6.7 | 5.0 |

TABLE 6-continued

| | | | | |
|---|---|---|---|---|
| Propylene feed rate (g/min) | 224.9 | 224.8 | 224.8 | 224.9 |
| Isohexane feed rate (g/min) | 477.3 | 477.2 | 477.1 | 477.3 |
| Catalyst feed rate (mol/min) | 6.987E−08 | 7.545E−08 | 7.575E−08 | 7.877E−08 |
| TNOA feed rate (mol/min) | 1.994E−05 | 1.997E−05 | 1.996E−05 | 2.000E−05 |
| Polymer yield (gram/min) | 96.8 | 98.9 | 101.9 | 103.2 |
| Conversion (%) | 40.9% | 42.4% | 44.0% | 44.9% |
| Catalyst productivity (kg poly/kg catalyst) | 1,513,992 | 1,432,343 | 1,469,572 | 1,430,656 |
| Complex viscosity at 0.1 rad/sec (Pa · s) | 815.8 | 634.2 | 599.0 | 512.6 |
| Complex viscosity at 100 rad/sec (Pa · s) | 333.6 | 273.0 | 267.6 | 234.9 |
| Shear thinning ratio (—) | 2.45 | 2.32 | 2.24 | 2.18 |
| MFR (g/10 min) | 31.1 | 38.0 | 41.5 | 47.9 |
| Mn_DRI (g/mol) | 74,861 | 74,172 | 66,979 | 69,038 |
| Mw_DRI (g/mol) | 147,433 | 149,614 | 148,810 | 147,671 |
| Mz_DRI (g/mol) | 246,005 | 254,779 | 262,045 | 258,129 |
| MWD (—) | 1.97 | 2.02 | 2.22 | 2.14 |
| Mn_LS (g/mol) | 80364 | 77760 | 63283 | 72821 |
| Mw_LS (g/mol) | 147535 | 146994 | 139067 | 143677 |
| Mz_LS (g/mol) | 238142 | 233941 | 221068 | 232213 |
| g'vis (—) | 0.95 | 0.95 | 0.92 | 0.96 |
| Tc (° C.) | 48.1 | 64.7 | 66.9 | 79.4 |
| Tm (° C.) | 90.4 | 105.3 | 106.2 | 119.0 |
| Tg (° C.) | −23.8 | −20.6 | −19.1 | −16.3 |
| Heat of fusion (J/g) | 48.2 | 57.6 | 60.7 | 73.5 |
| Ethylene content by FTIR (wt %) | 9.1% | 6.4% | 5.4% | 3.8% |
| Ethylene content by FTIR (mol %) | 13.1% | 9.2% | 7.9% | 5.5% |
| Vinyls/1000 Carbon | 0.08 | 0.07 | 0.08 | 0.13 |
| Vinylenes/1000 Carbon | 0.04 | 0.03 | 0.04 | 0.03 |
| Trisubstituted olefin/1000 Carbon | 0.04 | 0.01 | 0.03 | 0.03 |
| Vinylidenes/1000 Carbon | 0.17 | 0.14 | 0.16 | 0.18 |
| r1r2 (—) | 1.67 | 1.65 | 1.82 | |
| 1,2 propylene addtion sequence distribution | | | | |
| EEE | 0.01 | 0.00 | 0.00 | |
| EEP | 0.03 | 0.02 | 0.02 | |
| PEP | 0.08 | 0.06 | 0.06 | |
| EPE | 0.02 | 0.01 | 0.01 | |
| EPP | 0.17 | 0.14 | 0.13 | |
| PPP | 0.69 | 0.76 | 0.78 | |
| EE | 0.022 | 0.012 | 0.011 | |
| EP + PE | 0.204 | 0.158 | 0.143 | |
| PP | 0.773 | 0.830 | 0.846 | |
| Triad tacticity index (% mm) | 98.7% | 99.4% | 99.3% | 99.1% |
| Total regio defects (mol %) | 0.69 | 0.63 | 0.63 | 0.86 |
| 2,1-E (mol %) | 0.37 | 0.40 | 0.43 | 0.47 |
| 2,1-EE (mol %) | 0.32 | 0.23 | 0.20 | 0.38 |
| 2,1-P (mol %) | 0.00 | 0.00 | 0.00 | 0.00 |
| Ethylene content by NMR (wt %) | 9.0% | 6.5% | 5.9% | 5.3% |
| Ethylene content by NMR (mol %) | 12.9% | 9.4% | 8.6% | 7.7% |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A polymerization process comprising contacting, in a homogeneous phase, at least one $C_3$-$C_{40}$ alpha olefin and ethylene with a catalyst system comprising activator and catalyst compound represented by Formula (I):

(I)

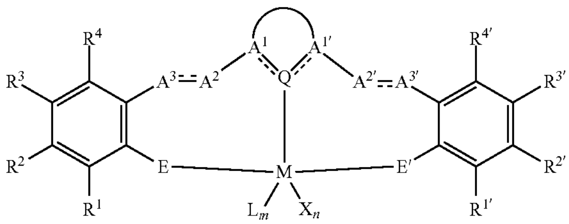

wherein:

M is a group 3, 4, 5, or 6 transition metal or a lanthanide;

E and E' are each independently O, S, or $NR^9$ where $R^9$ is independently hydrogen, a $C_1$-$C_{40}$ hydrocarbyl, a $C_1$-$C_{40}$ substituted hydrocarbyl or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$A^3$=$A^2$ is a divalent group containing 2 to 40 non-hydrogen atoms that links $A^1$ to the E-bonded aryl group via a 2-atom bridge;

$A^{2'}$=$A^{3'}$ is a divalent group containing 2 to 40 non-hydrogen atoms that links $A^{1'}$ to the E'-bonded aryl group via a 2-atom bridge;

L is a Lewis base;

X is an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, a $C_1$-$C_{40}$ hydrocarbyl, a $C_1$-$C_{40}$ substituted hydrocarbyl, a heteroatom or a heteroatom-containing group, and one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring may join to form additional rings;

any two L groups may be joined together to form a bidentate Lewis base;

an X group may be joined to an L group to form a monoanionic bidentate group;

any two X groups may be joined together to form a dianionic ligand group; and obtaining a copolymer comprising up to 35 mole % ethylene.

2. The polymerization process of claim 1, wherein the $C_3$-$C_{40}$ alpha olefin is propylene and the copolymer comprises 0.1 to 35 mol % ethylene and 99.9 to 65 mol % propylene.

3. The polymerization process of claim 1, wherein Mis Hf, Zr, or Ti.

4. The polymerization process of claim 1 where the catalyst compound represented by Formula (II):

(II)

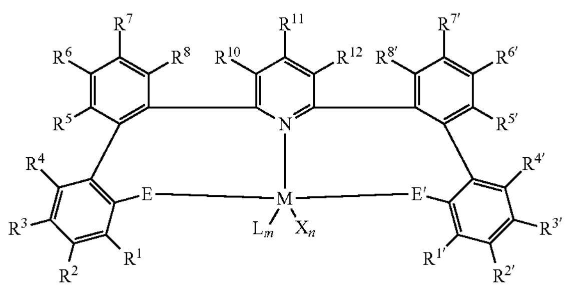

wherein:

M is a group 3, 4, 5, or 6 transition metal or a lanthanide;

E and E' are each independently O, S, or $NR^9$, where $R^9$ is independently hydrogen, a $C_1$-$C_{40}$ hydrocarbyl, a $C_1$-$C_{40}$ substituted hydrocarbyl, or a heteroatom-containing group;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^2$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring may join to form additional rings;

any two L groups may be joined together to form a bidentate Lewis base;

an X group may be joined to an L group to form a monoanionic bidentate group;

any two X groups may be joined together to form a dianionic ligand group;

each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, a $C_1$-$C_{40}$ hydrocarbyl, a $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring may join to form additional rings.

5. The polymerization process of claim 4, wherein M is Hf, Zr, or Ti.

6. The polymerization process of claim 1, wherein E and E' are each O.

7. The polymerization process of claim 1, wherein $R^1$ and $R^{1'}$ is independently selected from the group consisting of a $C_4$-$C_{40}$ tertiary hydrocarbyl group, a $C_4$-$C_{40}$ cyclic tertiary hydrocarbyl group, and a $C_4$-$C_{40}$ polycyclic tertiary hydrocarbyl group.

8. The polymerization process of claim 1 wherein each X is, independently, selected from the group consisting of substituted or unsubstituted hydrocarbyl radicals having from 1 to 20 carbon atoms, hydrides, amides, alkoxides, sulfides, phosphides, halides, and a combination thereof, and optionally wherein two X's may form a part of a fused ring or a ring system.

9. The polymerization process of claim 1 wherein each L is, independently, selected from the group consisting of: ethers, thioethers, amines, phosphines, ethyl ether, tetrahydrofuran, dimethylsulfide, triethylamine, pyridine, alkenes, alkynes, allenes, carbenes and a combination thereof, and optionally wherein two or more L's may form a part of a fused ring or a ring system.

10. The polymerization process of claim 1, wherein M is Zr or Hf, Q is nitrogen, both $A^1$ and $A^{1'}$ are carbon, both E and E' are oxygen, and both $R^1$ and $R^{1'}$ are independently selected from the group consisting of $C_4$-$C_{20}$ cyclic tertiary alkyl, adamantan-1-yl, and substituted adamantan-1-yl.

11. The polymerization process of claim 1, wherein Q is carbon, $A^1$ and $A^{1'}$ are both nitrogen, and both E and E' are oxygen.

12. The polymerization process of claim 1, wherein Q is carbon, $A^1$ is nitrogen, $A^{1'}$ is $C(R^{22})$, and both E and E' are oxygen, where $R^{22}$ is selected from hydrogen, $C_1$-$C_{20}$ hydrocarbyl, $C_1$-$C_{20}$ substituted hydrocarbyl.

13. The polymerization process of claim 1, wherein the heterocyclic Lewis base is selected from the groups represented by the following formulas:

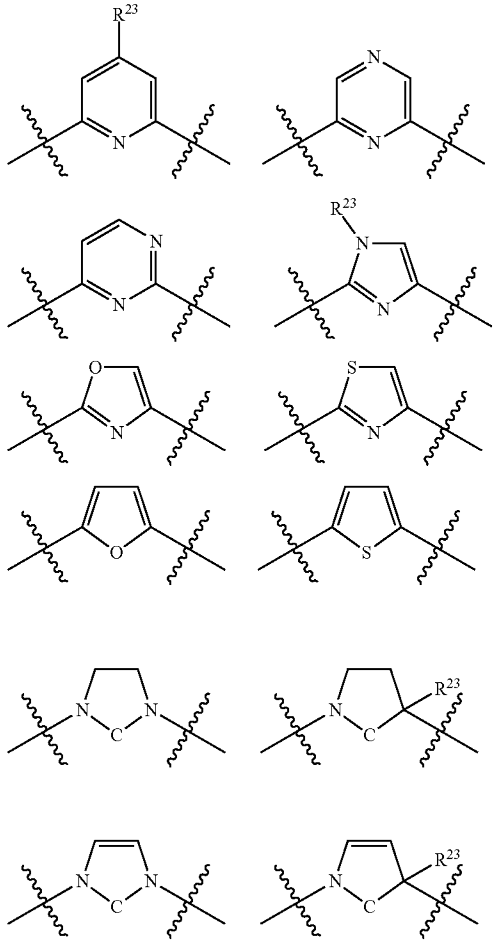
where each $R^{23}$ is independently selected from hydrogen, $C_1$-$C_{20}$ alkyl, or $C_1$-$C_{20}$ substituted alkyl.
14. The polymerization process of claim 1 wherein the catalyst compound is represented by one or more of the following formulas:
Complex 1
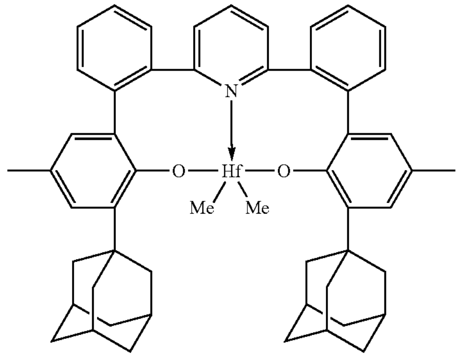
-continued
Complex 2
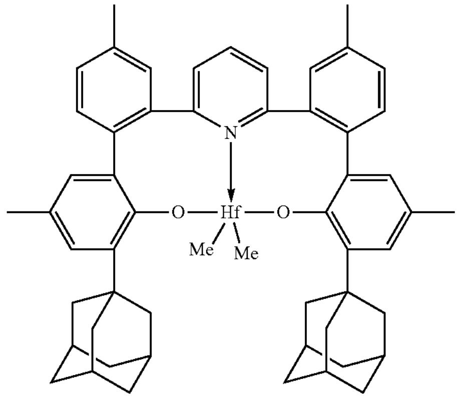
Complex 3
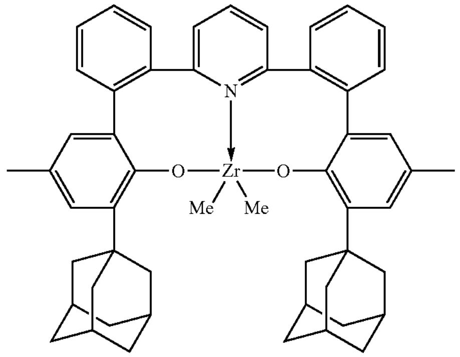
Complex 4
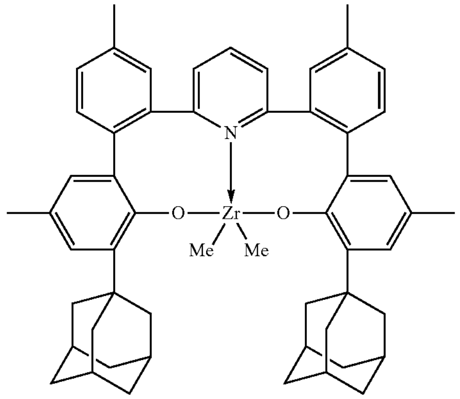
Complex 5
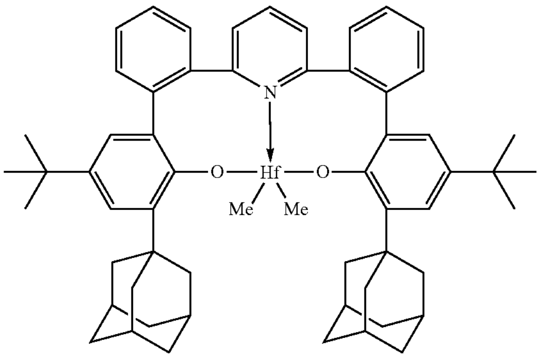

-continued
Complex 6
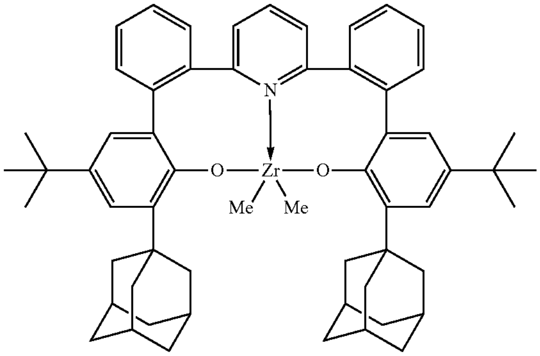
Complex 7
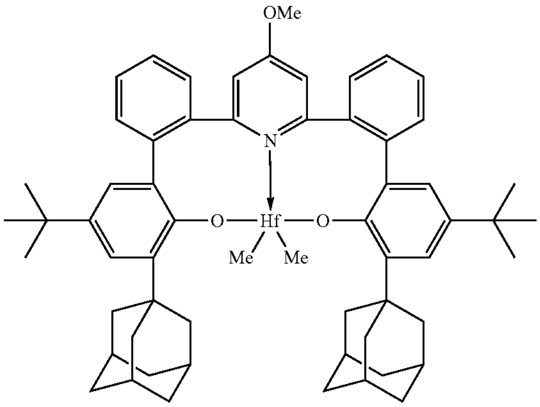
Complex 8
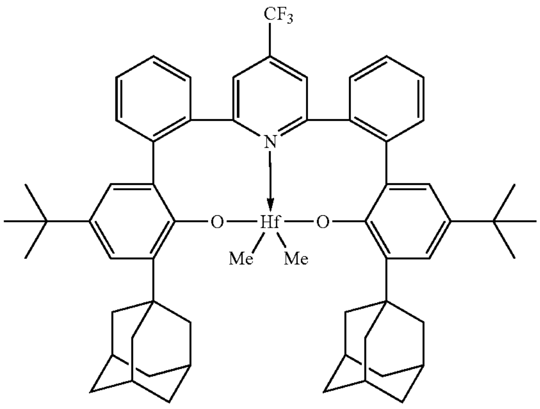
Complex 9
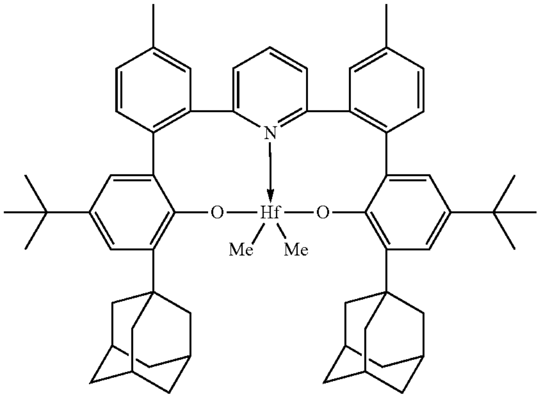
-continued
Complex 10
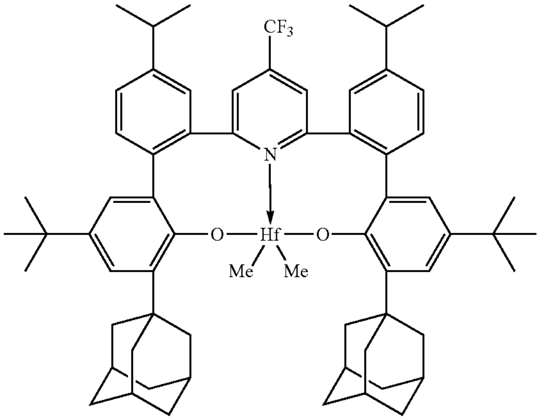
Complex 11
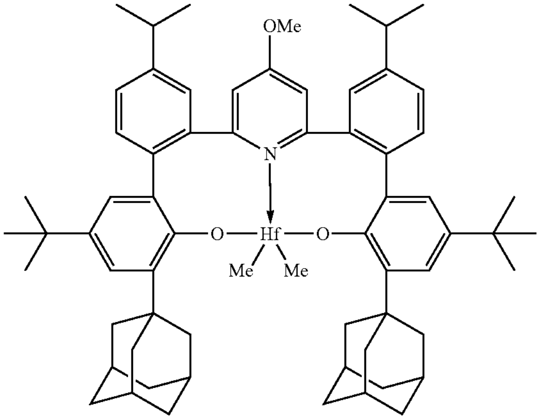
Complex 12
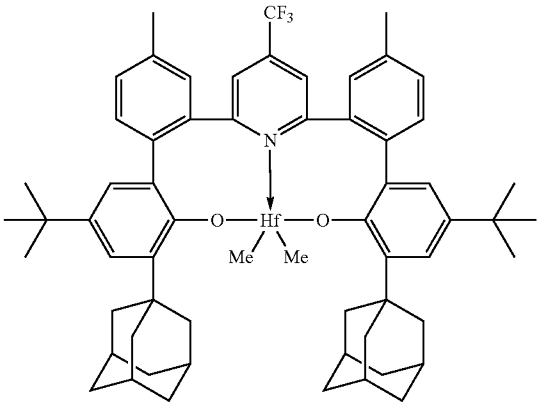

-continued
Complex 13
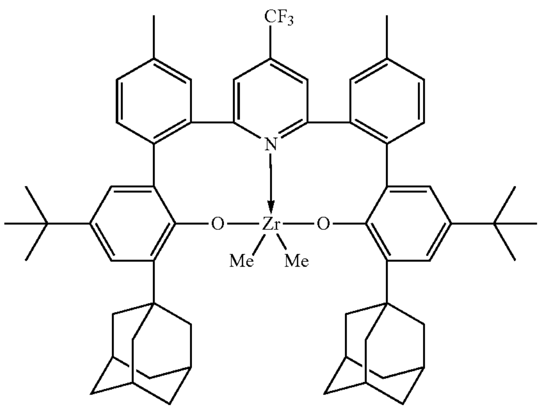
Complex 14
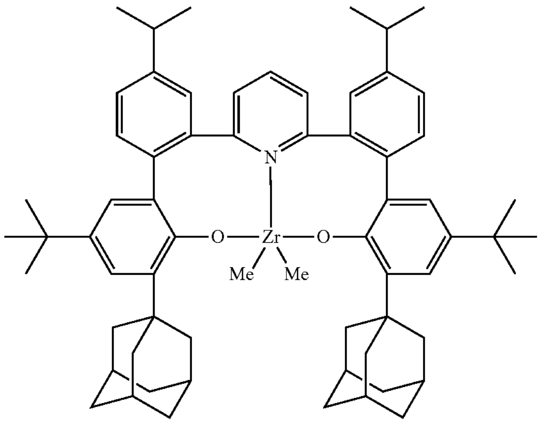
Complex 15
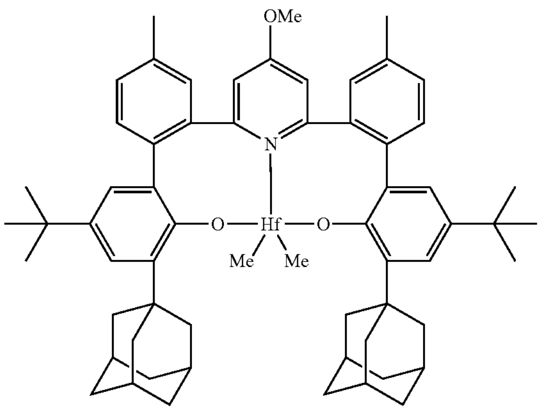
-continued
Complex 16
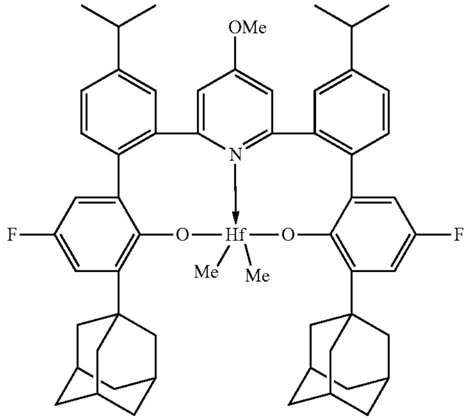
Complex 17
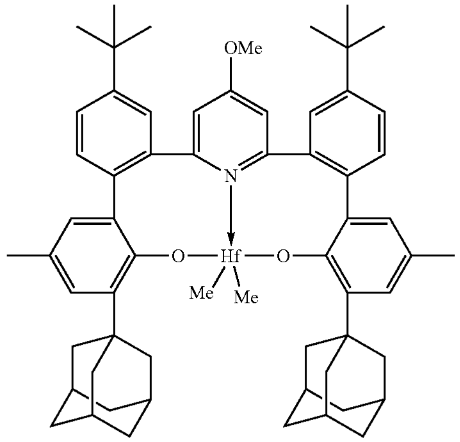
Complex 18
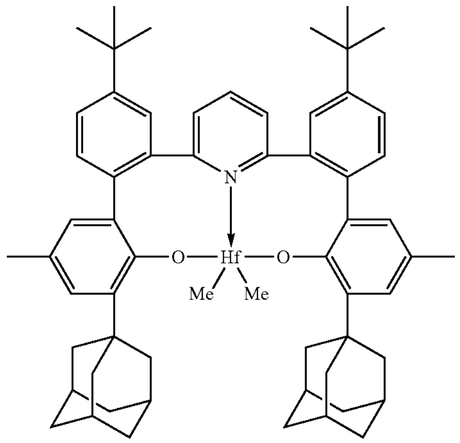

-continued
Complex 19
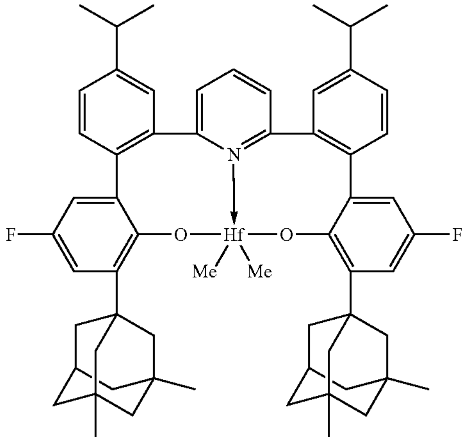
Complex 20
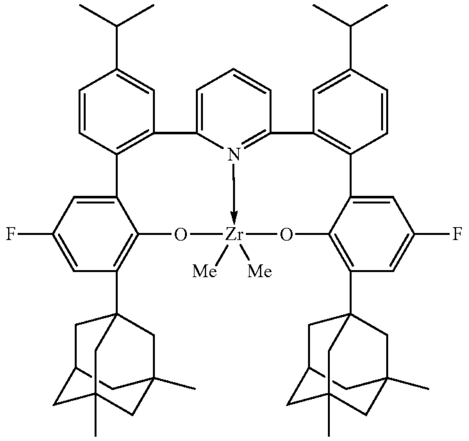
Complex 21
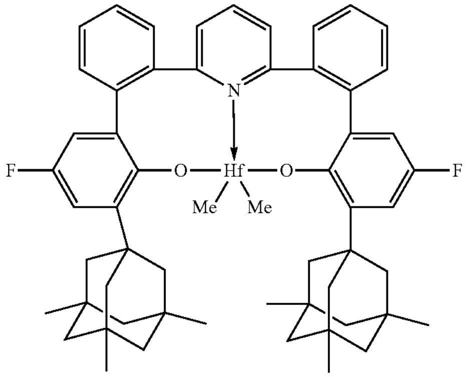
-continued
Complex 22
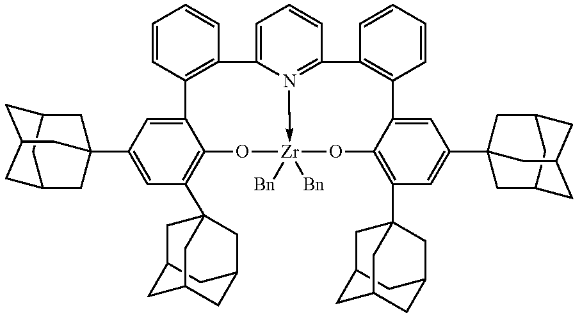
Complex 23
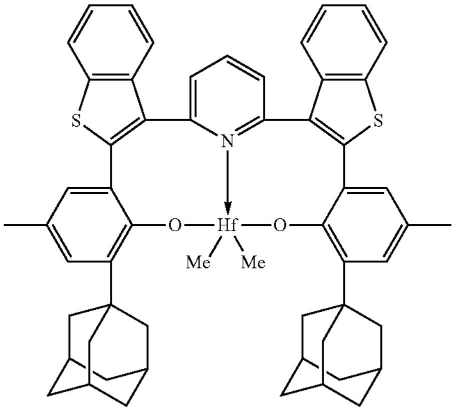
Complex 24
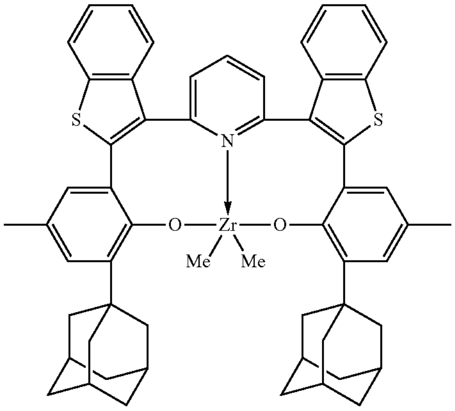

-continued

Complex 25

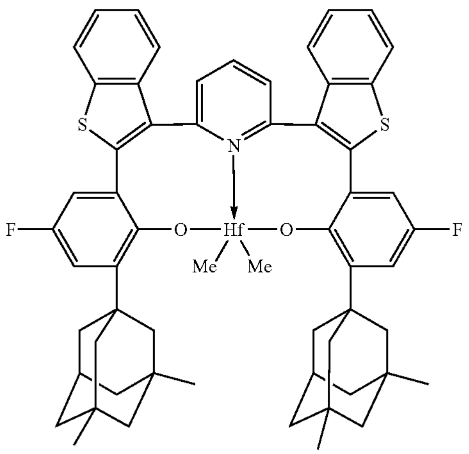

Complex 26

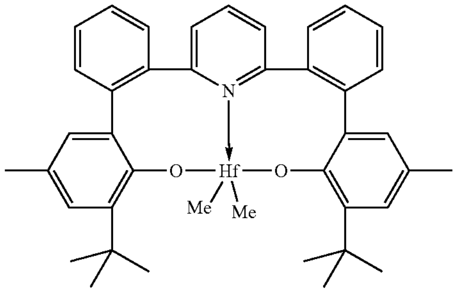

Complex 27

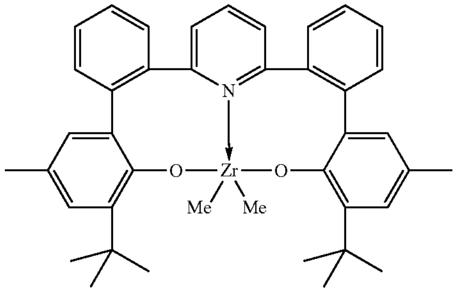

Complex 29

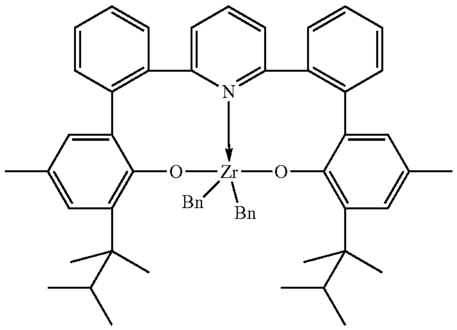

-continued

Complex 30

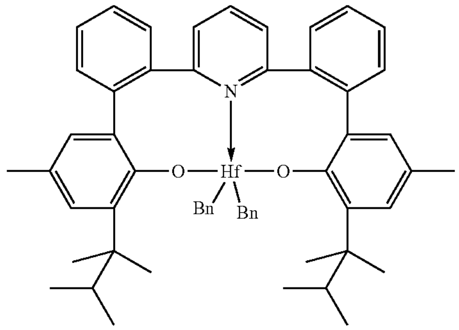

Complex 31

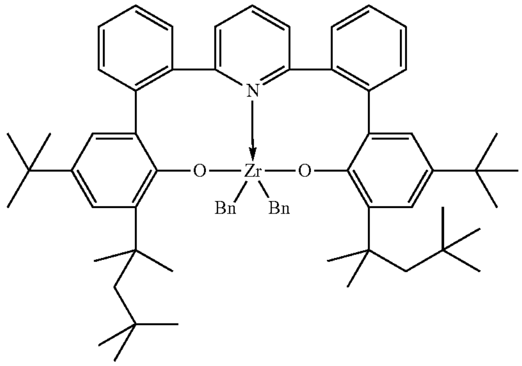

Complex 32

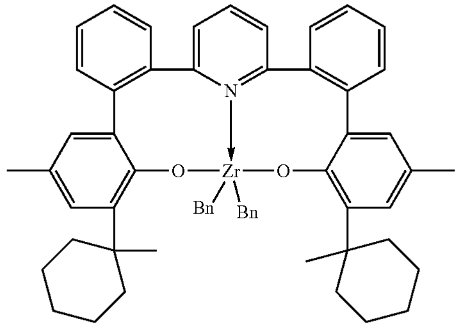

Complex 33

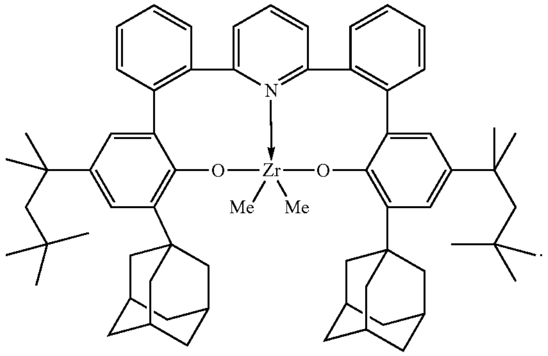

15. The polymerization process of claim 1, wherein the polymerization process is a solution process.

16. The polymerization process of claim 1, wherein the polymerization process occurs at a temperature of from about 140° C. to about 65° C. and a catalyst activity is 100,000 kg polymer per kg of catalyst or more.

17. The polymerization process of claim 1 wherein a catalyst activity is 200,000 kg polymer per kg of catalyst or more.

18. The polymerization process of claim 1, wherein the copolymer has a branching index, $g'_{vis}$ of 0.95 or less.

19. The polymerization process of claim 1, wherein the copolymer has an Mn of 25,000 g/mol or more.

20. The polymerization process of claim 1, wherein the copolymer has an Mw/Mn of 1.5 to 15.

21. The polymerization process of claim 1, wherein the copolymer has a melt flow rate of 1500 g/10 min or less.

22. The polymerization process of claim 1, wherein the copolymer has a Brookfield viscosity of 500 mPa·sec or more.

23. The polymerization process of claim 1, wherein the copolymer has an ethylene content of 5 to 26 mol %.

24. The polymerization process of claim 1, wherein the copolymer has a Tm of 155° C. or less.

25. The polymerization process of claim 1, wherein the copolymer has a heat of fusion of 100 J/g or less.

26. The polymerization process of claim 1, wherein $r_1r_2$ of the copolymer is in range of 0.8 to 3.0.

27. The polymerization process of claim 1, wherein the copolymer has regio defects of from 0.01 to 1.2 mol %.

28. The polymerization process of claim 1, wherein the copolymer has an mm triad tacticity of 75% or greater.

* * * * *